(12) United States Patent
Merritt et al.

(10) Patent No.: US 12,465,382 B1
(45) Date of Patent: Nov. 11, 2025

(54) MECHANICAL THROMBECTOMY ASSEMBLIES WITH RELIEF FEATURES, AND ASSOCIATED DEVICES, SYSTEMS, AND METHODS

(71) Applicant: Inari Medical, Inc., Irvine, CA (US)

(72) Inventors: Brian Edward Merritt, San Clemente, CA (US); Jakub Marek Truty, San Clemente, CA (US); Aaron Dederich, San Clemente, CA (US); Anna Kristine Kratochvil, Huntington Beach, CA (US); Nicole Marissa Morris, Santa Rosa, CA (US)

(73) Assignee: Inari Medical, Inc., Irvine, CA (US)

( * ) Notice: Subject to any disclaimer, the term of this patent is extended or adjusted under 35 U.S.C. 154(b) by 0 days.

(21) Appl. No.: 18/770,109

(22) Filed: Jul. 11, 2024

Related U.S. Application Data

(60) Provisional application No. 63/645,585, filed on May 10, 2024.

(51) Int. Cl.
*A61B 17/22* (2006.01)
*A61B 17/221* (2006.01)

(52) U.S. Cl.
CPC .............. *A61B 17/22032* (2013.01); *A61B 2017/22079* (2013.01); *A61B 2017/2212* (2013.01)

(58) Field of Classification Search
CPC ............ A61B 17/221; A61B 17/22031; A61B 2017/2212; A61B 2017/2215;
(Continued)

(56) References Cited

U.S. PATENT DOCUMENTS

| | | |
|---|---|---|
| 1,101,890 A | 6/1914 | Tunstead |
| 2,502,639 A | 4/1950 | Blake |

(Continued)

FOREIGN PATENT DOCUMENTS

| | | |
|---|---|---|
| AU | 2015210338 | 8/2015 |
| CN | 1501825 | 6/2004 |

(Continued)

OTHER PUBLICATIONS

US 12,114,876 B2, 10/2024, Quick et al. (withdrawn)
(Continued)

*Primary Examiner* — Kankindi Rwego
(74) *Attorney, Agent, or Firm* — Perkins Coie LLP

(57) ABSTRACT

Disclosed herein are clot treatment systems including mechanical thrombectomy devices and clot treatment devices, and associated devices and methods. In some embodiments, a method of removing clot material from a blood vessel of patient includes inserting a catheter to proximate the clot material within the blood vessel while radially constraining a clot treatment device and an embolic protection device within the catheter. The method can further include moving the catheter proximally to deploy the clot treatment device at least partially distal to clot material within the blood vessel, and then moving the catheter further proximally to deploy the embolic protection device at least partially proximal to the clot material. The clot treatment device can include one or more relief features configured to release captured clot material if the force on the clot treatment device exceeds a threshold.

20 Claims, 23 Drawing Sheets

(58) Field of Classification Search
CPC .. A61B 2017/2217; A61B 2017/22034; A61B 2017/22035; A61F 2/01; A61F 2/0103; A61F 2/0105; A61F 2/0108; A61F 2/013; A61F 2/014; A61F 2/848; A61F 2002/015; A61F 2002/016; A61F 2002/8483; A61F 2002/8486
USPC .................................................. 606/127, 159
See application file for complete search history.

(56) References Cited

U.S. PATENT DOCUMENTS

| | | |
|---|---|---|
| 2,695,023 A | 11/1954 | Brown |
| 2,707,954 A | 5/1955 | Kas, Sr. |
| 2,784,717 A | 3/1957 | Thompson |
| 2,846,179 A | 8/1958 | Monckton |
| 2,955,592 A | 10/1960 | Maclean |
| 3,088,363 A | 5/1963 | Sparks |
| 3,197,173 A | 7/1965 | Taubenheim |
| 3,383,131 A | 5/1968 | Rosfelder |
| 3,416,531 A | 12/1968 | Edwards |
| 3,435,826 A | 4/1969 | Fogarty |
| 3,438,607 A | 4/1969 | Williams et al. |
| 3,515,137 A | 6/1970 | Santomieri |
| 3,661,144 A | 5/1972 | Jensen et al. |
| 3,675,657 A | 7/1972 | Gauthier |
| 3,785,380 A | 1/1974 | Brumfield |
| 3,860,006 A | 1/1975 | Patel |
| 3,863,624 A | 2/1975 | Gram |
| 3,892,161 A | 7/1975 | Sokol |
| 3,923,065 A | 12/1975 | Nozick et al. |
| 4,030,503 A | 6/1977 | Clark, III |
| 4,034,642 A | 7/1977 | Iannucci et al. |
| 4,036,232 A | 7/1977 | Genese |
| 4,187,849 A | 2/1980 | Stim |
| 4,222,380 A | 9/1980 | Terayama |
| 4,243,040 A | 1/1981 | Beecher |
| 4,287,808 A | 9/1981 | Leonard et al. |
| 4,324,262 A | 4/1982 | Hall |
| 4,393,872 A | 7/1983 | Reznik et al. |
| 4,401,107 A | 8/1983 | Harber et al. |
| 4,469,100 A | 9/1984 | Hardwick |
| 4,523,738 A | 6/1985 | Raftis et al. |
| 4,551,862 A | 11/1985 | Haber |
| 4,604,094 A | 8/1986 | Shook |
| 4,611,594 A | 9/1986 | Grayhack et al. |
| 4,634,421 A | 1/1987 | Hegemann |
| 4,643,184 A | 2/1987 | Mobin-Uddin |
| 4,646,736 A | 3/1987 | Auth et al. |
| 4,650,466 A | 3/1987 | Luther |
| 4,693,257 A | 9/1987 | Markham |
| 4,705,518 A | 11/1987 | Baker et al. |
| 4,743,230 A | 5/1988 | Nordquest |
| 4,776,337 A | 10/1988 | Palmaz |
| 4,790,812 A | 12/1988 | Hawkins, Jr. et al. |
| 4,826,483 A | 5/1989 | Molnar, IV |
| 4,863,440 A | 9/1989 | Chin et al. |
| 4,870,953 A | 10/1989 | DonMichael et al. |
| 4,872,579 A | 10/1989 | Palmer |
| 4,880,408 A | 11/1989 | Cumes et al. |
| 4,883,458 A | 11/1989 | Shiber |
| 4,886,062 A | 12/1989 | Wiktor |
| 4,890,611 A | 1/1990 | Monfort et al. |
| 4,898,575 A | 2/1990 | Fischell et al. |
| 4,946,440 A | 8/1990 | Hall |
| 4,960,259 A | 10/1990 | Sunnanvader et al. |
| 4,978,341 A | 12/1990 | Niederhauser |
| 4,981,478 A | 1/1991 | Evard et al. |
| 5,030,201 A | 7/1991 | Palestrant |
| 5,053,008 A | 10/1991 | Bajaj |
| 5,059,178 A | 10/1991 | Ya |
| 5,064,428 A | 11/1991 | Cope et al. |
| 5,100,423 A | 3/1992 | Fearnot |
| 5,127,626 A | 7/1992 | Hilal et al. |
| 5,129,910 A | 7/1992 | Phan et al. |
| 5,135,484 A | 8/1992 | Wright |
| 5,154,724 A | 10/1992 | Andrews |
| 5,158,533 A | 10/1992 | Strauss et al. |
| 5,158,564 A | 10/1992 | Schnepp-Pesch et al. |
| 5,192,274 A | 3/1993 | Bierman |
| 5,192,286 A | 3/1993 | Phan et al. |
| 5,192,290 A | 3/1993 | Hilal |
| 5,197,485 A | 3/1993 | Grooters |
| 5,215,536 A | 6/1993 | Lampropoulos et al. |
| 5,234,403 A | 8/1993 | Yoda et al. |
| 5,242,461 A | 9/1993 | Kortenbach et al. |
| 5,244,619 A | 9/1993 | Burnham |
| 5,246,011 A | 9/1993 | Caillouette |
| 5,250,025 A | 10/1993 | Sosnowski et al. |
| 5,279,546 A | 1/1994 | Mische et al. |
| 5,323,514 A | 6/1994 | Masuda et al. |
| 5,329,923 A | 7/1994 | Lundquist |
| 5,337,780 A | 8/1994 | Kee |
| 5,360,417 A | 11/1994 | Gravener et al. |
| 5,364,345 A | 11/1994 | Lowery et al. |
| 5,376,071 A | 12/1994 | Henderson |
| 5,376,101 A | 12/1994 | Green et al. |
| 5,378,230 A | 1/1995 | Mahurkar |
| 5,383,887 A | 1/1995 | Nadal |
| 5,389,100 A | 2/1995 | Bacich et al. |
| 5,391,152 A | 2/1995 | Patterson et al. |
| 5,419,774 A | 5/1995 | Willard et al. |
| 5,421,824 A | 6/1995 | Clement et al. |
| 5,429,610 A | 7/1995 | Vaillancourt |
| 5,443,443 A | 8/1995 | Shiber |
| 5,456,667 A | 10/1995 | Ham et al. |
| 5,476,450 A | 12/1995 | Ruggio |
| 5,484,418 A | 1/1996 | Quiachon et al. |
| 5,490,859 A | 2/1996 | Mische et al. |
| 5,496,365 A | 3/1996 | Sgro |
| 5,527,326 A | 6/1996 | Hermann et al. |
| 5,549,626 A | 8/1996 | Miller et al. |
| 5,591,137 A | 1/1997 | Stevens |
| 5,639,276 A | 6/1997 | Weinstock et al. |
| 5,653,684 A | 8/1997 | Laptewicz et al. |
| 5,662,703 A | 9/1997 | Yurek et al. |
| 5,746,758 A | 5/1998 | Nordgren et al. |
| 5,749,858 A | 5/1998 | Cramer |
| 5,769,816 A | 6/1998 | Barbut et al. |
| 5,782,817 A | 7/1998 | Franzel et al. |
| 5,800,457 A | 9/1998 | Gelbfish |
| 5,827,229 A | 10/1998 | Auth et al. |
| 5,846,251 A | 12/1998 | Hart |
| 5,860,938 A | 1/1999 | Lafontaine et al. |
| 5,867,385 A | 2/1999 | Brown et al. |
| 5,873,866 A | 2/1999 | Kondo et al. |
| 5,873,882 A | 2/1999 | Straub et al. |
| 5,876,414 A | 3/1999 | Straub |
| 5,895,406 A | 4/1999 | Gray et al. |
| 5,908,435 A | 6/1999 | Samuels |
| 5,911,710 A | 6/1999 | Barry et al. |
| 5,911,728 A | 6/1999 | Sepetka et al. |
| 5,911,733 A | 6/1999 | Parodi |
| 5,911,754 A | 6/1999 | Kanesaka et al. |
| 5,941,869 A | 8/1999 | Patterson et al. |
| 5,947,985 A | 9/1999 | Imram |
| 5,951,539 A | 9/1999 | Nita et al. |
| 5,954,737 A | 9/1999 | Lee |
| 5,971,938 A | 10/1999 | Hart et al. |
| 5,971,958 A | 10/1999 | Zhang |
| 5,972,019 A | 10/1999 | Engelson et al. |
| 5,974,938 A | 11/1999 | Lloyd |
| 5,989,233 A | 11/1999 | Yoon |
| 5,993,483 A | 11/1999 | Gianotti |
| 6,017,335 A | 1/2000 | Burnham |
| 6,030,397 A | 2/2000 | Moneti et al. |
| 6,059,745 A | 5/2000 | Gelbfish |
| 6,059,814 A | 5/2000 | Ladd |
| 6,066,158 A | 5/2000 | Engelson et al. |
| 6,068,645 A | 5/2000 | Tu |
| 6,126,635 A | 10/2000 | Simpson et al. |
| 6,142,987 A | 11/2000 | Tsugita |
| 6,146,396 A | 11/2000 | Konya et al. |
| 6,146,403 A | 11/2000 | St. Germain |

(56) References Cited

U.S. PATENT DOCUMENTS

| | | |
|---|---|---|
| 6,152,144 A | 11/2000 | Lesh et al. |
| 6,152,909 A | 11/2000 | Bagaoisan et al. |
| 6,152,946 A | 11/2000 | Broome et al. |
| 6,156,055 A | 12/2000 | Ravenscroft |
| 6,159,230 A | 12/2000 | Samuels |
| 6,165,196 A | 12/2000 | Stack et al. |
| 6,168,579 B1 | 1/2001 | Tsugita |
| 6,179,859 B1 | 1/2001 | Bates et al. |
| 6,221,006 B1 | 4/2001 | Dubrul et al. |
| 6,228,060 B1 | 5/2001 | Howell |
| 6,238,412 B1 | 5/2001 | Dubrul et al. |
| 6,245,078 B1 | 6/2001 | Ouchi |
| 6,245,089 B1 | 6/2001 | Daniel et al. |
| 6,254,571 B1 | 7/2001 | Hart |
| 6,258,115 B1 | 7/2001 | Dubrul |
| 6,264,663 B1 | 7/2001 | Cano |
| 6,306,163 B1 | 10/2001 | Fitz |
| 6,322,572 B1 | 11/2001 | Lee |
| 6,350,271 B1 | 2/2002 | Kurz et al. |
| 6,361,545 B1 | 3/2002 | Macoviak et al. |
| 6,364,895 B1 | 4/2002 | Greenhalgh |
| 6,368,339 B1 | 4/2002 | Amplatz |
| 6,383,205 B1 | 5/2002 | Samson et al. |
| 6,402,771 B1 | 6/2002 | Palmer et al. |
| 6,413,235 B1 | 7/2002 | Parodi |
| 6,423,032 B2 | 7/2002 | Parodi |
| 6,432,122 B1 | 8/2002 | Gilson et al. |
| 6,436,085 B1 | 8/2002 | Lauer |
| 6,451,036 B1 | 9/2002 | Heitzmann et al. |
| 6,458,103 B1 | 10/2002 | Albert et al. |
| 6,475,236 B1 | 11/2002 | Roubin et al. |
| 6,485,502 B2 | 11/2002 | Don Michael |
| 6,508,782 B1 | 1/2003 | Evans et al. |
| 6,511,492 B1 | 1/2003 | Rosenbluth et al. |
| 6,514,273 B1 | 2/2003 | Voss et al. |
| 6,530,923 B1 | 3/2003 | Dubrul et al. |
| 6,530,935 B2 | 3/2003 | Wensel et al. |
| 6,540,722 B1 | 4/2003 | Boyle et al. |
| 6,544,276 B1 | 4/2003 | Azizi |
| 6,544,278 B1 | 4/2003 | Vrba et al. |
| 6,544,279 B1 | 4/2003 | Hopkins et al. |
| 6,551,342 B1 | 4/2003 | Shen et al. |
| 6,564,828 B1 | 5/2003 | Ishida |
| 6,569,181 B1 | 5/2003 | Burns |
| 6,575,995 B1 | 6/2003 | Huter et al. |
| 6,589,263 B1 | 7/2003 | Hopkins et al. |
| 6,589,264 B1 | 7/2003 | Barbut et al. |
| 6,596,011 B2 | 7/2003 | Johnson et al. |
| 6,602,271 B2 | 8/2003 | Adams et al. |
| 6,605,074 B2 | 8/2003 | Zadno-azizi et al. |
| 6,605,102 B1 | 8/2003 | Mazzocchi et al. |
| 6,610,077 B1 | 8/2003 | Hancock et al. |
| 6,620,148 B1 | 9/2003 | Tsugita |
| 6,620,179 B2 | 9/2003 | Brook et al. |
| 6,620,182 B1 | 9/2003 | Khosravi et al. |
| 6,623,460 B1 | 9/2003 | Heck |
| 6,635,068 B1 | 10/2003 | Dubrul et al. |
| 6,645,222 B1 | 11/2003 | Parodi et al. |
| 6,660,013 B2 | 12/2003 | Rabiner et al. |
| 6,660,014 B2 | 12/2003 | Demarais et al. |
| 6,663,650 B2 | 12/2003 | Sepetka et al. |
| 6,679,893 B1 | 1/2004 | Tran |
| 6,692,504 B2 | 2/2004 | Kurz et al. |
| 6,699,260 B2 | 3/2004 | Dubrul et al. |
| 6,702,830 B1 | 3/2004 | Demarais et al. |
| 6,719,717 B1 | 4/2004 | Johnson et al. |
| 6,755,847 B2 | 6/2004 | Eskuri |
| 6,767,353 B2 | 7/2004 | Shiber |
| 6,790,204 B2 | 9/2004 | Zadno-Azizi et al. |
| 6,800,080 B1 | 10/2004 | Bates |
| 6,818,006 B2 | 11/2004 | Douk et al. |
| 6,824,545 B2 | 11/2004 | Sepetka et al. |
| 6,824,550 B1 | 11/2004 | Noriega et al. |
| 6,824,553 B1 | 11/2004 | Gene et al. |
| 6,830,561 B2 | 12/2004 | Jansen et al. |
| 6,846,029 B1 | 1/2005 | Ragner et al. |
| 6,902,540 B2 | 6/2005 | Dorros et al. |
| 6,908,455 B2 | 6/2005 | Hajianpour |
| 6,939,361 B1 | 9/2005 | Kleshinski |
| 6,942,682 B2 | 9/2005 | Vrba et al. |
| 6,945,977 B2 | 9/2005 | Demarais et al. |
| 6,960,189 B2 | 11/2005 | Bates et al. |
| 6,960,222 B2 | 11/2005 | Vo et al. |
| 7,004,931 B2 | 2/2006 | Hogendijk |
| 7,004,954 B1 | 2/2006 | Voss et al. |
| 7,036,707 B2 | 5/2006 | Aota et al. |
| 7,041,084 B2 | 5/2006 | Fotjik |
| 7,052,500 B2 | 5/2006 | Bashiri et al. |
| 7,056,328 B2 | 6/2006 | Arnott |
| 7,063,707 B2 | 6/2006 | Bose et al. |
| 7,069,835 B2 | 7/2006 | Nishri et al. |
| 7,094,249 B1 | 8/2006 | Thomas et al. |
| 7,122,034 B2 | 10/2006 | Belhe et al. |
| 7,128,073 B1 | 10/2006 | van der Burg et al. |
| 7,152,605 B2 | 12/2006 | Khairkhahan et al. |
| 7,179,273 B1 | 2/2007 | Palmer et al. |
| 7,223,253 B2 | 5/2007 | Hogendijk |
| 7,232,432 B2 | 6/2007 | Fulton, III et al. |
| 7,244,243 B2 | 7/2007 | Lary |
| 7,285,126 B2 | 10/2007 | Sepetka et al. |
| 7,300,458 B2 | 11/2007 | Henkes et al. |
| 7,306,618 B2 | 12/2007 | Demond et al. |
| 7,320,698 B2 | 1/2008 | Eskuri |
| 7,323,002 B2 | 1/2008 | Johnson et al. |
| 7,331,980 B2 | 2/2008 | Dubrul et al. |
| 7,481,805 B2 | 1/2009 | Magnusson |
| 7,534,234 B2 | 5/2009 | Fotjik |
| 7,578,830 B2 | 8/2009 | Kusleika et al. |
| 7,621,870 B2 | 11/2009 | Berrada et al. |
| 7,674,247 B2 | 3/2010 | Fotjik |
| 7,678,131 B2 | 3/2010 | Muller |
| 7,691,121 B2 | 4/2010 | Rosenbluth et al. |
| 7,695,458 B2 | 4/2010 | Belley et al. |
| 7,713,282 B2 | 5/2010 | Frazier et al. |
| 7,722,641 B2 | 5/2010 | van der Burg et al. |
| 7,763,010 B2 | 7/2010 | Evans et al. |
| 7,766,934 B2 | 8/2010 | Pal et al. |
| 7,775,501 B2 | 8/2010 | Kees |
| 7,780,696 B2 | 8/2010 | Daniel et al. |
| 7,815,608 B2 | 10/2010 | Schafersman et al. |
| 7,905,877 B1 | 3/2011 | Oscar et al. |
| 7,905,896 B2 | 3/2011 | Straub |
| 7,938,809 B2 | 5/2011 | Lampropoulos et al. |
| 7,938,820 B2 | 5/2011 | Webster et al. |
| 7,967,790 B2 | 6/2011 | Whiting et al. |
| 7,976,511 B2 | 7/2011 | Fotjik |
| 7,993,302 B2 | 8/2011 | Hebert et al. |
| 7,993,363 B2 | 8/2011 | Demond et al. |
| 8,021,351 B2 | 9/2011 | Boldenow et al. |
| 8,043,313 B2 | 10/2011 | Krolik et al. |
| 8,052,640 B2 | 11/2011 | Fiorella et al. |
| 8,057,496 B2 | 11/2011 | Fischer, Jr. |
| 8,057,497 B1 | 11/2011 | Raju et al. |
| 8,066,757 B2 | 11/2011 | Ferrera et al. |
| 8,070,694 B2 | 12/2011 | Galdonik et al. |
| 8,070,769 B2 | 12/2011 | Broome |
| 8,070,791 B2 | 12/2011 | Ferrera et al. |
| 8,075,510 B2 | 12/2011 | Aklog et al. |
| 8,080,032 B2 | 12/2011 | van der Burg et al. |
| 8,088,140 B2 | 1/2012 | Ferrera et al. |
| 8,092,486 B2 | 1/2012 | Berrada et al. |
| 8,100,935 B2 | 1/2012 | Rosenbluth et al. |
| 8,109,962 B2 | 2/2012 | Pal |
| 8,118,275 B2 | 2/2012 | Mialhe |
| 8,118,829 B2 | 2/2012 | Carrison et al. |
| 8,187,465 B2 | 5/2012 | Nierich |
| 8,191,457 B2 | 6/2012 | Kanner et al. |
| 8,197,493 B2 | 6/2012 | Ferrera et al. |
| 8,246,641 B2 | 8/2012 | Osborne et al. |
| 8,261,648 B1 | 9/2012 | Marchand et al. |
| 8,267,897 B2 | 9/2012 | Wells |
| 8,298,257 B2 | 10/2012 | Sepetka et al. |
| 8,317,748 B2 | 11/2012 | Fiorella et al. |
| 8,337,450 B2 | 12/2012 | Fotjik |

(56) References Cited

U.S. PATENT DOCUMENTS

| | | |
|---|---|---|
| RE43,902 E | 1/2013 | Hopkins et al. |
| 8,343,167 B2 | 1/2013 | Henson |
| 8,357,178 B2 | 1/2013 | Grandfield et al. |
| 8,361,104 B2 | 1/2013 | Jones et al. |
| 8,409,215 B2 | 4/2013 | Sepetka et al. |
| 8,439,858 B2 | 5/2013 | Huang et al. |
| 8,480,708 B2 | 7/2013 | Kassab et al. |
| 8,486,105 B2 | 7/2013 | Demond et al. |
| 8,491,539 B2 | 7/2013 | Fotjik |
| 8,512,352 B2 | 8/2013 | Martin |
| 8,523,897 B2 | 9/2013 | van der Burg et al. |
| 8,529,596 B2 | 9/2013 | Grandfield et al. |
| 8,535,283 B2 | 9/2013 | Heaton et al. |
| 8,535,334 B2 | 9/2013 | Martin |
| 8,535,343 B2 | 9/2013 | van der Burg et al. |
| 8,545,526 B2 | 10/2013 | Martin et al. |
| 8,568,432 B2 | 10/2013 | Straub |
| 8,568,465 B2 | 10/2013 | Freudenthal et al. |
| 8,574,262 B2 | 11/2013 | Ferrera et al. |
| 8,579,915 B2 | 11/2013 | French et al. |
| 8,585,713 B2 | 11/2013 | Ferrera et al. |
| 8,608,754 B2 | 12/2013 | Wensel et al. |
| 8,613,717 B2 | 12/2013 | Aklog et al. |
| 8,632,584 B2 | 1/2014 | Henkes et al. |
| 8,647,367 B2 | 2/2014 | Kassab et al. |
| 8,657,867 B2 | 2/2014 | Dorn et al. |
| 8,696,622 B2 | 4/2014 | Fiorella et al. |
| 8,715,314 B1 | 5/2014 | Janardhan et al. |
| 8,721,714 B2 | 5/2014 | Kelley |
| 8,753,322 B2 | 6/2014 | Hu et al. |
| 8,764,730 B2 | 7/2014 | Taber |
| 8,771,289 B2 | 7/2014 | Mohiuddin et al. |
| 8,777,893 B2 | 7/2014 | Malewicz |
| 8,784,441 B2 | 7/2014 | Rosenbluth et al. |
| 8,784,442 B2 | 7/2014 | Jones et al. |
| 8,784,469 B2 | 7/2014 | Kassab |
| 8,795,305 B2 | 8/2014 | Martin et al. |
| 8,795,317 B2 | 8/2014 | Grandfield et al. |
| 8,795,345 B2 | 8/2014 | Grandfield et al. |
| 8,801,748 B2 | 8/2014 | Martin |
| 8,808,259 B2 | 8/2014 | Walton et al. |
| 8,814,927 B2 | 8/2014 | Shin et al. |
| 8,820,207 B2 | 9/2014 | Marchand et al. |
| 8,826,791 B2 | 9/2014 | Thompson et al. |
| 8,828,044 B2 | 9/2014 | Aggerholm et al. |
| 8,833,224 B2 | 9/2014 | Thompson et al. |
| 8,834,519 B2 | 9/2014 | van der Burg et al. |
| 8,845,621 B2 | 9/2014 | Fotjik |
| 8,852,205 B2 | 10/2014 | Brady et al. |
| 8,852,226 B2 | 10/2014 | Gilson et al. |
| 8,939,991 B2 | 1/2015 | Krolik et al. |
| 8,945,143 B2 | 2/2015 | Ferrera et al. |
| 8,945,172 B2 | 2/2015 | Ferrera et al. |
| 8,956,384 B2 | 2/2015 | Berrada et al. |
| 8,992,504 B2 | 3/2015 | Castella et al. |
| 9,005,172 B2 | 4/2015 | Chung |
| 9,011,551 B2 | 4/2015 | Oral et al. |
| 9,028,401 B1 | 5/2015 | Bacich et al. |
| 9,044,575 B2 | 6/2015 | Beasley et al. |
| 9,072,537 B2 | 7/2015 | Grandfield et al. |
| 9,078,682 B2 | 7/2015 | Lenker et al. |
| 9,101,382 B2 | 8/2015 | Krolik et al. |
| 9,125,683 B2 | 9/2015 | Farhangnia et al. |
| 9,126,016 B2 | 9/2015 | Fulton |
| 9,126,020 B2 | 9/2015 | Farhangnia et al. |
| 9,149,609 B2 | 10/2015 | Ansel et al. |
| 9,155,552 B2 | 10/2015 | Ulm, III |
| 9,161,766 B2 | 10/2015 | Slee et al. |
| 9,168,043 B2 | 10/2015 | van der Burg et al. |
| 9,173,668 B2 | 11/2015 | Ulm, III |
| 9,186,487 B2 | 11/2015 | Dubrul et al. |
| D744,639 S | 12/2015 | Aklog et al. |
| 9,204,887 B2 | 12/2015 | Cully et al. |
| 9,216,277 B2 | 12/2015 | Myers |
| 9,241,669 B2 | 1/2016 | Pugh et al. |
| 9,254,352 B2 | 2/2016 | Kumar et al. |
| 9,259,237 B2 | 2/2016 | Quick et al. |
| 9,265,512 B2 | 2/2016 | Carrison et al. |
| 9,283,066 B2 | 3/2016 | Hopkins et al. |
| 9,301,769 B2 | 4/2016 | Brady et al. |
| 9,351,747 B2 | 5/2016 | Kugler et al. |
| 9,358,037 B2 | 6/2016 | Farhangnia et al. |
| 9,402,938 B2 | 8/2016 | Aklog et al. |
| 9,439,664 B2 | 9/2016 | Sos |
| 9,439,751 B2 | 9/2016 | White et al. |
| 9,456,834 B2 | 10/2016 | Folk |
| 9,463,035 B1 | 10/2016 | Greenhalgh et al. |
| 9,463,036 B2 | 10/2016 | Brady et al. |
| 9,492,635 B2 | 11/2016 | Beasley et al. |
| 9,526,864 B2 | 12/2016 | Quick |
| 9,526,865 B2 | 12/2016 | Quick |
| 9,532,792 B2 | 1/2017 | Galdonik et al. |
| 9,545,464 B2 | 1/2017 | Roche et al. |
| 9,566,073 B2 | 2/2017 | Kassab et al. |
| 9,566,179 B2 | 2/2017 | Andreas et al. |
| 9,566,424 B2 | 2/2017 | Pessin |
| 9,579,116 B1 | 2/2017 | Nguyen et al. |
| 9,581,942 B1 | 2/2017 | Shippert |
| 9,616,213 B2 | 4/2017 | Furnish et al. |
| 9,636,206 B2 | 5/2017 | Nguyen et al. |
| 9,643,035 B2 | 5/2017 | Mastenbroek |
| 9,662,129 B2 | 5/2017 | Galdonik et al. |
| 9,700,332 B2 | 7/2017 | Marchand et al. |
| 9,717,488 B2 | 8/2017 | Kassab et al. |
| 9,717,514 B2 | 8/2017 | Martin et al. |
| 9,717,519 B2 | 8/2017 | Rosenbluth et al. |
| 9,744,024 B2 | 8/2017 | Nguyen et al. |
| 9,757,137 B2 | 9/2017 | Krolik et al. |
| 9,827,084 B2 | 11/2017 | Bonnette et al. |
| 9,827,364 B2 | 11/2017 | Peticca et al. |
| 9,844,386 B2 | 12/2017 | Nguyen et al. |
| 9,844,387 B2 | 12/2017 | Marchand et al. |
| 9,844,643 B2 | 12/2017 | Beasley et al. |
| 9,848,975 B2 | 12/2017 | Hauser |
| 9,849,014 B2 | 12/2017 | Kusleika |
| 9,884,387 B2 | 2/2018 | Plha |
| 9,937,321 B2 | 4/2018 | Welch et al. |
| 9,962,178 B2 | 5/2018 | Greenhalgh et al. |
| 9,980,813 B2 | 5/2018 | Eller |
| 9,999,493 B2 | 6/2018 | Nguyen et al. |
| 10,004,531 B2 | 6/2018 | Rosenbluth et al. |
| 10,010,335 B2 | 7/2018 | Greenhalgh et al. |
| 10,016,206 B1 | 7/2018 | Yang |
| 10,016,266 B2 | 7/2018 | Hauser |
| 10,028,759 B2 | 7/2018 | Wallace et al. |
| 10,045,790 B2 | 8/2018 | Cox et al. |
| 10,058,339 B2 | 8/2018 | Galdonik et al. |
| 10,098,651 B2 | 10/2018 | Marchand et al. |
| 10,130,385 B2 | 11/2018 | Farhangnia et al. |
| 10,130,795 B2 | 11/2018 | Parhangnia et al. |
| 10,179,224 B2 | 1/2019 | Yang et al. |
| 10,183,147 B2 | 1/2019 | Yang et al. |
| 10,183,159 B2 | 1/2019 | Nobles et al. |
| 10,188,829 B2 | 1/2019 | Beasley et al. |
| 10,195,320 B2 | 2/2019 | Fisher et al. |
| 10,226,263 B2 | 3/2019 | Look et al. |
| 10,238,406 B2 | 3/2019 | Cox et al. |
| 10,271,864 B2 | 4/2019 | Greenhalgh et al. |
| 10,327,883 B2 | 6/2019 | Yachia |
| 10,335,186 B2 | 7/2019 | Rosenbluth et al. |
| 10,342,571 B2 | 7/2019 | Marchand et al. |
| 10,349,960 B2 | 7/2019 | Quick |
| 10,383,644 B2 | 8/2019 | Molaei et al. |
| 10,383,983 B2 | 8/2019 | Aklog et al. |
| 10,384,034 B2 | 8/2019 | Carrison et al. |
| 10,426,510 B2 | 10/2019 | Farhangnia et al. |
| 10,426,644 B2 | 10/2019 | Shrivastava et al. |
| 10,441,745 B2 | 10/2019 | Yang et al. |
| 10,456,151 B2 | 10/2019 | Slee et al. |
| 10,456,555 B2 | 10/2019 | Carrison et al. |
| 10,471,234 B2 | 11/2019 | Taber |
| 10,478,535 B2 | 11/2019 | Ogle |
| 10,485,952 B2 | 11/2019 | Carrison et al. |
| 10,492,805 B2 | 12/2019 | Culbert et al. |

(56) References Cited

U.S. PATENT DOCUMENTS

| | | |
|---|---|---|
| 10,524,811 B2 | 1/2020 | Marchand et al. |
| 10,531,883 B1 | 1/2020 | Deville et al. |
| 10,537,710 B2 | 1/2020 | Jalgaonkar et al. |
| 10,561,440 B2 | 2/2020 | Look et al. |
| 10,588,655 B2 | 3/2020 | Rosenbluth et al. |
| 10,648,268 B2 | 5/2020 | Jaffrey et al. |
| 10,661,053 B2 | 5/2020 | Yang et al. |
| 10,695,159 B2 | 6/2020 | Hauser |
| 10,709,471 B2 | 7/2020 | Rosenbluth et al. |
| 10,716,880 B2 | 7/2020 | Culbert et al. |
| 10,729,455 B2 | 8/2020 | Goyal et al. |
| 10,743,907 B2 | 8/2020 | Bruzzi et al. |
| 10,772,636 B2 | 9/2020 | Kassab et al. |
| 10,779,852 B2 | 9/2020 | Bruzzi et al. |
| 10,779,855 B2 | 9/2020 | Garrison |
| 10,792,056 B2 | 10/2020 | Vale et al. |
| 10,799,331 B2 | 10/2020 | Hauser |
| 10,799,671 B2 | 10/2020 | Shimada et al. |
| 10,813,663 B2 | 10/2020 | Bruzzi et al. |
| 10,828,061 B2 | 11/2020 | Bonnette et al. |
| 10,835,711 B2 | 11/2020 | Yang et al. |
| 10,874,421 B2 | 12/2020 | Bruzzi et al. |
| 10,912,577 B2 | 2/2021 | Marchand et al. |
| 10,926,060 B2 | 2/2021 | Stern et al. |
| 10,939,932 B1 | 3/2021 | Yang |
| 10,953,195 B2 | 3/2021 | Jalgaonkar et al. |
| 10,960,114 B2 | 3/2021 | Goisis |
| 10,967,111 B2 | 4/2021 | Iida |
| 10,994,063 B2 | 5/2021 | Fisher et al. |
| 11,000,682 B2 | 5/2021 | Merritt et al. |
| 11,013,523 B2 | 5/2021 | Arad Hadar |
| 11,058,445 B2 | 7/2021 | Cox et al. |
| 11,058,451 B2 | 7/2021 | Marchand et al. |
| 11,065,019 B1 | 7/2021 | Chou et al. |
| 11,065,028 B2 | 7/2021 | Parhangnia et al. |
| 11,147,571 B2 | 10/2021 | Cox et al. |
| 11,147,948 B2 | 10/2021 | Beasley et al. |
| 11,147,949 B2 | 10/2021 | Yang et al. |
| 11,154,314 B2 | 10/2021 | Quick |
| 11,166,703 B2 | 11/2021 | Kassab et al. |
| 11,185,664 B2 | 11/2021 | Carrison et al. |
| 11,197,684 B1 | 12/2021 | Ngo et al. |
| 11,213,356 B2 | 1/2022 | Tanner et al. |
| 11,224,450 B2 | 1/2022 | Chou et al. |
| 11,224,721 B2 | 1/2022 | Carrison et al. |
| 11,253,277 B2 | 2/2022 | Buck et al. |
| 11,259,821 B2 | 3/2022 | Buck et al. |
| 11,266,825 B2 | 3/2022 | Peter et al. |
| 11,278,307 B2 | 3/2022 | Bruzzi et al. |
| 11,305,094 B2 | 4/2022 | Carrison et al. |
| 11,317,939 B2 | 5/2022 | Bruzzi et al. |
| 11,337,714 B2 | 5/2022 | Ferrera et al. |
| 11,383,064 B2 | 7/2022 | Carrison et al. |
| 11,395,903 B2 | 7/2022 | Carrison et al. |
| 11,406,418 B2 | 8/2022 | Bruzzi et al. |
| 11,406,801 B2 | 8/2022 | Fojtik et al. |
| 11,419,621 B2 | 8/2022 | Goyal et al. |
| 11,433,218 B2 | 9/2022 | Quick et al. |
| 11,439,799 B2 | 9/2022 | Buck et al. |
| 11,457,936 B2 | 10/2022 | Buck et al. |
| 11,478,262 B2 | 10/2022 | Ngo et al. |
| 11,529,158 B2 | 12/2022 | Hauser |
| 11,541,184 B2 | 1/2023 | Han et al. |
| 11,553,935 B2 | 1/2023 | Buck et al. |
| 11,553,942 B2 | 1/2023 | Bonnette et al. |
| 11,554,005 B2 | 1/2023 | Merritt et al. |
| 11,559,382 B2 | 1/2023 | Merritt et al. |
| 11,576,691 B2 | 2/2023 | Chou et al. |
| 11,589,880 B2 | 2/2023 | Aklog et al. |
| 11,596,768 B2 | 3/2023 | Stern et al. |
| 11,607,483 B2 | 3/2023 | Iida |
| 11,633,272 B2 | 4/2023 | Buck et al. |
| 11,638,637 B2 | 5/2023 | Buck et al. |
| 11,642,209 B2 | 5/2023 | Merritt et al. |
| 11,648,028 B2 | 5/2023 | Rosenbluth et al. |
| 11,672,561 B2 | 6/2023 | Look et al. |
| 11,678,905 B2 | 6/2023 | Look et al. |
| 11,697,011 B2 | 7/2023 | Merritt et al. |
| 11,697,012 B2 | 7/2023 | Merritt et al. |
| 11,724,052 B2 | 8/2023 | White et al. |
| 11,730,925 B2 | 8/2023 | Saadat et al. |
| 11,744,691 B2 | 9/2023 | Merritt et al. |
| 11,806,033 B2 | 11/2023 | Marchand et al. |
| 11,819,228 B2 | 11/2023 | Buck et al. |
| 11,832,837 B2 | 12/2023 | Hauser |
| 11,832,838 B2 | 12/2023 | Hauser |
| 11,833,023 B2 | 12/2023 | Hauser |
| 11,839,393 B2 | 12/2023 | Hauser |
| 11,844,921 B2 | 12/2023 | Merritt et al. |
| 11,849,963 B2 | 12/2023 | Quick |
| 11,865,291 B2 | 1/2024 | Merritt et al. |
| 11,890,180 B2 | 2/2024 | Merritt et al. |
| 11,918,243 B2 | 3/2024 | Marchand et al. |
| 11,918,244 B2 | 3/2024 | Marchand et al. |
| 11,925,369 B2 | 3/2024 | Hauser |
| 11,937,834 B2 | 3/2024 | Dinh |
| 11,937,838 B2 | 3/2024 | Cox et al. |
| 11,963,861 B2 | 4/2024 | Strauss et al. |
| 11,969,178 B2 | 4/2024 | Hauser |
| 11,969,331 B2 | 4/2024 | Merritt et al. |
| 11,969,332 B2 | 4/2024 | Merritt et al. |
| 11,969,333 B2 | 4/2024 | Merritt et al. |
| 11,974,909 B2 | 5/2024 | Merritt et al. |
| 11,974,910 B2 | 5/2024 | Merritt et al. |
| 11,980,537 B2 | 5/2024 | Merritt et al. |
| 11,986,382 B2 | 5/2024 | Merritt et al. |
| 11,998,436 B2 | 6/2024 | Merritt et al. |
| 12,016,580 B2 | 6/2024 | Quick et al. |
| 12,023,057 B2 | 7/2024 | Hauser |
| 12,102,343 B2 | 10/2024 | Quick |
| 12,109,384 B2 | 10/2024 | Merritt et al. |
| 12,156,669 B2 | 12/2024 | Quick et al. |
| 12,239,333 B2 | 3/2025 | Quick et al. |
| 12,251,120 B2 | 3/2025 | Marchand et al. |
| 12,274,459 B2 | 4/2025 | Dihn |
| 12,310,608 B2 | 5/2025 | Marchand et al. |
| 2001/0004699 A1 | 6/2001 | Gittings et al. |
| 2001/0031981 A1 | 10/2001 | Evans et al. |
| 2001/0041881 A1 | 11/2001 | Sarge et al. |
| 2001/0041909 A1 | 11/2001 | Tsugita et al. |
| 2001/0049486 A1 | 12/2001 | Evans et al. |
| 2001/0049517 A1 | 12/2001 | Zadno-azizi et al. |
| 2001/0051810 A1 | 12/2001 | Dubrul et al. |
| 2002/0022858 A1 | 2/2002 | Demond et al. |
| 2002/0022859 A1 | 2/2002 | Hogendijk |
| 2002/0026211 A1 | 2/2002 | Khosravi et al. |
| 2002/0032455 A1 | 3/2002 | Boock et al. |
| 2002/0049452 A1 | 4/2002 | Kurz et al. |
| 2002/0095161 A1 | 7/2002 | Dhindsa |
| 2002/0095171 A1 | 7/2002 | Belef |
| 2002/0111648 A1 | 8/2002 | Kusleika et al. |
| 2002/0120277 A1 | 8/2002 | Hauschild et al. |
| 2002/0147458 A1 | 10/2002 | Hiblar et al. |
| 2002/0151918 A1 | 10/2002 | Lafontaine et al. |
| 2002/0156457 A1 | 10/2002 | Fisher |
| 2002/0161392 A1 | 10/2002 | Dubrul |
| 2002/0169474 A1 | 11/2002 | Kusleika |
| 2002/0173819 A1 | 11/2002 | Leeflang et al. |
| 2002/0188276 A1 | 12/2002 | Evans et al. |
| 2003/0004536 A1 | 1/2003 | Boylan et al. |
| 2003/0023263 A1 | 1/2003 | Krolik et al. |
| 2003/0069601 A1 | 4/2003 | Nowakowski et al. |
| 2003/0083693 A1 | 5/2003 | Daniel et al. |
| 2003/0100919 A1 | 5/2003 | Hopkins et al. |
| 2003/0114875 A1 | 6/2003 | Sjostrom |
| 2003/0116731 A1 | 6/2003 | Hartley |
| 2003/0125663 A1 | 7/2003 | Coleman et al. |
| 2003/0135151 A1 | 7/2003 | Deng |
| 2003/0135230 A1 | 7/2003 | Massey et al. |
| 2003/0135258 A1 | 7/2003 | Andreas et al. |
| 2003/0144672 A1 | 7/2003 | Gellman et al. |
| 2003/0153873 A1 | 8/2003 | Luther et al. |
| 2003/0153973 A1 | 8/2003 | Soun et al. |
| 2003/0168068 A1 | 9/2003 | Poole et al. |

(56) References Cited

U.S. PATENT DOCUMENTS

| | | |
|---|---|---|
| 2003/0176884 A1 | 9/2003 | Berrada et al. |
| 2003/0191425 A1 | 10/2003 | Rosenblatt et al. |
| 2003/0191516 A1 | 10/2003 | Weldon et al. |
| 2003/0208224 A1 | 11/2003 | Broome |
| 2003/0216774 A1 | 11/2003 | Larson |
| 2003/0225379 A1 | 12/2003 | Schaffer et al. |
| 2004/0019310 A1 | 1/2004 | Hogendijk |
| 2004/0039351 A1 | 2/2004 | Barrett |
| 2004/0039412 A1 | 2/2004 | Isshiki et al. |
| 2004/0068288 A1 | 4/2004 | Palmer et al. |
| 2004/0073243 A1 | 4/2004 | Sepetka et al. |
| 2004/0098033 A1 | 5/2004 | Leeflang et al. |
| 2004/0102807 A1 | 5/2004 | Kusleika et al. |
| 2004/0122359 A1 | 6/2004 | Wenz et al. |
| 2004/0127936 A1 | 7/2004 | Salahieh et al. |
| 2004/0133232 A1 | 7/2004 | Rosenbluth et al. |
| 2004/0138525 A1 | 7/2004 | Saadat et al. |
| 2004/0138692 A1 | 7/2004 | Phung et al. |
| 2004/0167567 A1 | 8/2004 | Cano et al. |
| 2004/0199201 A1 | 10/2004 | Kellett et al. |
| 2004/0199202 A1 | 10/2004 | Dubrul et al. |
| 2004/0260344 A1 | 12/2004 | Lyons et al. |
| 2004/0267272 A1 | 12/2004 | Henniges et al. |
| 2005/0004534 A1 | 1/2005 | Lockwood et al. |
| 2005/0033172 A1 | 2/2005 | Dubrul et al. |
| 2005/0038468 A1 | 2/2005 | Panetta et al. |
| 2005/0054995 A1 | 3/2005 | Barzell et al. |
| 2005/0055047 A1 | 3/2005 | Greenhalgh |
| 2005/0080398 A1 | 4/2005 | Markel et al. |
| 2005/0085769 A1 | 4/2005 | MacMahon et al. |
| 2005/0085826 A1 | 4/2005 | Nair et al. |
| 2005/0085846 A1 | 4/2005 | Carrison et al. |
| 2005/0085849 A1 | 4/2005 | Sepetka et al. |
| 2005/0119668 A1 | 6/2005 | Teague et al. |
| 2005/0131387 A1 | 6/2005 | Pursley |
| 2005/0177132 A1 | 8/2005 | Lentz et al. |
| 2005/0187570 A1 | 8/2005 | Nguyen et al. |
| 2005/0203605 A1 | 9/2005 | Dolan |
| 2005/0283165 A1 | 12/2005 | Gadberry |
| 2005/0283166 A1 | 12/2005 | Greenhalgh et al. |
| 2005/0283186 A1 | 12/2005 | Berrada et al. |
| 2006/0020286 A1 | 1/2006 | Niermann |
| 2006/0042786 A1 | 3/2006 | West |
| 2006/0047286 A1 | 3/2006 | West |
| 2006/0074401 A1 | 4/2006 | Ross |
| 2006/0079787 A1 | 4/2006 | Whiting et al. |
| 2006/0085952 A1 | 4/2006 | Kaneko et al. |
| 2006/0089533 A1 | 4/2006 | Ziegler et al. |
| 2006/0100662 A1 | 5/2006 | Daniel et al. |
| 2006/0149219 A1 | 7/2006 | Calderon |
| 2006/0155305 A1 | 7/2006 | Freudenthal et al. |
| 2006/0173525 A1 | 8/2006 | Behl et al. |
| 2006/0195137 A1 | 8/2006 | Sepetka et al. |
| 2006/0200221 A1 | 9/2006 | Malewicz |
| 2006/0217664 A1 | 9/2006 | Hattler et al. |
| 2006/0224177 A1 | 10/2006 | Finitsis |
| 2006/0229645 A1 | 10/2006 | Bonnette et al. |
| 2006/0247500 A1 | 11/2006 | Voegele et al. |
| 2006/0253145 A1 | 11/2006 | Lucas |
| 2006/0264905 A1 | 11/2006 | Eskridge et al. |
| 2006/0276874 A1 | 12/2006 | Wilson et al. |
| 2006/0282111 A1 | 12/2006 | Morsi |
| 2006/0293696 A1 | 12/2006 | Fahey et al. |
| 2007/0010787 A1 | 1/2007 | Hackett et al. |
| 2007/0038225 A1 | 2/2007 | Osborne |
| 2007/0060911 A1 | 3/2007 | Webster et al. |
| 2007/0093744 A1 | 4/2007 | Elmaleh |
| 2007/0112374 A1 | 5/2007 | Paul, Jr. et al. |
| 2007/0118165 A1 | 5/2007 | DeMello et al. |
| 2007/0149996 A1 | 6/2007 | Coughlin |
| 2007/0161963 A1 | 7/2007 | Smalling |
| 2007/0179513 A1 | 8/2007 | Deutsch |
| 2007/0191866 A1 | 8/2007 | Palmer et al. |
| 2007/0198028 A1 | 8/2007 | Miloslavski et al. |
| 2007/0208361 A1 | 9/2007 | Okushi et al. |
| 2007/0208367 A1 | 9/2007 | Fiorella et al. |
| 2007/0213753 A1 | 9/2007 | Waller |
| 2007/0213765 A1 | 9/2007 | Adams et al. |
| 2007/0233043 A1 | 10/2007 | Dayton et al. |
| 2007/0255252 A1 | 11/2007 | Mehta |
| 2007/0288054 A1 | 12/2007 | Tanaka et al. |
| 2008/0015541 A1 | 1/2008 | Rosenbluth et al. |
| 2008/0033467 A1 | 2/2008 | Miyamoto et al. |
| 2008/0087853 A1 | 4/2008 | Kees |
| 2008/0088055 A1 | 4/2008 | Ross |
| 2008/0157017 A1 | 7/2008 | Macatangay et al. |
| 2008/0167678 A1 | 7/2008 | Morsi |
| 2008/0183136 A1 | 7/2008 | Lenker et al. |
| 2008/0228209 A1 | 9/2008 | DeMello et al. |
| 2008/0234715 A1 | 9/2008 | Pesce et al. |
| 2008/0234722 A1 | 9/2008 | Bonnette et al. |
| 2008/0262528 A1 | 10/2008 | Martin |
| 2008/0269798 A1 | 10/2008 | Ramzipoor et al. |
| 2008/0294096 A1 | 11/2008 | Uber, III et al. |
| 2008/0300466 A1 | 12/2008 | Gresham |
| 2008/0312681 A1 | 12/2008 | Ansel et al. |
| 2009/0018550 A1 | 1/2009 | Poll |
| 2009/0018566 A1 | 1/2009 | Escudero et al. |
| 2009/0054918 A1 | 2/2009 | Henson |
| 2009/0062841 A1 | 3/2009 | Amplatz et al. |
| 2009/0069828 A1 | 3/2009 | Martin et al. |
| 2009/0076417 A1 | 3/2009 | Jones |
| 2009/0082857 A1 | 3/2009 | Lashinski et al. |
| 2009/0160112 A1 | 6/2009 | Ostrovsky |
| 2009/0163846 A1 | 6/2009 | Aklog et al. |
| 2009/0182362 A1 | 7/2009 | Thompson et al. |
| 2009/0192495 A1 | 7/2009 | Ostrovsky et al. |
| 2009/0281525 A1 | 11/2009 | Harding et al. |
| 2009/0292307 A1 | 11/2009 | Razack |
| 2009/0299393 A1 | 12/2009 | Martin et al. |
| 2009/0312786 A1 | 12/2009 | Trask et al. |
| 2010/0016837 A1 | 1/2010 | Howat |
| 2010/0030256 A1 | 2/2010 | Dubrul et al. |
| 2010/0042136 A1 | 2/2010 | Berrada et al. |
| 2010/0087844 A1 | 4/2010 | Fischer, Jr. |
| 2010/0087850 A1 | 4/2010 | Razack |
| 2010/0094201 A1 | 4/2010 | Mallaby |
| 2010/0106081 A1 | 4/2010 | Brandeis |
| 2010/0114017 A1 | 5/2010 | Lenker et al. |
| 2010/0114113 A1 | 5/2010 | Dubrul et al. |
| 2010/0121312 A1 | 5/2010 | Gielenz et al. |
| 2010/0137846 A1 | 6/2010 | Desaietal |
| 2010/0190156 A1 | 7/2010 | Van Wordragen et al. |
| 2010/0204712 A1 | 8/2010 | Mallaby |
| 2010/0217276 A1 | 8/2010 | Garrison et al. |
| 2010/0228221 A1 | 9/2010 | Kassab et al. |
| 2010/0249815 A1 | 9/2010 | Jantzen et al. |
| 2010/0268264 A1 | 10/2010 | Bonnette et al. |
| 2010/0297577 A1 | 11/2010 | Cohen |
| 2010/0318178 A1 | 12/2010 | Rapaport et al. |
| 2011/0009950 A1 | 1/2011 | Grandfield et al. |
| 2011/0034986 A1 | 2/2011 | Chou et al. |
| 2011/0034987 A1 | 2/2011 | Kennedy |
| 2011/0054405 A1 | 3/2011 | Whiting et al. |
| 2011/0060212 A1 | 3/2011 | Slee et al. |
| 2011/0071503 A1 | 3/2011 | Takagi et al. |
| 2011/0087173 A1 | 4/2011 | Sibbitt, Jr. et al. |
| 2011/0118817 A1 | 5/2011 | Gunderson et al. |
| 2011/0125181 A1 | 5/2011 | Brady et al. |
| 2011/0144592 A1 | 6/2011 | Wong et al. |
| 2011/0152823 A1 | 6/2011 | Mohiuddin et al. |
| 2011/0152889 A1 | 6/2011 | Ashland |
| 2011/0152993 A1 | 6/2011 | Marchand et al. |
| 2011/0160742 A1 | 6/2011 | Ferrera et al. |
| 2011/0160763 A1 | 6/2011 | Ferrera et al. |
| 2011/0190806 A1 | 8/2011 | Wittens |
| 2011/0196309 A1 | 8/2011 | Wells |
| 2011/0196414 A1 | 8/2011 | Porter et al. |
| 2011/0213290 A1 | 9/2011 | Chin et al. |
| 2011/0213403 A1 | 9/2011 | Aboytes |
| 2011/0224707 A1 | 9/2011 | Miloslavski et al. |
| 2011/0245807 A1 | 10/2011 | Sakata et al. |
| 2011/0251629 A1 | 10/2011 | Galdonik et al. |
| 2011/0264132 A1 | 10/2011 | Strauss et al. |

(56) References Cited

U.S. PATENT DOCUMENTS

| | | |
|---|---|---|
| 2011/0264133 A1 | 10/2011 | Hanlon et al. |
| 2011/0265681 A1 | 11/2011 | Allen et al. |
| 2011/0288529 A1 | 11/2011 | Fulton |
| 2011/0288572 A1 | 11/2011 | Martin |
| 2011/0309037 A1 | 12/2011 | Lee |
| 2011/0319917 A1 | 12/2011 | Ferrera et al. |
| 2012/0059309 A1 | 3/2012 | di Palma et al. |
| 2012/0059356 A1 | 3/2012 | di Palma et al. |
| 2012/0083824 A1 | 4/2012 | Berrada et al. |
| 2012/0083868 A1 | 4/2012 | Shrivastava |
| 2012/0089216 A1 | 4/2012 | Rapaport et al. |
| 2012/0095448 A1 | 4/2012 | Kajii |
| 2012/0101480 A1 | 4/2012 | Ingle et al. |
| 2012/0101510 A1 | 4/2012 | Lenker et al. |
| 2012/0109109 A1 | 5/2012 | Kajii |
| 2012/0138832 A1 | 6/2012 | Townsend |
| 2012/0143123 A1 | 6/2012 | Agnew |
| 2012/0143239 A1 | 6/2012 | Aklog et al. |
| 2012/0165919 A1 | 6/2012 | Cox et al. |
| 2012/0172918 A1 | 7/2012 | Fifer et al. |
| 2012/0179181 A1 | 7/2012 | Straub et al. |
| 2012/0197277 A1 | 8/2012 | Stinis |
| 2012/0232655 A1 | 9/2012 | Lorrison et al. |
| 2012/0271105 A1 | 10/2012 | Nakamura et al. |
| 2012/0271231 A1 | 10/2012 | Agrawal |
| 2012/0277788 A1 | 11/2012 | Cattaneo |
| 2012/0310166 A1 | 12/2012 | Huff |
| 2013/0030460 A1 | 1/2013 | Marks et al. |
| 2013/0035628 A1 | 2/2013 | Garrison et al. |
| 2013/0046332 A1 | 2/2013 | Jones et al. |
| 2013/0066348 A1 | 3/2013 | Fiorella et al. |
| 2013/0092012 A1 | 4/2013 | Marchand et al. |
| 2013/0096571 A1 | 4/2013 | Massicotte et al. |
| 2013/0102996 A1 | 4/2013 | Strauss |
| 2013/0116708 A1 | 5/2013 | Ziniti et al. |
| 2013/0116721 A1 | 5/2013 | Takagi et al. |
| 2013/0123705 A1 | 5/2013 | Holm et al. |
| 2013/0126559 A1 | 5/2013 | Cowan et al. |
| 2013/0144326 A1 | 6/2013 | Brady et al. |
| 2013/0150793 A1 | 6/2013 | Beissel et al. |
| 2013/0165871 A1 | 6/2013 | Fiorella et al. |
| 2013/0184703 A1 | 7/2013 | Shireman et al. |
| 2013/0190701 A1 | 7/2013 | Kirn |
| 2013/0197454 A1 | 8/2013 | Shibata et al. |
| 2013/0197567 A1 | 8/2013 | Brady et al. |
| 2013/0204297 A1 | 8/2013 | Melsheimer et al. |
| 2013/0226196 A1 | 8/2013 | Smith |
| 2013/0270161 A1 | 10/2013 | Kumar et al. |
| 2013/0281788 A1 | 10/2013 | Garrison |
| 2013/0289608 A1 | 10/2013 | Tanaka et al. |
| 2013/0317589 A1 | 11/2013 | Martin et al. |
| 2013/0345739 A1 | 12/2013 | Brady et al. |
| 2014/0005712 A1 | 1/2014 | Martin |
| 2014/0005713 A1 | 1/2014 | Bowman |
| 2014/0005715 A1 | 1/2014 | Castella et al. |
| 2014/0005717 A1 | 1/2014 | Martin et al. |
| 2014/0025048 A1 | 1/2014 | Ward |
| 2014/0031856 A1 | 1/2014 | Martin |
| 2014/0046133 A1 | 2/2014 | Nakamura et al. |
| 2014/0046243 A1 | 2/2014 | Ray et al. |
| 2014/0052161 A1 | 2/2014 | Cully et al. |
| 2014/0074144 A1 | 3/2014 | Shrivastava et al. |
| 2014/0121672 A1 | 5/2014 | Folk |
| 2014/0155830 A1 | 6/2014 | Bonnette et al. |
| 2014/0155908 A1 | 6/2014 | Rosenbluth et al. |
| 2014/0155980 A1 | 6/2014 | Turjman |
| 2014/0163615 A1 | 6/2014 | Gadlage et al. |
| 2014/0180055 A1 | 6/2014 | Glynn et al. |
| 2014/0180397 A1 | 6/2014 | Gerberding et al. |
| 2014/0188127 A1 | 7/2014 | Dubrul et al. |
| 2014/0188143 A1 | 7/2014 | Martin et al. |
| 2014/0222070 A1 | 8/2014 | Belson et al. |
| 2014/0236219 A1 | 8/2014 | Dubrul et al. |
| 2014/0243882 A1 | 8/2014 | Ma |
| 2014/0257253 A1 | 9/2014 | Jemison |
| 2014/0257363 A1 | 9/2014 | Lippert |
| 2014/0276403 A1 | 9/2014 | Follmer et al. |
| 2014/0276592 A1 | 9/2014 | Mottola et al. |
| 2014/0296868 A1 | 10/2014 | Garrison et al. |
| 2014/0303658 A1 | 10/2014 | Bonnette et al. |
| 2014/0318354 A1 | 10/2014 | Thompson et al. |
| 2014/0324091 A1 | 10/2014 | Rosenbluth et al. |
| 2014/0330286 A1 | 11/2014 | Wallace et al. |
| 2014/0336691 A1 | 11/2014 | Jones et al. |
| 2014/0343593 A1 | 11/2014 | Chin et al. |
| 2014/0364896 A1 | 12/2014 | Consigny |
| 2014/0371779 A1 | 12/2014 | Vale et al. |
| 2015/0005781 A1 | 1/2015 | Lund-Clausen et al. |
| 2015/0005792 A1 | 1/2015 | Ahn |
| 2015/0018859 A1 | 1/2015 | Quick et al. |
| 2015/0018860 A1 | 1/2015 | Quick |
| 2015/0018929 A1 | 1/2015 | Martin et al. |
| 2015/0025555 A1 | 1/2015 | Sos |
| 2015/0032144 A1 | 1/2015 | Holloway |
| 2015/0059908 A1 | 3/2015 | Mollen |
| 2015/0088190 A1 | 3/2015 | Jensen |
| 2015/0119862 A1 | 4/2015 | Cajamarca et al. |
| 2015/0127035 A1 | 5/2015 | Trapp et al. |
| 2015/0133990 A1 | 5/2015 | Davidson |
| 2015/0150672 A1 | 6/2015 | Ma |
| 2015/0164523 A1 | 6/2015 | Brady et al. |
| 2015/0164666 A1 | 6/2015 | Johnson et al. |
| 2015/0173782 A1 | 6/2015 | Garrison et al. |
| 2015/0190155 A1 | 7/2015 | Ulm, III |
| 2015/0190156 A1 | 7/2015 | Ulm, III |
| 2015/0196380 A1 | 7/2015 | Berrada et al. |
| 2015/0196744 A1 | 7/2015 | Aboytes |
| 2015/0209058 A1 | 7/2015 | Ferrera et al. |
| 2015/0209165 A1 | 7/2015 | Grandfield et al. |
| 2015/0238207 A1 | 8/2015 | Cox et al. |
| 2015/0250578 A1 | 9/2015 | Cook et al. |
| 2015/0265299 A1 | 9/2015 | Cooper et al. |
| 2015/0283309 A1 | 10/2015 | Look et al. |
| 2015/0305756 A1 | 10/2015 | Rosenbluth |
| 2015/0305759 A1 | 10/2015 | St. George et al. |
| 2015/0305859 A1 | 10/2015 | Eller |
| 2015/0314050 A1 | 11/2015 | Beer |
| 2015/0327875 A1 | 11/2015 | Look et al. |
| 2015/0352325 A1 | 12/2015 | Quick |
| 2015/0360001 A1 | 12/2015 | Quick |
| 2015/0366690 A1 | 12/2015 | Lumauig |
| 2015/0374391 A1 | 12/2015 | Quick |
| 2016/0008014 A1 | 1/2016 | Rosenbluth et al. |
| 2016/0022293 A1 | 1/2016 | Dubrul et al. |
| 2016/0030708 A1 | 2/2016 | Casiello et al. |
| 2016/0038267 A1 | 2/2016 | Allen et al. |
| 2016/0058540 A1 | 3/2016 | Don Michael |
| 2016/0074627 A1 | 3/2016 | Cottone |
| 2016/0106353 A1 | 4/2016 | Schuetz et al. |
| 2016/0106448 A1 | 4/2016 | Brady et al. |
| 2016/0106449 A1 | 4/2016 | Brady et al. |
| 2016/0113663 A1 | 4/2016 | Brady et al. |
| 2016/0113664 A1 | 4/2016 | Brady et al. |
| 2016/0113665 A1 | 4/2016 | Brady et al. |
| 2016/0113666 A1 | 4/2016 | Quick |
| 2016/0128857 A1 | 5/2016 | Kao |
| 2016/0135829 A1 | 5/2016 | Holochwost et al. |
| 2016/0143721 A1 | 5/2016 | Rosenbluth |
| 2016/0151605 A1 | 6/2016 | Welch et al. |
| 2016/0192912 A1 | 7/2016 | Kassab et al. |
| 2016/0206344 A1 | 7/2016 | Bruzzi et al. |
| 2016/0220741 A1 | 8/2016 | Garrison et al. |
| 2016/0220795 A1 | 8/2016 | Korkuch et al. |
| 2016/0228134 A1 | 8/2016 | Martin et al. |
| 2016/0262774 A1 | 9/2016 | Honda |
| 2016/0262790 A1 | 9/2016 | Rosenbluth et al. |
| 2016/0287276 A1 | 10/2016 | Cox et al. |
| 2016/0367285 A1 | 12/2016 | Sos |
| 2017/0014560 A1 | 1/2017 | Minskoff et al. |
| 2017/0021130 A1 | 1/2017 | Dye |
| 2017/0035445 A1 | 2/2017 | Nguyen et al. |
| 2017/0037548 A1 | 2/2017 | Lee |
| 2017/0042571 A1 | 2/2017 | Levi |
| 2017/0049942 A1 | 2/2017 | Conlan et al. |

(56) References Cited

U.S. PATENT DOCUMENTS

| | | |
|---|---|---|
| 2017/0056032 A1 | 3/2017 | Look et al. |
| 2017/0058623 A1 | 3/2017 | Jaffrey et al. |
| 2017/0079672 A1 | 3/2017 | Quick |
| 2017/0086864 A1 | 3/2017 | Greenhalgh et al. |
| 2017/0100142 A1 | 4/2017 | Look et al. |
| 2017/0105743 A1 | 4/2017 | Vale et al. |
| 2017/0105745 A1 | 4/2017 | Rosenbluth et al. |
| 2017/0112513 A1 | 4/2017 | Marchand et al. |
| 2017/0112514 A1 | 4/2017 | Marchand et al. |
| 2017/0113005 A1 | 4/2017 | Linder et al. |
| 2017/0143359 A1 | 5/2017 | Nguyen et al. |
| 2017/0143880 A1 | 5/2017 | Luxon et al. |
| 2017/0143938 A1 | 5/2017 | Ogle et al. |
| 2017/0165468 A1 | 6/2017 | Nobles et al. |
| 2017/0172591 A1 | 6/2017 | Ulm, III |
| 2017/0189041 A1 | 7/2017 | Cox et al. |
| 2017/0196576 A1 | 7/2017 | Long et al. |
| 2017/0209162 A1 | 7/2017 | Sperry et al. |
| 2017/0233908 A1 | 8/2017 | Kroczynski et al. |
| 2017/0238951 A1 | 8/2017 | Yang et al. |
| 2017/0252057 A1 | 9/2017 | Bonnette et al. |
| 2017/0265878 A1 | 9/2017 | Marchand et al. |
| 2017/0281204 A1 | 10/2017 | Garrison et al. |
| 2017/0303939 A1 | 10/2017 | Greenhalgh et al. |
| 2017/0303942 A1 | 10/2017 | Greenhalgh et al. |
| 2017/0303947 A1 | 10/2017 | Greenhalgh et al. |
| 2017/0303948 A1 | 10/2017 | Wallace et al. |
| 2017/0319221 A1 | 11/2017 | Chu |
| 2017/0325839 A1 | 11/2017 | Rosenbluth et al. |
| 2017/0340867 A1 | 11/2017 | Accisano, II |
| 2017/0348014 A1 | 12/2017 | Wallace et al. |
| 2018/0014840 A1 | 1/2018 | Panian |
| 2018/0042623 A1 | 2/2018 | Batiste |
| 2018/0042624 A1 | 2/2018 | Greenhalgh et al. |
| 2018/0042626 A1 | 2/2018 | Greenhalgh et al. |
| 2018/0055999 A1 | 3/2018 | Bare et al. |
| 2018/0064453 A1 | 3/2018 | Garrison et al. |
| 2018/0064454 A1 | 3/2018 | Losordo et al. |
| 2018/0070968 A1 | 3/2018 | Wallace et al. |
| 2018/0078707 A1 | 3/2018 | Loonan |
| 2018/0092652 A1 | 4/2018 | Marchand et al. |
| 2018/0104404 A1 | 4/2018 | Ngo-Chu |
| 2018/0105963 A1 | 4/2018 | Quick |
| 2018/0125512 A1 | 5/2018 | Nguyen et al. |
| 2018/0184912 A1 | 7/2018 | Al-Ali |
| 2018/0193043 A1 | 7/2018 | Marchand et al. |
| 2018/0235742 A1 | 8/2018 | Fields et al. |
| 2018/0236205 A1 | 8/2018 | Krautkremer et al. |
| 2018/0250498 A1 | 9/2018 | Stern et al. |
| 2018/0256177 A1 | 9/2018 | Cooper et al. |
| 2018/0256178 A1 | 9/2018 | Cox et al. |
| 2018/0280623 A1 | 10/2018 | Pilkington et al. |
| 2018/0289394 A1 | 10/2018 | Shah |
| 2018/0296240 A1 | 10/2018 | Rosenbluth et al. |
| 2018/0338770 A1 | 11/2018 | Mogi et al. |
| 2018/0339130 A1 | 11/2018 | Ogle |
| 2018/0344339 A1 | 12/2018 | Cox et al. |
| 2018/0353195 A1 | 12/2018 | Sigmon, Jr. et al. |
| 2018/0361116 A1 | 12/2018 | Quick et al. |
| 2019/0000492 A1 | 1/2019 | Casey et al. |
| 2019/0015298 A1 | 1/2019 | Beatty et al. |
| 2019/0046219 A1 | 2/2019 | Marchand et al. |
| 2019/0070401 A1 | 3/2019 | Merritt et al. |
| 2019/0117244 A1 | 4/2019 | Wallace et al. |
| 2019/0133622 A1 | 5/2019 | Wallace et al. |
| 2019/0133623 A1 | 5/2019 | Wallace et al. |
| 2019/0133624 A1 | 5/2019 | Wallace et al. |
| 2019/0133625 A1 | 5/2019 | Wallace et al. |
| 2019/0133626 A1 | 5/2019 | Wallace et al. |
| 2019/0133627 A1 | 5/2019 | Wallace et al. |
| 2019/0150959 A1 | 5/2019 | Cox et al. |
| 2019/0216476 A1 | 7/2019 | Barry et al. |
| 2019/0223893 A1 | 7/2019 | Gilvarry et al. |
| 2019/0231373 A1 | 8/2019 | Quick |
| 2019/0239910 A1 | 8/2019 | Brady et al. |
| 2019/0321071 A1 | 10/2019 | Marchand et al. |
| 2019/0328411 A1 | 10/2019 | Vale et al. |
| 2019/0336142 A1 | 11/2019 | Torrie et al. |
| 2019/0336148 A1 | 11/2019 | Greenhalgh et al. |
| 2019/0365395 A1 | 12/2019 | Tran et al. |
| 2019/0366036 A1 | 12/2019 | Jalgaonkar et al. |
| 2019/0366049 A1 | 12/2019 | Hannon et al. |
| 2019/0374239 A1 | 12/2019 | Martin et al. |
| 2020/0009301 A1 | 1/2020 | Yee |
| 2020/0022711 A1 | 1/2020 | Look et al. |
| 2020/0030579 A1 | 1/2020 | Taber |
| 2020/0046368 A1 | 2/2020 | Merritt et al. |
| 2020/0046940 A1 | 2/2020 | Carrison et al. |
| 2020/0054861 A1 | 2/2020 | Korkuch et al. |
| 2020/0069889 A1 | 3/2020 | Lin |
| 2020/0078029 A1 | 3/2020 | Hansen et al. |
| 2020/0113412 A1 | 4/2020 | Jensen |
| 2020/0121334 A1 | 4/2020 | Galdonik et al. |
| 2020/0129741 A1 | 4/2020 | Kawwas et al. |
| 2020/0187596 A1 | 6/2020 | Krout et al. |
| 2020/0324079 A1 | 10/2020 | Jalgaonkar et al. |
| 2021/0022843 A1 | 1/2021 | Hauser |
| 2021/0038385 A1 | 2/2021 | Popp et al. |
| 2021/0113224 A1 | 4/2021 | Dinh |
| 2021/0128182 A1 | 5/2021 | Teigen et al. |
| 2021/0128184 A1* | 5/2021 | Fulkerson ............ A61B 17/221 |
| 2021/0128185 A1 | 5/2021 | Nguyen et al. |
| 2021/0137667 A1 | 5/2021 | Sonnette et al. |
| 2021/0138193 A1 | 5/2021 | Garrison et al. |
| 2021/0138194 A1 | 5/2021 | Carrison et al. |
| 2021/0154433 A1 | 5/2021 | Casey et al. |
| 2021/0186537 A1 | 6/2021 | Buck et al. |
| 2021/0186541 A1 | 6/2021 | Thress |
| 2021/0205577 A1 | 7/2021 | Jalgaonkar et al. |
| 2021/0236148 A1 | 8/2021 | Marchand et al. |
| 2021/0290925 A1 | 9/2021 | Merritt et al. |
| 2021/0315596 A1 | 10/2021 | Buck et al. |
| 2021/0315598 A1 | 10/2021 | Buck et al. |
| 2021/0316127 A1 | 10/2021 | Buck et al. |
| 2021/0330344 A1 | 10/2021 | Rosenbluth et al. |
| 2021/0378692 A1* | 12/2021 | Xiang ................ A61B 17/221 |
| 2021/0378694 A1 | 12/2021 | Thress et al. |
| 2021/0393278 A1 | 12/2021 | O'Malley et al. |
| 2021/0404464 A1 | 12/2021 | Patoskie |
| 2022/0000505 A1 | 1/2022 | Hauser |
| 2022/0000506 A1 | 1/2022 | Hauser |
| 2022/0000507 A1 | 1/2022 | Hauser |
| 2022/0015798 A1 | 1/2022 | Marchand et al. |
| 2022/0021197 A1 | 1/2022 | Zhao et al. |
| 2022/0022898 A1 | 1/2022 | Cox et al. |
| 2022/0033888 A1 | 2/2022 | Schnall-Levin et al. |
| 2022/0039815 A1 | 2/2022 | Thress et al. |
| 2022/0047281 A1 | 2/2022 | Kamalova |
| 2022/0125451 A1 | 4/2022 | Hauser |
| 2022/0142638 A1 | 5/2022 | Enright et al. |
| 2022/0151647 A1 | 5/2022 | Dolendo et al. |
| 2022/0152355 A1 | 5/2022 | Dolendo et al. |
| 2022/0160381 A1 | 5/2022 | Hauser |
| 2022/0160382 A1 | 5/2022 | Hauser |
| 2022/0160383 A1 | 5/2022 | Hauser |
| 2022/0211400 A1 | 7/2022 | Cox et al. |
| 2022/0211992 A1 | 7/2022 | Merritt et al. |
| 2022/0226555 A1 | 7/2022 | Sunenshine et al. |
| 2022/0240959 A1 | 8/2022 | Quick |
| 2022/0296797 A1 | 9/2022 | Chawla |
| 2022/0331554 A1 | 10/2022 | Beasley et al. |
| 2022/0346800 A1 | 11/2022 | Merritt et al. |
| 2022/0346813 A1 | 11/2022 | Quick |
| 2022/0346814 A1 | 11/2022 | Quick |
| 2022/0347455 A1 | 11/2022 | Merritt et al. |
| 2022/0362512 A1 | 11/2022 | Quick et al. |
| 2022/0370761 A1 | 11/2022 | Chou et al. |
| 2022/0378445 A1 | 12/2022 | Culbert et al. |
| 2022/0378446 A1 | 12/2022 | Culbert et al. |
| 2022/0378447 A1 | 12/2022 | Culbert et al. |
| 2022/0378448 A1 | 12/2022 | Culbert et al. |
| 2022/0378451 A1 | 12/2022 | Goyal et al. |
| 2022/0378460 A1 | 12/2022 | Culbert et al. |
| 2022/0387072 A1 | 12/2022 | Look et al. |

(56) References Cited

U.S. PATENT DOCUMENTS

| | | |
|---|---|---|
| 2023/0015259 A1 | 1/2023 | Buck et al. |
| 2023/0046775 A1 | 2/2023 | Quick |
| 2023/0047682 A1 | 2/2023 | Deaton et al. |
| 2023/0052964 A1 | 2/2023 | Singh et al. |
| 2023/0059721 A1 | 2/2023 | Chou et al. |
| 2023/0062809 A1 | 3/2023 | Merritt et al. |
| 2023/0063701 A1 | 3/2023 | Horowitz et al. |
| 2023/0070120 A1 | 3/2023 | Cox et al. |
| 2023/0122587 A1 | 4/2023 | Chou et al. |
| 2023/0149034 A1 | 5/2023 | Aklog et al. |
| 2023/0181200 A1 | 6/2023 | Deville et al. |
| 2023/0200970 A1 | 6/2023 | Merritt et al. |
| 2023/0210554 A1 | 7/2023 | Bruzzi et al. |
| 2023/0218310 A1 | 7/2023 | Scheinblum et al. |
| 2023/0218313 A1 | 7/2023 | Rosenbluth et al. |
| 2023/0218383 A1 | 7/2023 | Merritt et al. |
| 2023/0233311 A1 | 7/2023 | Merritt et al. |
| 2023/0240705 A1 | 8/2023 | Rosenbluth et al. |
| 2023/0240706 A1 | 8/2023 | Rosenbluth et al. |
| 2023/0241302 A1 | 8/2023 | Merritt et al. |
| 2023/0248380 A1 | 8/2023 | Long et al. |
| 2023/0248498 A1 | 8/2023 | Buck et al. |
| 2023/0248499 A1 | 8/2023 | Buck et al. |
| 2023/0248500 A1 | 8/2023 | Buck et al. |
| 2023/0248501 A1 | 8/2023 | Buck et al. |
| 2023/0248502 A1 | 8/2023 | Buck et al. |
| 2023/0248503 A1 | 8/2023 | Buck et al. |
| 2023/0248504 A1 | 8/2023 | Buck et al. |
| 2023/0270991 A1 | 8/2023 | Merritt et al. |
| 2023/0310137 A1 | 10/2023 | Merritt et al. |
| 2023/0310138 A1 | 10/2023 | Merritt et al. |
| 2023/0310751 A1 | 10/2023 | Merritt et al. |
| 2023/0320834 A1 | 10/2023 | Merritt et al. |
| 2023/0329734 A1 | 10/2023 | Marchand et al. |
| 2023/0338130 A1 | 10/2023 | Merritt et al. |
| 2023/0338131 A1 | 10/2023 | Merritt et al. |
| 2023/0355256 A1 | 11/2023 | Dinh |
| 2023/0355259 A1 | 11/2023 | Marchand et al. |
| 2023/0355371 A1 | 11/2023 | Buck et al. |
| 2023/0355938 A1 | 11/2023 | Merritt et al. |
| 2023/0363776 A1 | 11/2023 | Quick |
| 2023/0363883 A1 | 11/2023 | Merritt et al. |
| 2023/0389932 A1 | 12/2023 | Ozenne et al. |
| 2023/0390045 A1 | 12/2023 | Merritt et al. |
| 2024/0016505 A1 | 1/2024 | Horowitz et al. |
| 2024/0016993 A1 | 1/2024 | Haslam et al. |
| 2024/0058113 A1 | 2/2024 | Strauss et al. |
| 2024/0074771 A1 | 3/2024 | Quick et al. |
| 2024/0081857 A1 | 3/2024 | Luong et al. |
| 2024/0082540 A1 | 3/2024 | Brodt et al. |
| 2024/0108366 A1 | 4/2024 | Horowitz et al. |
| 2024/0131235 A1 | 4/2024 | Horowitz et al. |
| 2024/0157041 A1 | 5/2024 | Zikry et al. |
| 2024/0173042 A1 | 5/2024 | Yang et al. |
| 2024/0198072 A1 | 6/2024 | Merritt et al. |
| 2024/0207593 A1 | 6/2024 | Merritt et al. |
| 2024/0225674 A1 | 7/2024 | Dederich et al. |
| 2024/0245501 A1 | 7/2024 | Strauss et al. |
| 2024/0245502 A1 | 7/2024 | Merritt et al. |
| 2024/0261492 A1 | 8/2024 | Yang et al. |
| 2024/0285387 A1 | 8/2024 | Merritt et al. |
| 2024/0299053 A1 | 9/2024 | Hauser |
| 2024/0307082 A1 | 9/2024 | Marchand et al. |
| 2024/0307166 A1 | 9/2024 | Merritt et al. |
| 2024/0341779 A1 | 10/2024 | Dinh |
| 2024/0347788 A1 | 10/2024 | Cox et al. |
| 2024/0407905 A1 | 12/2024 | Merrit et al. |
| 2024/0415626 A1 | 12/2024 | Merrit et al. |
| 2024/0415627 A1 | 12/2024 | Merrit et al. |
| 2025/0017618 A1 | 1/2025 | Truty et al. |
| 2025/0049456 A1 | 2/2025 | Cox et al. |
| 2025/0064464 A1 | 2/2025 | Barkley et al. |
| 2025/0090182 A1 | 3/2025 | Slaughter et al. |

FOREIGN PATENT DOCUMENTS

| | | |
|---|---|---|
| CN | 102014772 | 4/2011 |
| CN | 102186427 | 9/2011 |
| CN | 102316809 | 1/2012 |
| CN | 103764049 | 4/2014 |
| CN | 103932756 | 7/2014 |
| CN | 104068910 | 10/2014 |
| CN | 106178227 | 12/2016 |
| CN | 106470728 | 3/2017 |
| CN | 108348319 | 7/2018 |
| CN | 110312481 | 10/2019 |
| CN | 110420046 | 11/2019 |
| CN | 110652645 | 1/2020 |
| CN | 111281482 | 6/2020 |
| CN | 215082793 | 12/2021 |
| DE | 1116001 | 10/1961 |
| DE | 102017004383 | 7/2018 |
| EP | 0914807 | 5/1999 |
| EP | 0956072 | 10/2001 |
| EP | 1254634 | 11/2002 |
| EP | 1991138 | 11/2008 |
| EP | 2073864 | 7/2009 |
| EP | 2203209 | 7/2010 |
| EP | 2209509 | 7/2010 |
| EP | 2394680 | 12/2011 |
| EP | 1867290 | 2/2013 |
| EP | 2624905 | 8/2013 |
| EP | 2540328 | 10/2013 |
| EP | 2726135 | 5/2014 |
| EP | 2908783 | 8/2015 |
| EP | 2939704 | 11/2015 |
| EP | 2942624 | 11/2015 |
| EP | 2967614 | 1/2016 |
| EP | 2977072 | 1/2016 |
| EP | 2367482 | 10/2016 |
| EP | 3102274 | 12/2016 |
| EP | 3122412 | 2/2017 |
| EP | 3202340 | 8/2017 |
| EP | 3302624 | 4/2018 |
| EP | 3305220 | 4/2018 |
| EP | 3305221 | 4/2018 |
| EP | 3311875 | 4/2018 |
| EP | 2231256 | 5/2018 |
| EP | 3344157 | 7/2018 |
| EP | 3417893 | 12/2018 |
| EP | 3419528 | 1/2019 |
| EP | 3422963 | 1/2019 |
| EP | 3439561 | 2/2019 |
| EP | 3449967 | 3/2019 |
| EP | 3544528 | 10/2019 |
| EP | 3583972 | 12/2019 |
| EP | 3589348 | 1/2020 |
| EP | 3603690 | 2/2020 |
| EP | 3612264 | 2/2020 |
| EP | 3620204 | 3/2020 |
| EP | 3013404 | 4/2020 |
| EP | 4039205 | 8/2022 |
| EP | 4072613 | 10/2022 |
| EP | 4076611 | 10/2022 |
| EP | 4079344 | 10/2022 |
| EP | 4137070 | 2/2023 |
| EP | 4144310 | 3/2023 |
| EP | 4252992 | 10/2023 |
| EP | 4419159 | 8/2024 |
| GB | 1588072 | 4/1981 |
| GB | 2498349 | 7/2013 |
| JP | H6190049 | 7/1994 |
| JP | H07323090 A | 12/1995 |
| JP | 2001522631 | 5/1999 |
| JP | 2000175925 | 6/2000 |
| JP | 2004097807 | 4/2004 |
| JP | 2005511989 | 4/2005 |
| JP | 2005-095242 | 6/2005 |
| JP | 2005230132 | 9/2005 |
| JP | 2005323702 | 11/2005 |
| JP | 2006094876 | 4/2006 |
| JP | 2007-222658 | 9/2007 |
| JP | 2011526820 | 1/2010 |

(56) References Cited

FOREIGN PATENT DOCUMENTS

| | | |
|---|---|---|
| JP | 2011517424 | 6/2011 |
| JP | 05694718 | 4/2015 |
| JP | 2015208685 | 11/2015 |
| JP | 2016513505 | 5/2016 |
| JP | 2016104212 | 6/2016 |
| JP | 2017533051 | 11/2017 |
| JP | 2018525088 | 9/2018 |
| JP | 2003033359 | 2/2023 |
| JP | 7253376 | 3/2023 |
| JP | 7324264 | 8/2023 |
| JP | 7491974 | 5/2024 |
| WO | WO1997017889 | 5/1997 |
| WO | WO1998024501 | 6/1998 |
| WO | WO9833443 | 8/1998 |
| WO | WO9838920 | 9/1998 |
| WO | WO9839053 | 9/1998 |
| WO | WO9851237 | 11/1998 |
| WO | WO1999044542 | 9/1999 |
| WO | WO9951140 | 10/1999 |
| WO | WO0032118 | 6/2000 |
| WO | WO2000053120 | 9/2000 |
| WO | WO0202162 | 1/2002 |
| WO | WO2002055146 | 7/2002 |
| WO | WO03015840 | 2/2003 |
| WO | WO2004018916 | 3/2004 |
| WO | WO2004093696 | 11/2004 |
| WO | WO2005046736 | 5/2005 |
| WO | WO2006029270 | 3/2006 |
| WO | WO2006110186 | 10/2006 |
| WO | WO2006124307 | 11/2006 |
| WO | WO2007092820 | 8/2007 |
| WO | WO2009082513 | 7/2009 |
| WO | WO2009086482 | 7/2009 |
| WO | WO2009105710 | 8/2009 |
| WO | WO2009126747 | 10/2009 |
| WO | WO2009155571 | 12/2009 |
| WO | WO2010002549 | 1/2010 |
| WO | WO2010010545 | 1/2010 |
| WO | WO2010023671 | 3/2010 |
| WO | WO2010049121 | 5/2010 |
| WO | WO2010095712 | 8/2010 |
| WO | WO2010102307 | 9/2010 |
| WO | WO2011032712 | 3/2011 |
| WO | WO2011054531 | 5/2011 |
| WO | WO2011073176 | 6/2011 |
| WO | WO2012009675 | 1/2012 |
| WO | WO2012011097 | 1/2012 |
| WO | WO2012049652 | 4/2012 |
| WO | WO2012065748 | 5/2012 |
| WO | WO2012114633 | 8/2012 |
| WO | WO2012120490 | 9/2012 |
| WO | WO2012162437 | 11/2012 |
| WO | WO2014047650 | 3/2014 |
| WO | WO2014081892 | 5/2014 |
| WO | WO2014139845 | 9/2014 |
| WO | WO2015006782 | 1/2015 |
| WO | WO2015061365 | 4/2015 |
| WO | WO2015121424 | 8/2015 |
| WO | WO2015179329 | 11/2015 |
| WO | WO2015189354 | 12/2015 |
| WO | WO2015191646 | 12/2015 |
| WO | WO2016014955 | 1/2016 |
| WO | WO2016071524 | 5/2016 |
| WO | WO2017024258 | 2/2017 |
| WO | WO2017033182 | 3/2017 |
| WO | WO2017058280 | 4/2017 |
| WO | WO2017070702 | 4/2017 |
| WO | WO2017106877 | 6/2017 |
| WO | WO2017189535 | 11/2017 |
| WO | WO2017189550 | 11/2017 |
| WO | WO2017189591 | 11/2017 |
| WO | WO2017189615 | 11/2017 |
| WO | WO2017210487 | 12/2017 |
| WO | WO2018049317 | 3/2018 |
| WO | WO2018065092 | 4/2018 |
| WO | WO2018080590 | 5/2018 |
| WO | WO2018100445 | 6/2018 |
| WO | WO2018148174 | 8/2018 |
| WO | WO2019010318 | 1/2019 |
| WO | WO2019050765 | 3/2019 |
| WO | WO2019064306 | 4/2019 |
| WO | WO2019075444 | 4/2019 |
| WO | WO2019094456 | 5/2019 |
| WO | WO2019173475 | 9/2019 |
| WO | WO2019222117 | 11/2019 |
| WO | WO2019246240 | 12/2019 |
| WO | WO2020036809 | 2/2020 |
| WO | WO2020142381 | 7/2020 |
| WO | WO2021067134 | 4/2021 |
| WO | WO2021076954 | 4/2021 |
| WO | WO2021127202 | 6/2021 |
| WO | WO2021248042 | 12/2021 |
| WO | WO2022032173 | 2/2022 |
| WO | WO2022103848 | 5/2022 |
| WO | WO2022109021 | 5/2022 |
| WO | WO2022109034 | 5/2022 |
| WO | WO2022261448 | 12/2022 |
| WO | WO2023018819 | 2/2023 |
| WO | WO2023069874 | 4/2023 |
| WO | WO2003048616 | 6/2023 |
| WO | WO2023115032 | 6/2023 |
| WO | WO2023137341 | 7/2023 |
| WO | WO2023143700 | 8/2023 |
| WO | WO2023147353 | 8/2023 |
| WO | WO2023154612 | 8/2023 |
| WO | WO2023192925 | 10/2023 |
| WO | WO2023215779 | 11/2023 |
| WO | WO2023239706 | 12/2023 |
| WO | WO2024006482 | 1/2024 |
| WO | WO2024054988 | 3/2024 |
| WO | WO2024059695 | 3/2024 |
| WO | WO2024103036 | 5/2024 |
| WO | WO2024151629 | 7/2024 |
| WO | WO2025014517 | 1/2025 |
| WO | WO2025059542 | 3/2025 |

OTHER PUBLICATIONS

US 12,115,056 B2, 10/2024, Merritt et al. (withdrawn)
Gibbs, et al., "Temporary Stent as a bail-out device during percutaneous transluminal coronary angioplasty: preliminary clinical experience," British Heart Journal, 1994, 71:372-377, Oct. 12, 1993, 6 pgs.
Gupta, S. et al., "Acute Pulmonary Embolism Advances in Treatment", JAPI, Association of Physicians India, Mar. 2008, vol. 56, 185-191.
International Search Report and Written Opinion for International App. No. PCT/US13/61470, mailed Jan. 17, 2014, 7 pages.
International Search Report and Written Opinion for International App. No. PCT/US2014/046567, mailed Nov. 3, 2014, 13 pages.
International Search Report and Written Opinion for International App. No. PCT/US2014/061645, mailed Jan. 23, 2015, 15 pages.
International Search Report for International App. No. PCT/US13/71101, mailed Mar. 31, 2014, 4 pages.
Konstantinides, S. et al., "Pulmonary embolism hotline 2012—Recent and expected trials", Thrombosis and Haemostasis, Jan. 9, 2013:33; 43-50.
Konstantinides, S. et al., "Pulmonary embolism: risk assessment and management", European Society of Cardiology; European Heart Journal, Sep. 7, 2012:33, 3014-3022.
Kucher, N. et al., "Percutaneous Catheter Thrombectomy Device for Acute Pulmonary Embolism: In Vitro and in Vivo Testing", Circulation, Sep. 2005:112:e28-e32.
Kucher, N., "Catheter Interventions in Massive Pulmonary Embolism", Cardiology Rounds, Mar. 2006 vol. 10, Issue 3, 6 pages.
Kucher, N. et al., "Management of Massive Pulmonary Embolism", Radiology, Sep. 2005:236:3 852-858.
Kucher, N. et al., "Randomized, Controlled Trial of Ultrasound-Assisted Catheter-Directed Thrombolysis for Acute Intermediate-Risk Pulmonary Embolism." Circulation, 2014, 129, pp. 9 pages.

(56) References Cited

OTHER PUBLICATIONS

Kuo, W. et al., "Catheter-directed Therapy for the Treatment of Massive Pulmonary Embolism: Systematic Review and Meta-analysis of Modern Techniques", Journal of Vascular and Interventional Radiology, Nov. 2009:20:1431-1440.

Kuo, W. et al., "Catheter-Directed Embolectomy, Fragmentation, and Thrombolysis for the Treatment of Massive Pulmonary Embolism After Failure of Systemic Thrombolysis", American College of Chest Physicians 2008: 134:250-254.

Kuo, W. MD, "Endovascular Therapy for Acute Pulmonary Embolism", Continuing Medical Education Society of Interventional Radiology ("CME"); Journal of Vascular and Interventional Radiology, Feb. 2012: 23:167-179.

Lee, L. et al., "Massive pulmonary embolism: review of management strategies with a focus on catheter-based techniques", Expert Rev. Cardiovasc. Ther. 8(6), 863-873 (2010).

Liu, S. et al, "Massive Pulmonary Embolism: Treatment with the Rotarex Thrombectomy System"; Cardiovascular Interventional Radiology; 2011: 34:106-113.

Muller-Hulsbeck, S. et al. "Mechanical Thrombectomy of Major and Massive Pulmonary Embolism with Use of the Amplatz Thrombectomy Device", Investigative Radiology, Jun. 2001:36:6:317-322.

Reekers, J. et al., "Mechanical Thrombectomy for Early Treatment of Massive Pulmonary Embolism", CardioVascular and Interventional Radiology, 2003: 26:246-250.

Schmitz-Rode et al., "New Mesh Basket for Percutaneous Removal of Wall-Adherent Thrombi in Dialysis Shunts," Cardiovasc Intervent Radiol 16:7-10 1993 4 pgs.

Schmitz-Rode et al., "Temporary Pulmonary Stent Placement as Emergency Treatment of Pulmonary Embolism," Journal of the American College of Cardiology, vol. 48, No. 4, 2006 (5 pgs.).

Schmitz-Rode, T. et al., "Massive Pulmonary Embolism: Percutaneous Emergency Treatment by Pigtail Rotation Catheter", JACC Journal of the American College of Cardiology, Aug. 2000:36:2:375-380.

Spiotta, A et al., "Evolution of thrombectomy approaches and devices for acute stroke: a technical review." J Neurointervent Surg 2015, 7, pp. 7 pages.

Svilaas, T. et al., "Thrombus Aspiration During Primary Percutaneous Coronary Intervention." The New England Journal of Medicine, 2008, vol. 358, No. 6, 11 pages.

Tapson, V., "Acute Pulmonary Embolism", The New England Journal of Medicine, Mar. 6, 2008:358:2037-52.

The Penumbra Pivotal Stroke Trial Investigators, "The Penumbra Pivotal Stroke Trial: Safety and Effectiveness of a New Generation of Mechanical Devices for Clot Removal in Intracranial Large Vessel Occlusive Disease." Stroke, 2009, 40: p. 9 pages.

Truong et al., "Mechanical Thrombectomy of Iliocaval Thrombosis Using a Protective Expandable Sheath," Cardiovasc Intervent Radiol27-254-258, 2004, 5 pgs.

Turk et al., "Adapt Fast study: a direct aspiration first pass technique for acute stroke thrombectomy." J NeuroIntervent Surg, vol. 6, 2014, 6 pages.

Uflacker, R., "Interventional Therapy for Pulmonary Embolism", Journal of Vascular and Interventional Radiology, Feb. 2001: 12:147-164.

Verma, R., MD et al. "Evaluation of a Newly Developed Percutaneous Thrombectomy Basket Device in Sheep With Central Pulmonary Embolisms", *Investigative Radiology*, Oct. 2006, 41, 729-734.

International Search Report and Written Opinion for International App. No. PCT/US2015/034987 filed Jun. 9, 2015, Applicant: Inceptus Medical, LLC, Date of Mailing: Sep. 17, 2015, 12 pages.

International Search Report and Written Opinion for International App. No. PCT/US2016/067628 filed Dec. 19, 2016, Applicant: Inari Medical, Inc., Date of Mailing: Apr. 10, 2017, 11 pages.

Goldhaber, S. et al. "Percutaneous Mechanical Thrombectomy for Acute Pulmonary Embolism—A Double-Edged Sword," American College of Chest Physicians, Aug. 2007, 132:2, 363-372.

Goldhaber, S., "Advanced treatment strategies for acute pulmonary embolism, including thrombolysis and embolectomy," Journal of Thrombosis and Haemostasis, 2009: 7 (Suppl. 1): 322-327.

International Search Report and Written Opinion for International App. No. PCT/US2017/029696, Date of Filing: Apr. 26, 2017, Applicant: Inari Medical, Inc., Date of Mailing: Sep. 15, 2017, 19 pages.

International Search Report and Written Opinion for International App. No. PCT/US2016/058536, Date of Filing: Oct. 24, 2016, Applicant: Inari Medical, Inc., Date of Mailing: Mar. 13, 2017, 14 pages.

International Search Report and Written Opinion for International App. No. PCT/US2018/048786, Date of Filing: Aug. 30, 2018, Applicant: Inari Medical, Inc., Date of Mailing: Dec. 13, 2018, 12 pages.

International Search Report and Written Opinion for International App. No. PCT/US2018/055780, Date of Filing: Oct. 13, 2018, Applicant: Inceptus Medical LLC., Date of Mailing: Jan. 22, 2019, 8 pages.

International Search Report and Written Opinion for International App. No. PCT/US2019/045794, Date of Filing: Aug. 8, 2019, Applicant: Inari Medical, Inc., Date of Mailing: Nov. 1, 2019, 17 pages.

International Search Report and Written Opinion for International App. No. PCT/US2020/056067, Date of Filing: Oct. 16, 2020; Applicant: Inari Medical, Inc., Date of Mailing: Jan. 22, 2021, 8 pages.

International Search Report and Written Opinion for International App. No. PCT/US2020/055645, Date of Filing: Dec. 17, 2020; Applicant: Inari Medical, Inc., Date of Mailing: Apr. 14, 2021, 12 pages.

Vorwerk, D. MD, et al., "Use of a Temporary Caval Filter to Assist Percutaneous Iliocaval Thrombectomy: Experimental Results." SCVIR, 1995, 4 pages.

Wikipedia; Embolectomy; retrieved from the internet: https://en.wikipedia.org/wiki/Embolectomy; 4 pgs.; retrieved/printed: Mar. 24, 2016.

O'Sullivan; Thrombolysis versus thrombectomy in acute deep vein thrombosis; Interventional Cardiology; 3(5); pp. 589-596; Oct. 2011.

Capture Vascular Systems; (company website); retrieved from the internet: http://www.capturevascular.com; 3 pgs.; retrieved/printed: Mar. 24, 2016.

Edwards Lifesciences; Fogarty® Occlusion Catheters (product brochure); retrieved from the internet: http://web.archive.org/web/20150228193218/http://www.edwards.com/products/vascular/atraumaticocclusion/pages/occlusioncatheter.aspx; ©2011; 2 pgs .; retrieved/printed: Mar. 24, 2011.

Boston Scientific; Fetch(TM) 2 Aspiration Catheter (product information); retrieved from the internet: http://www.bostonscientific.com/en-US/products/thrombectomy-systems/fetch2-aspiration-catheter.html; 2 pgs.; retrieved/printed: Mar. 24, 2016.

Penumbra, Inc .; Indigo® System (product information); retrieved from the internet: http://www.penumbrainc.com/peripherallpercutaneous-thromboembolectomy/indigo-system; 7 pgs.; retrieved/printed: Mar. 24, 2016.

Youtube; Merci Retrieval System X Series Animation; uploaded Mar. 16, 2009 (product information); posted on May 7, 2009 by SSMDePAUL, time 1:09, retrieved from the internet: https://www.youtube.com/watch?v=MGX7deuFkhc, 3 pgs.; retrieved/printed: Mar. 24, 2016.

Covidien; Solitaire(TM) AS Neurovascular Remodeling Device (product information); retrieved from the internet: http://www.ev3.net/neuro/intl/remodeling-devices/solitaire-ab. htm; ©2015; 2 pgs.; retrieved/printed: Mar. 24, 2016.

International Search Report and Written Opinion for International App. No. PCT/US21/35965, Date of Filing: Jun. 4, 2021, Applicant Inari Medical, Inc., Date of Mailing: Sep. 28, 2021, 12 pages.

International Search Report and Written Opinion for International App. No. PCT/US21/45072 Date of Filing: Aug. 6, 2021, Applicant: Inari Medical, Inc., Date of Mailing: Jan. 20, 2022, 10 pages.

(56) References Cited

OTHER PUBLICATIONS

International Search Report and Written Opinion for International App. No. PCT/US21/58793; Date of Filing: Nov. 10, 2021, Applicant: Inari Medical, Inc., Date of Mailing: Mar. 16, 2022, 13 pages.
International Search Report and Written Opinion for International App. No. PCT/US21/59718; Date of Filing: Nov. 17, 2021, Applicant: Inari Medical, Inc., Date of Mailing: Mar. 22, 2022, 13 pages.
International Search Report and Written Opinion for International App. No. PCT/US21/59735; Date of Filing: Nov. 17, 2021, Applicant: Inari Medical, Inc., Date of Mailing: Mar. 22, 2022, 11 pages.
International Search Report and Written Opinion for International App. No. PCT/US23/60502; Date of Filing: Jan. 11, 2023, Applicant: Inari Medical, Inc., Date of Mailing: May 25, 2023, 9 pages.
International Search Report and Written Opinion for International App. No. PCT/US23/61256; Date of Filing: Jan. 25, 2023, Applicant: Inari Medical, Inc., Date of Mailing: Jun. 7, 2023, 8 pages.
Gross et al., "Dump the pump: manual aspiration thrombectomy (MAT) with a syringe is technically effective, expeditious, and cost-efficient," J Neurointervent Surg, 2018, 4 pages.
English translation of Japanese Office Action mailed Jun. 7, 2023 for Japanese Application No. 2021-507564, 7 pages.
European Office Action received for EP Application No. 16876941.2, Applicant: Inari Medical, Inc, Date of Mailing: Jul. 18, 2023, 6 pages.
International Search Report and Written Opinion for International App. No. PCT/US23/60927; Date of Filing: Jan. 19, 2023, Applicant: Inari Medical, Inc., Date of Mailing: Jul. 20, 2023, 12 pages.
Extended European Search Report issued for EP Application No. 20877370.5, Date of Mailing: Oct. 17, 2023, 11 pages.
International Search Report and Written Opinion for International App. No. PCT/US23/65128; Date of Filing: Mar. 30, 2023, Applicant: Inari Medical, Inc., Date of Mailing: Nov. 14, 2023, 14 pages.
International Search Report and Written Opinion for International App. No. PCT/US23/66538; Date of Filing: May 3, 2023, Applicant: Inari Medical, Inc., Date of Mailing: Jan. 4, 2024, 14 pages.
English translation of Japanese Office Action received for JP Application No. 2022-574456, Applicant: Inari Medical, Inc, Date of Mailing: Jan. 23, 2024, 12 pages.
Chinese First Office Action received for CN Application No. 201980067623.1, Applicant: Inari Medical, Inc., Date of Mailing: Jan. 31, 2024, 10 pages.
International Search Report and Written Opinion for International App. No. PCT/US23/73765; Date of Filing: Sep. 8, 2023, Applicant: Inari Medical, Inc., Date of Mailing: Feb. 28, 2024, 7 pages.
International Search Report and Written Opinion for International App. No. PCT/US23/69892; Date of Filing: Jul. 10, 2023, Applicant: Inari Medical, Inc., Date of Mailing: Feb. 29, 2024, 12 pages.
English translation of Japanese Office Action mailed Jan. 19, 2024 for Japanese Application No. 2022-160947, 8 pages.
International Search Report and Written Opinion for International App. No. PCT/US2024/010875; Applicant: Inari Medical, Inc., Date of Mailing: Apr. 26, 2024, 15 pages.
International Search Report and Written Opinion for International App. No. PCT/US2023/079428; Applicant: Inari Medical, Inc., Date of Mailing: May 29, 2024, 18 pages.
Extended European Search Report for European Application No. 21818772.2, Applicant: Inari Medical, Inc., Date of Mailing: May 10, 9 pages.
Chinese Office Action received for Application No. 202111061740.2, Applicant: Inari Medical, Inc, Date of Mailing: May 23, 2024, 15 pages.
English translation of Japanese Office Action mailed Jun. 25, 2024 for Japanese Application No. 2022-574456, 5 pages.
Japanese Office Action mailed Jul. 8, 2024 for Japanese Application No. 2022-522892, 14 pages.
Chinese first Office Action mailed May 10, 2024 for Chinese Application No. 202080087833.X, 11 pages.
Partial Supplementary European Search Report received for European Application No. 21852966.7; Applicant: Inari Medical, Inc., Date of Mailing: Jul. 23, 2024, 12 pages.
Japanese Office Action mailed Aug. 2, 2024 for Japanese Application No. 2023-213724, 3 pages.
English Translation of Japanese Office Action mailed Jul. 23, 2024 for Japanese Application No. 2022-535535, 11 pages.
Extended European Search Report received for European Application No. 21895504.5; Applicant: Inari Medical, Inc., Date of Mailing: Aug. 16, 2024, 10 pages.
English translation of Japanese Office Action mailed Sep. 17, 2024 for Japanese Application No. 2023-203650, 6 pages.
English machine translation of Japanese Office Action mailed Oct. 10, 2024 for Japanese Application No. 2022-522892, 11 pages.
International Search Report and Written Opinion for International App. No. PCT/US2024/043504; Applicant: Inari Medical, Inc., Date of Mailing: Nov. 12, 2024, 12 pages.
International Search Report and Written Opinion for International App. No. PCT/US2024/037570; Applicant: Inari Medical, Inc., Date of Mailing: Nov. 20, 2024, 12 pages.
International Search Report and Written Opinion for International App. No. PCT/US2024/046723; Applicant: Inari Medical, Inc., Date of Mailing: Nov. 27, 2024, 11 pages.
English translation of Chinese Office Action mailed Jan. 22, 2025 for Chinese Application No. 202210842779.6, 17 pages.
Extended European Search Report received for European Application No. 24209030.6; Applicant: Inari Medical, Inc., Date of Mailing: Feb. 3, 2025, 7 pages.
International Search Report and Written Opinion for International App. No. PCT/US2024/056178; Applicant: Inari Medical, Inc., Date of Mailing: Mar. 24, 2025, 13 pages.
International Search Report and Written Opinion for International App. No. PCT/US2024/057919; Applicant: Inari Medical, Inc., Date of Mailing: Mar. 28, 2025, 13 pages.
English translation of Chinese Second Office Action mailed Apr. 24, 2025 for Chinese Application No. 202080097026.6, 10 pages.
International Search Report for International Application No. PCT/US2023/026648, mailed on Dec. 19, 2023, 6 pages.
Written Opinion of the International Searching Authority for International Application No. PCT/US2023/026648, dated Dec. 19, 2023, 31 pages.
Bayer HealthCare, 'Our Next Generation Aspiration Catheter.' Fetch 2 Catheter Specifications, Feb. 2013, 2 pages.
Medtronic, Solitaire X, Revascularization Device. http://www.ev3.net/neuro/intl/remodeling-devices/solitaire-ab.htm. 6 pages, (2019).
International Search Report and Written Opinion for International App. No. PCT/US2023/074169; Applicant: Inari Medical, Inc., Date of Mailing: May 1, 2024, 12 pages.
English translation of Japanese Office Action for Japanese Application No. 2023-507628 mailed Apr. 23, 2025, 8 pages.

* cited by examiner

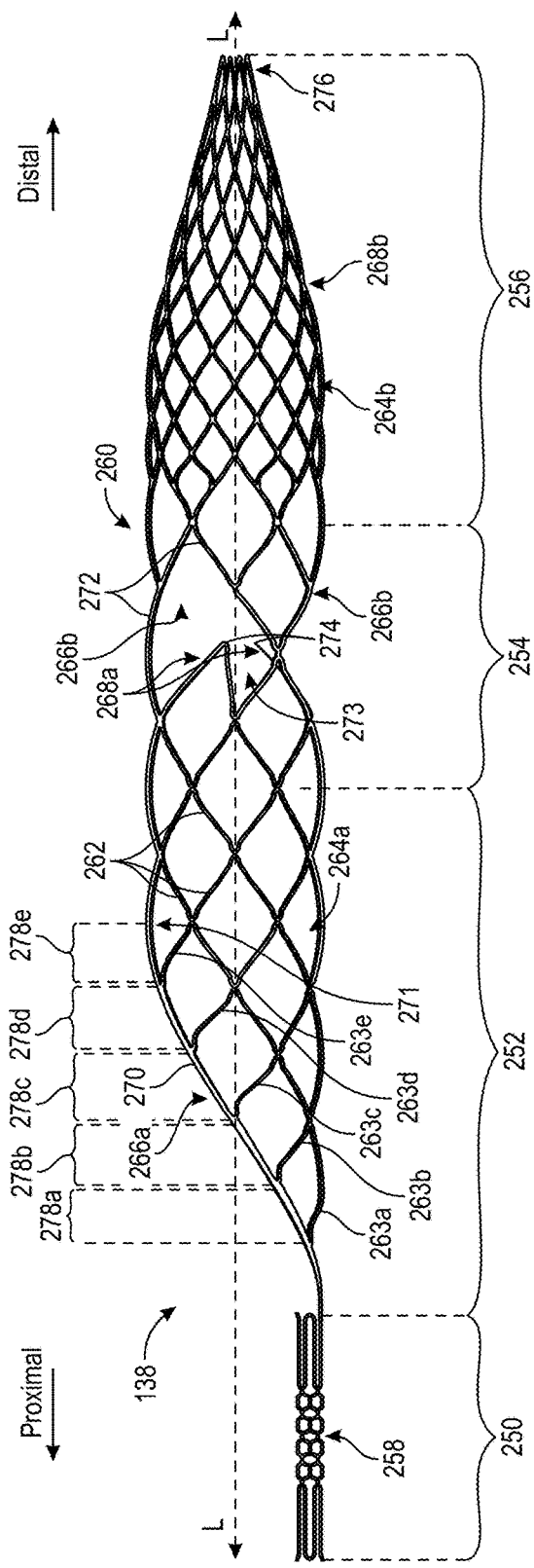
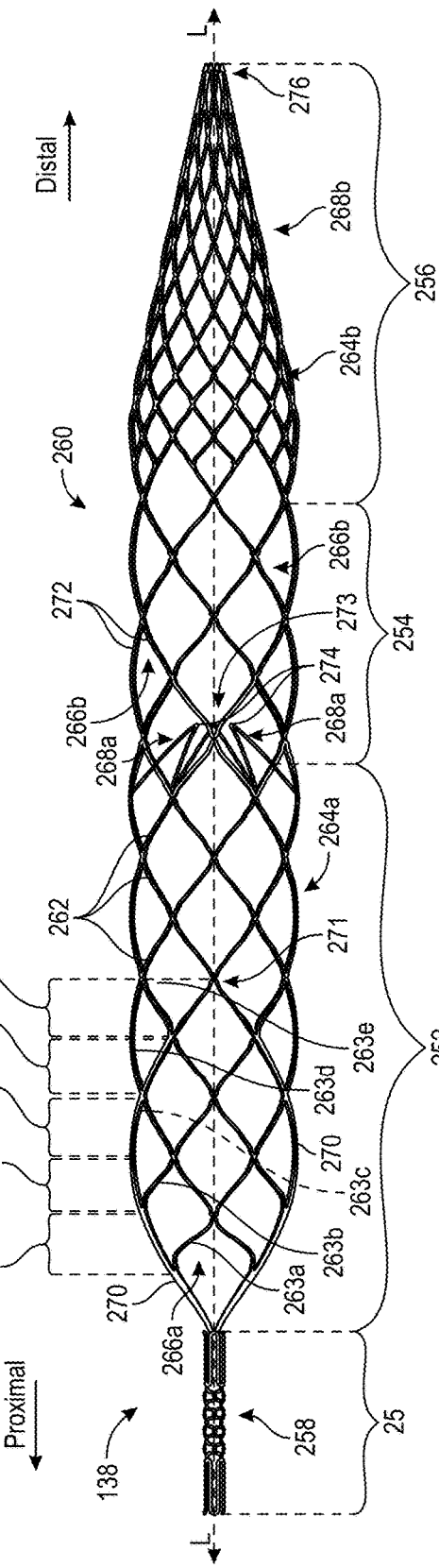
FIG. 2B
FIG. 2C

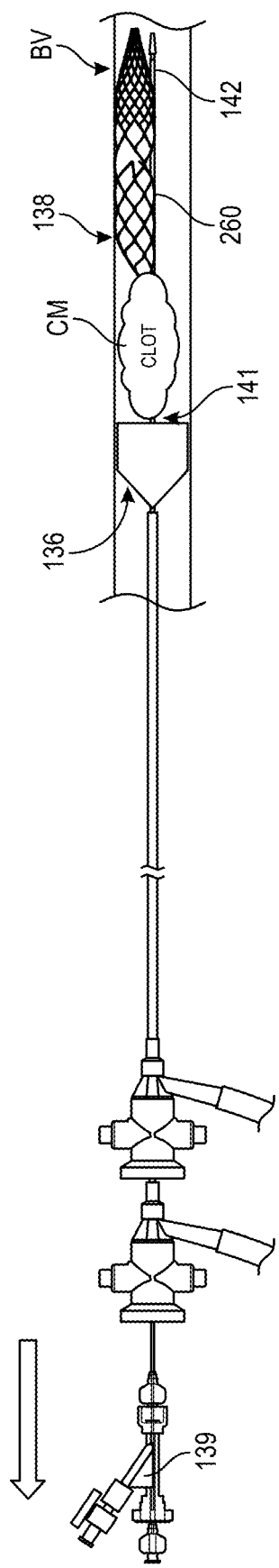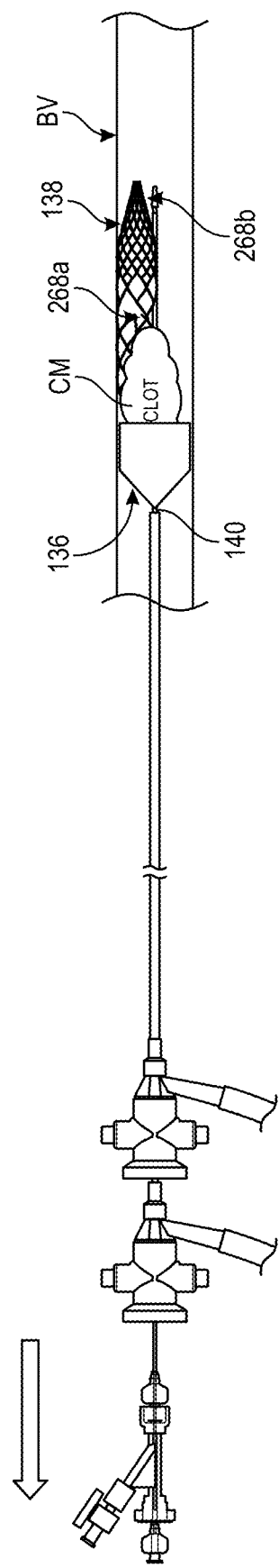
FIG. 11E
FIG. 11F

MECHANICAL THROMBECTOMY ASSEMBLIES WITH RELIEF FEATURES, AND ASSOCIATED DEVICES, SYSTEMS, AND METHODS

CROSS-REFERENCE TO RELATED APPLICATION(S)

The present application claims priority to U.S. Provisional App. No. 63/645,585, filed May 10, 2024, the entirety of which is hereby incorporated by reference.

TECHNICAL FIELD

The present technology generally relates to mechanical thrombectomy assemblies, including mechanical thrombectomy assemblies with relief features, and associated devices, systems, and methods.

BACKGROUND

Thromboembolic events are characterized by an occlusion of a blood vessel. Thromboembolic disorders, such as stroke, pulmonary embolism, heart attack, peripheral thrombosis, atherosclerosis, and the like, affect many people. These disorders are a major cause of morbidity and mortality.

When an artery is occluded by a clot, tissue ischemia develops. The ischemia will progress to tissue infarction if the occlusion persists. However, infarction does not develop or is greatly limited if the flow of blood is reestablished rapidly. Failure to reestablish blood flow can accordingly lead to the loss of limb, angina pectoris, myocardial infarction, stroke, or even death.

In the venous circulation, occlusive material can also cause serious harm. Blood clots can develop in the large veins of the legs and pelvis, a common condition known as deep venous thrombosis (DVT). DVT commonly occurs where there is a propensity for stagnated blood (e.g., long-distance air travel, immobility, etc.) and clotting (e.g., cancer; recent surgery, such as orthopedic surgery, etc.). DVT can obstruct drainage of venous blood from the legs, leading to swelling, ulcers, pain, and infection. DVT can also create a reservoir in which blood clots can collect and then travel to other parts of the body, including the heart, lungs, brain (which may cause a stroke), abdominal organs, and/or extremities.

In the arterial circulation (e.g., the peripheral arterial circulation, the pulmonary circulation), the undesirable material can cause harm by obstructing different arteries. For example, an obstruction within the pulmonary arteries is a condition known as pulmonary embolism. If the obstruction is upstream, in the main or large branch pulmonary arteries, it can severely compromise total blood flow within the lungs, and therefore the entire body, and result in low blood pressure and shock. If the obstruction is downstream, in large to medium pulmonary artery branches, it can prevent a significant portion of the lung from participating in the exchange of gases to the blood resulting in low blood oxygen and buildup of blood carbon dioxide.

Other arterial thromboembolic medical conditions include acute limb ischemia (ALI), acute visceral ischemia, and chronic limb ischemia (CLI). ALI is characterized a sudden decrease in blood flow to a limb caused by a blood clot (e.g., thromboembolism) obstructing the arteries supplying blood to the limb. If not treated properly, ALI can lead to tissue damage, organ dysfunction, and/or limb loss. Acute visceral ischemia is characterized by a sudden decrease in blood flow to the organs in the abdominal cavity (e.g., visceral organs) caused by a blood clot obstructing the arteries supplying blood to the organs. If not treated properly, acute visceral ischemia can lead to tissue damage, organ dysfunction, and/or other damage to a patient's arterial system. CLI is a long-term reduction in blood flow to the limbs caused by a blood clot in the arteries supplying blood to the arms and/or legs. If not treated properly, CLI can lead to pain, numbness, weakness, and/or impaired wound healing in the arms and legs.

Treatment of arterial thromboembolic medical conditions often requires open surgical procedures and/or the use of lytic therapy. Such procedures can result in distal embolization of the blot material, vessel trauma, and significant blood loss. Mechanical thrombectomy catheters can also be used to treat arterial thromboembolic medical conditions, and often include an element on the distal end which serves to capture the thromboembolism. The element may be made from wire, laser cut metal including nitinol, looped or braided wire, or an inflated element such as a balloon. However, the element on the distal end of the mechanical thrombectomy catheter can cause embolization of the clot material as the element is inserted and/or retracted through the clot material. The embolized clot material can flow to other parts of the body, which may lead to other medical complications.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present disclosure.

FIGS. 2B and 2C are side and top views, respectively, of the clot treatment device of FIG. 2A in accordance with embodiments of the present technology.

FIGS. 11A-11G are side views of a clot treatment system during different stages of the process or method of FIG. 10 in accordance with embodiments of the present technology.

DETAILED DESCRIPTION

Figure 1:
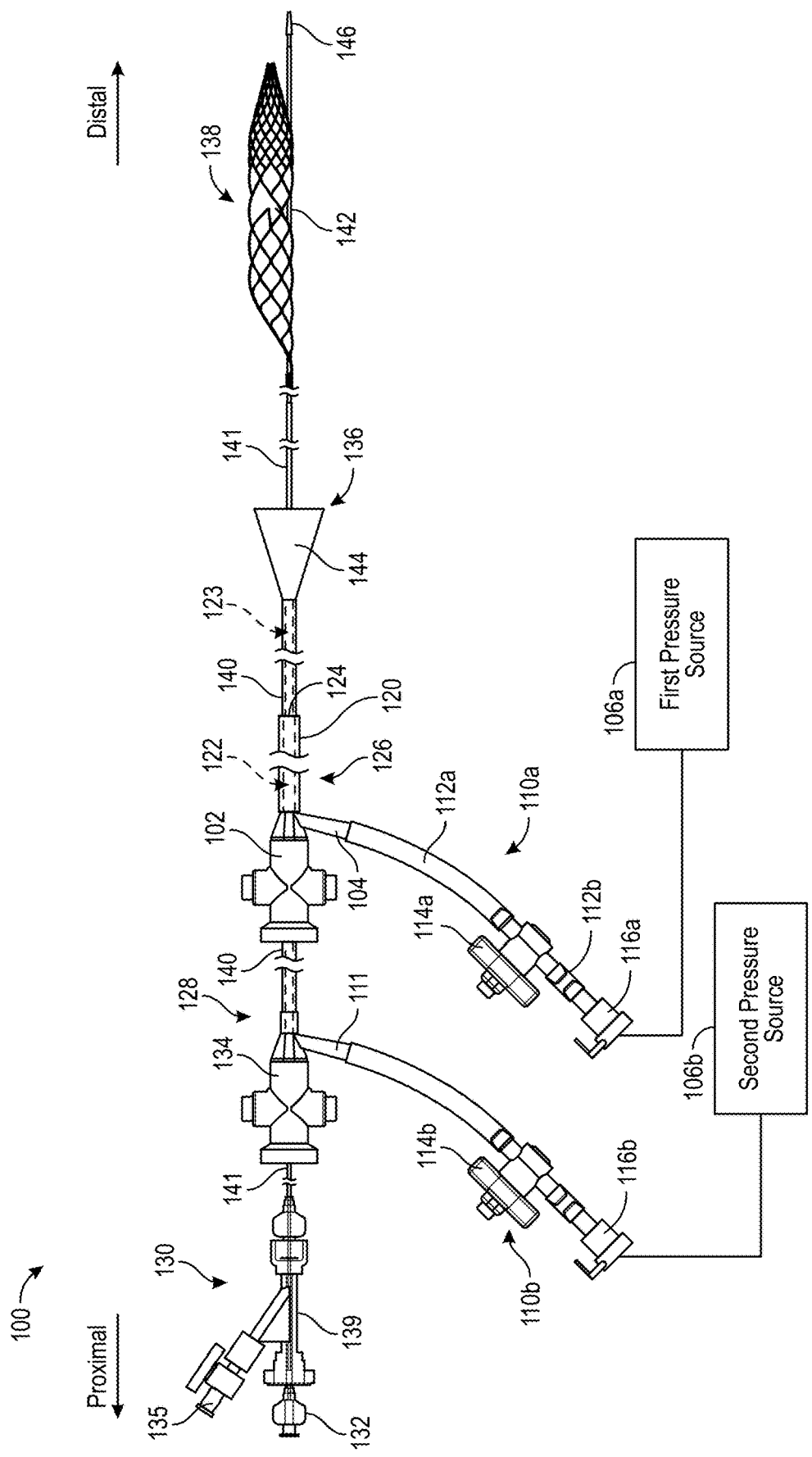
FIG. 1 is a side view of a clot treatment system configured in accordance with embodiments of the present technology.

The present technology is generally directed to clot treatment systems with clot treatment devices, and associated devices and methods. In some embodiments, a clot treatment system includes an embolic protection device and a clot treatment device. The clot treatment device can include one or more mouths and one or more relief features. The one or more mouths can be configured to mechanically engage clot material within a patient's blood vessel to core or capture at least a portion of the clot material. The one or more relief features can be position distal to one or more of the mouths and configured to (i) retain the captured clot material within the clot treatment device and (ii) release the captured clot material when a force on the one or more relief features exceeds a threshold. In at least some embodiments, for example, the relief features can include struts of the clot treatment device that are angled inwardly toward a central axis of the clot treatment device and, when the force on the relief features exceeds the threshold, the relief features can bend or flex outwardly away from the central axis.

During a clot removal procedure, the clot treatment device and the embolic protection device can, while radially constrained within a delivery catheter, be inserted together into a blood vessel of a patient including clot material to be treated. The blood vessel can comprise a peripheral artery of a human patient, and the clot material can comprise a thromboembolism therein. Accordingly, the clot removal procedure can be a procedure to treat acute limb ischemia (ALI), acute visceral ischemia, chronic limb ischemia (CLI), and/or the like. The embolic protection device can be deployed at least partially proximal to the clot material and the clot treatment device can be deployed at least partially distal to the clot material. The clot treatment device can be used to mechanically engage and disrupt the clot material by, for example, retracting the one or more mouths proximally through the clot material and into the embolic protection device and/or the first shaft. The relief features can retain the captured clot material within the clot treatment device. If the force on the relief features exceeds the threshold, the relief features can release the captured clot material to reduce the overall force on the clot treatment device to, e.g., prevent the clot treatment device from yielding, breaking, or otherwise failing. The embolic protection device can be positioned to capture all or a portion of the clot material that embolizes or otherwise breaks off during mechanical engagement of the clot treatment device with the clot material and/or to direct clot material into the first shaft.

Certain details are set forth in the following description and in FIGS. 1-23 to provide a thorough understanding of various embodiments of the present technology. In other instances, well-known structures, materials, operations, and/or systems often associated with intravascular procedures, clot removal procedures, clot treatment systems, clot treatment devices, embolic protection devices, catheters, and/or the like are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. Moreover, although many of the devices and systems are described herein in the context of removing and/or treating clot material (e.g., a thromboembolism), the present technology can be used to remove and/or treat other unwanted material in addition or alternatively to clot material, such as thrombi, emboli, plaque, intimal hyperplasia, post-thrombotic scar tissue, etc. Accordingly, the terms "clot" and "clot material" as used herein can refer to any of the foregoing materials and/or the like.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

With regard to the terms "distal" and "proximal" within this description, unless otherwise specified, the terms can reference a relative position of the portions of a catheter subsystem with reference to an operator and/or a location in the vasculature. Also, as used herein, the designations "rearward," "forward," "upward," "downward," and the like are not meant to limit the referenced component to a specific orientation. It will be appreciated that such designations refer to the orientation of the referenced component as illustrated in the Figures; the systems of the present technology can be used in any orientation suitable to the user.

In the Figures, identical reference numbers identify identical, or at least generally similar, elements. To facilitate the discussion of any particular element, the most significant digit or digits of any reference number refers to the Figure in which that element is first introduced. For example, first tubing assembly 110a is first introduced and discussed with reference to FIG. 1.

To the extent any materials incorporated herein by reference conflict with the present disclosure, the present disclosure controls.

FIG. 1 is a partially schematic side view of a clot treatment system 100 ("the system 100") configured in accordance with embodiments of the present technology. The system 100 can also be referred to as an aspiration assembly, a vascular access system, a clot removal system, a thrombectomy system, and/or the like. In some embodiments, the system 100 is configured for treating clot material (e.g., a thromboembolism) in a peripheral artery of a human patient, such as clot material leading to various medical conditions such as acute limb ischemia (ALI), acute visceral ischemia, chronic limb ischemia (CLI), and/or the like. In the illustrated embodiment, the system 100 includes an introducer catheter assembly 126, an embolic protection catheter assembly 128 (e.g., a funnel catheter assembly), and a mechanical thrombectomy catheter assembly 130. The system 100 (i) can include features generally similar in structure and/or function, or identical in structure and/or function, to those of the clot treatment systems described in detail in U.S. patent application Ser. No. 16/536,185, filed Aug. 8, 2019, and titled "SYSTEM FOR TREATING EMBOLISM AND ASSOCIATED DEVICES AND METHODS," and U.S. patent application Ser. No. 18/349,674, filed Jul. 8, 2023, and titled "MECHANICAL THROMBECTOMY ASSEMBLY WITH EMBOLIC PROTECTION, AND ASSOCIATED DEVICES, SYSTEMS, AND METHODS," each of which is incorporated herein by reference in its entirety, and/or (ii) can be used to treat/remove clot material from a patient (e.g., a human patient) using any of the methods described in detail therein.

In the illustrated embodiment, the introducer catheter assembly 126 includes a first catheter 120 defining a first lumen 122 (shown in dashed line in FIG. 1) extending entirely therethrough. The first catheter 120 is coupled to a first valve 102 such that the first valve 102 can be fluidly coupled to the first lumen 122, and first lumen 122 can extend from the first valve 102 to a distal terminus 124 of the first catheter 120. The first catheter 120 can be an introducer sheath configured to be inserted through the skin and tissue tract of the patient to provide an access site through which other components (e.g., the embolic protection catheter assembly 128, the mechanical thrombectomy catheter assembly 130) can traverse to easily access the vasculature. The embolic protection catheter assembly 128 can, similarly, include a second catheter 140 defining a second lumen 123 extending entirely therethrough and the second catheter 140 can also be coupled to a second valve 134, such that the second valve 134 can be fluidly coupled to the second lumen 123. The embolic protection catheter assembly 128 can further include an embolic protection device 136 coupled to the second catheter 140. The embolic protection device 136 illustrated in FIG. 1 includes a conical member or funnel 144.

The funnel 144 can include a conically-shaped polymer layer, a coil, one or more wires, a mesh, a braided structure, an at least partially coated and/or dipped structure, and/or another suitable structure. The funnel 144 can have a radial force range (normalized, e.g., per contact area in vessel diameter) of from about 3 Newtons to about 100 Newtons. When braided, the funnel 144 can have a braid angle of from about 75 degrees to about 150 degrees. The funnel 144 can comprise one or more polymers, such as polyurethane, silicone, and/or copolymers of polyurethane and silicone. All or a subset of the coils, wires, mesh, etc., used to form the funnel 144 can be radiopaque and/or can be coated with a radiopaque material, e.g., to improve imaging/visualization of the funnel 144 within the patient. For example, to give the funnel 144 radiopaque properties, a radiopaque substrate (e.g., barium sulfate, bismuth, tungsten, platinum, iridium, gold, and/or other radiopaque materials) can be added to a polyurethane salutation at a concentration of from about 5% to about 40% (by mass or volume) and then the funnel 144 can be dipped into the solution and cured. The radiopaque substrate could, additionally or alternatively, be electroplated onto the funnel 144 to form a radiopaque layer having a thickness of from about 10 μm to about 1000 μm. In these and/or other embodiment, all or a subset of the elements (e.g., wires) that form the funnel 144 can be radiopaque and/or one or more radiopaque elements (e.g., radiopaque wires) can be woven into the braided structure of the funnel 144. In these and/or other embodiments, the funnel 144 can be configured to inhibit or even prevent fluid (e.g., blood) flow (e.g., through one or more surfaces of the funnel 144) when deployed. That is, the funnel 144 can be impermeable to blood flow. For example, in some embodiments the funnel 144 includes a wire braid that has been dip-coated to form an at least partially fluid-impermeable membrane around all, or at least a portion, of the wire braid. The coating can have a thickness of from about 50 μm to about 400 μm (for, e.g., braided funnels) and/or a thickness of from about 20 μm to about 400 μm (for, e.g., laser-cut or other unbraided funnels). All or at least a portion of the fluid that enters the funnel 144 (e.g., via passive flow, during aspiration, etc.) can be directed into the second lumen 123 of the second catheter 140. The funnel 144 can be self-expanding and configured to transition from a collapsed or undeployed configuration to an expanded or deployed configuration (shown in FIG. 1). For example, the funnel 144 can be in the collapsed configuration when positioned within a larger delivery catheter, such as the first catheter 120, and the funnel 144 can expand to the expanded configuration when the first catheter 120 (or other delivery catheter) is retracted over the second catheter 140 and/or the second catheter 140 is advanced so that the funnel 144 is no longer constrained by the first catheter 120 (when, e.g., the funnel 144 is positioned distally from the distal terminus 124 of the first catheter 120). In these and/or other embodiments, the embolic protection device 136 can include a balloon, a disc, a braided structure, and/or another suitable embolic protection device 136. The second valve 134 can be operably coupled to the embolic protection device 136 via the second catheter 140. Accordingly, moving the second valve 134, such as moving the second valve 134 in a proximal or distal direction, causes a corresponding movement of the embolic protection device 136.

In some embodiments, the first catheter 120 and/or the second catheter 140 ("catheters 120/140") include an elongate member (e.g., a sheath, a shaft) configured to be inserted into and through a patient's vasculature and used to, for example, remove or otherwise treat clot material therein. The catheters 120/140, and/or one or more portions thereof, can have varying lengths, flexibilities, shapes, thicknesses, and/or other properties. For example, the catheters 120/140 can comprise one or more coils, braids, and/or other structures positioned between one or more liner layers (e.g., inner and outer liner layers). In some embodiments, the catheters 120/140 can include several features generally similar or identical in structure and/or function to any of the catheters described in U.S. patent application Ser. No. 17/529,018, titled "CATHETERS HAVING SHAPED DISTAL PORTIONS, AND ASSOCIATED SYSTEMS AND METHODS," and filed Nov. 17, 2021, U.S. patent application Ser. No. 17/529,064, titled "CATHETERS HAVING STEERABLE DISTAL PORTIONS, AND ASSOCIATED SYSTEMS AND METHODS," and filed Nov. 17, 2021, and/or U.S. patent application Ser. No. 18/159,507, titled "ASPIRATION CATHETERS HAVING GROOVED INNER SURFACE, AND ASSOCIATE SYSTEM AND METHODS," and filed Jan. 25, 2023, each of which is incorporated by reference herein in its entirety.

The first valve 102 and/or the second valve 134 ("valves 102/134") can be integral with or coupled to the respective catheters 120/140 such that these components move together. In some embodiments, the valves 102/134 are hemostasis valves configured to maintain hemostasis during a clot treatment procedure by preventing fluid flow in a proximal direction through the valves 102/134 as various components such as dilators, delivery sheaths, pull members, guidewires, interventional devices, other aspiration catheters, and so on are inserted through the valves 102/134 to be delivered through the respective catheters 120/140 to a treatment site in a blood vessel. The first valve 102 can include a first branch or side port 104 configured to fluidly couple the first lumen 122 of the first catheter 120 to a first tubing assembly 110a. Similarly, the second valve 134 can include a second branch or side port 111 configured to fluidly couple the second lumen 123 of the second catheter 140 to a second tubing assembly 110b. In some embodiments, the valves 102/134 can be a valve of the type disclosed in U.S. Pat. No. 11,000,682, filed Aug. 30, 2018, and titled "HEMOSTASIS VALVES AND METHODS OF USE," which is incorporated herein by reference in its entirety.

In the illustrated embodiment, a first tubing assembly 110a fluidly couples the first catheter 120 to a first pressure source 106a, such as a syringe. The first pressure source 106a can be configured to generate (e.g., form, create, charge, build-up) a vacuum (e.g., negative relative pressure) and store the vacuum for subsequent application to the first catheter 120. The first tubing assembly 110a can include one or more first tubing sections 112 (individually labeled as a first tubing section 112a and a second tubing section 112b), at least one first fluid control device 114a (e.g., a valve), and at least one first connector 116a (e.g., a Toomey tip connector) for fluidly coupling the first tubing assembly 110a to the first pressure source 106a and/or other suitable components. In some embodiments, the first fluid control device 114a is a stopcock that is fluidly coupled to (i) the first side port 104 of the first valve 102 via the first tubing section 112a and (ii) the first connector 116a via the second tubing section 112b. The first fluid control device 114 is externally operable by a user to regulate the flow of fluid therethrough and, specifically, from the first lumen 122 of the first catheter 120 to the first pressure source 106a. For example, the first fluid control device 114a can be configured to be moved between a first position (e.g., a closed position, a fluidly disconnected position) in which fluid is inhibited from moving between the first catheter 120 and the first pressure source 106a and a second position (e.g., an open position, a fluidly connected position) in which fluid is permitted to move between the first catheter 120 and the first pressure source 106a. In some embodiments, the first connector 116a is a quick-release connector (e.g., a quick disconnect fitting) that enables rapid coupling/decoupling of the first catheter 120 and the first fluid control device 114a to/from the first pressure source 106a.

The second tubing assembly 110b can be configured to fluidly couple the second catheter 140 to a second pressure source 106b. In some embodiments the second pressure source 106b is separate from the first pressure source 106a, such as a separate syringe. In other embodiments, the second pressure source 106b can be omitted and the second tubing assembly 110b can be fluidly coupled to the first pressure source 106a in, e.g., series or parallel with the first pressure source 106a. The second tubing assembly 110b can include at least one second fluid control device 114b and at least one second connector 116b, each of which can be at least generally similar or identical in structure and/or function to the first fluid control device 114a and the first connector 116a, respectively.

In the illustrated embodiment, the mechanical thrombectomy catheter assembly 130 is positioned at least partially within the second lumen 123 with a portion thereof extending beyond the embolic protection device 136. The mechanical thrombectomy catheter assembly 130 can include a first or proximal actuation component 132, a second or distal actuation component 139, and one or more clot treatment devices 138. The proximal actuation component 132 (e.g., a proximal hub or handle) can be operably coupled to the clot treatment device 138 via an element shaft 142. Accordingly, moving the proximal actuation component 132, such as moving the proximal actuation component 132 in a proximal or distal direction, can cause a corresponding movement of the clot treatment device 138. In some embodiments, the element shaft 142 includes an atraumatic tip 146 defining a distalmost terminus of the mechanical thrombectomy catheter assembly 130. The distal actuation component 139 can be operably coupled to an additional delivery and/or deployment shaft 141 (which can also be referred to as a "delivery shaft," an "intermediate shaft," a "medial shaft," a "third shaft," a "catheter," and/or the like) configured to extend through the second catheter 140 and over the element shaft 142 to constrain the clot treatment device 138. Accordingly, moving the distal actuation component 139, such as moving the distal actuation component 139 in the proximal or distal direction, can move the deployment shaft 141 relative to the clot treatment device 138 to, for example, deploy the clot treatment device 138 from within the deployment shaft 141. That is, the clot treatment device 138 can be positioned within, or at least partially within, the deployment shaft 141 such that the deployment shaft 141 maintains a collapsed or undeployed configuration/state of the clot treatment device 138, and the distal actuation component 139 can be withdrawn (e.g., proximally) over and/or relative to the element shaft 142 to deploy the clot treatment device 138. For example, the proximal actuation component 132 can be pinned in position and the distal actuation component 139 can be withdrawn relative to the proximal actuation component 132. The proximal actuation component 132 and the distal actuation component 139 can be moved in tandem and/or relative to one another, e.g., to insert the clot treatment device 138 through the embolic protection catheter assembly 128 and/or distally beyond the embolic protection device 136. The element shaft 142 can be positioned within and/or extend through the second catheter 140 (e.g., the lumen 123), such that all, or at least a portion, of the element shaft 142 is positioned radially inwardly from the second catheter 140. In at least some embodiments, for example, at least part of an outer surface of the element shaft 142 is in sliding contact with an interior or lumen of the second catheter 140.

The distal actuation component 139 is shown fully withdrawn toward and/or into contact with the proximal actuation component 132 in FIG. 1 such that the clot treatment device 138 is deployed. Such deployment is described in further detail below with reference to FIGS. 11A-11G. In the illustrated embodiment, the distal actuation component 139 is a valve assembly including a connector 135 for attaching to one or more tubing sections, a fluid control device (which can be similar or identical to the fluid control devices 114a-b of FIG. 1), a pressure source (which can be similar or identical to the pressures source 106a-b of FIG. 1), etc., to, for example, facilitate aspiration through the deployment shaft 141.

As described in greater detail below with reference to FIGS. 11A-11G, during a procedure to treat clot material within a blood vessel of a patient, the system 100 can be inserted through the vasculature of the patient to proximate the clot material. In some embodiments, the system 100 is inserted through a separate introducer sheath that traverses the skin and tissue of the patient to provide an access site. In other embodiments, the introducer catheter assembly 126 serves as an introducer sheathe for the embolic protection catheter assembly 128, and/or the mechanical thrombectomy catheter assembly 130. The funnel 144 can be deployed from the first catheter 120 proximal to the clot material, and the clot treatment device 138 can be deployed from the first catheter 120 (via, e.g., the deployment shaft 141) at least partially distal to the clot material. The clot treatment device 138 can engage the clot material to disrupt, capture, and/or core the clot material. The funnel 144 can capture any of the clot material that breaks of (e.g., embolizes) during the engagement of the clot treatment device 138 with the clot material and/or redirect all or a portion of the broken-off clot material into the second catheter 140—thereby inhibiting the clot material from flowing farther into the vasculature of the patient. In some embodiments, the embolic protection device 136 can inhibit or even prevent blood flow past, through, and/or around the embolic protection device 136 within the blood vessel. Finally, the embolic protection device 136 and the clot treatment device 138 can be withdrawn into the first catheter 120, and the clot treatment system 100 can be withdrawn from the patient.

In some embodiments, the first catheter 120 can be aspirated during, before, and/or after use of the clot treatment device 138. For example, when the first catheter 120 is positioned at a target treatment location proximate to the clot material, a user/operator can first close the first fluid control device 114a before generating a vacuum in the first pressure source 106a by, for example, withdrawing the plunger of a syringe coupled to the first connector 116a. In this manner, a vacuum is charged within the first pressure source 106a (e.g., a negative pressure is maintained) before the first pressure source 106a is fluidly connected to the first lumen 122 of the first catheter 120. To aspirate the first lumen 122, the user can open the first fluid control device 114a to fluidly connect the first pressure source 106a to the first catheter 120 and thereby apply or release the vacuum stored in the first pressure source 106a to the first lumen 122. Opening of the first fluid control device 114a instantaneously or nearly instantaneously applies the stored vacuum pressure to the first tubing assembly 110a and the first catheter 120, thereby generating a suction pulse throughout the first catheter 120 that can aspirate the clot material into the first catheter 120. In some embodiments, the vacuum from the first pressure source 106a is applied with the first fluid control device 114a in an open position (e.g., to provide continuous vacuum). That is, the user can generate the vacuum in the first pressure source 106a while the first fluid control device 114a is open (e.g., while the first pressure source 106a is fluidly connected to the first lumen 122 of the first catheter 120) to thereby aspirate the clot material while also simultaneously generating the vacuum, e.g., without or substantially without storing the vacuum in the first pressure source 106a. In other embodiments, the first catheter 120 can be continuously and/or intermittently aspirated via a vacuum pump (e.g., an electric vacuum pump) or other source of aspiration. Similarly, in some embodiments the second catheter 140 can be aspirated during, before, and/or after use of the clot treatment device 138. The second catheter 140 can be aspirated in a manner that is at least generally similar or identical to aspirating the first catheter 120, but using the second tubing assembly 110b instead of the first tubing assembly 110a. The first pressure source 106a or the second pressure source 106b can be used to store and/or apply the vacuum to the second tubing assembly 110b. Additionally, or alternatively, the first pressure source 106a, the second pressure source 106b, or another pressure source can be fluidly coupled to the connector 135 and used to aspirate a lumen of the deployment shaft 141.

Figure 2A:
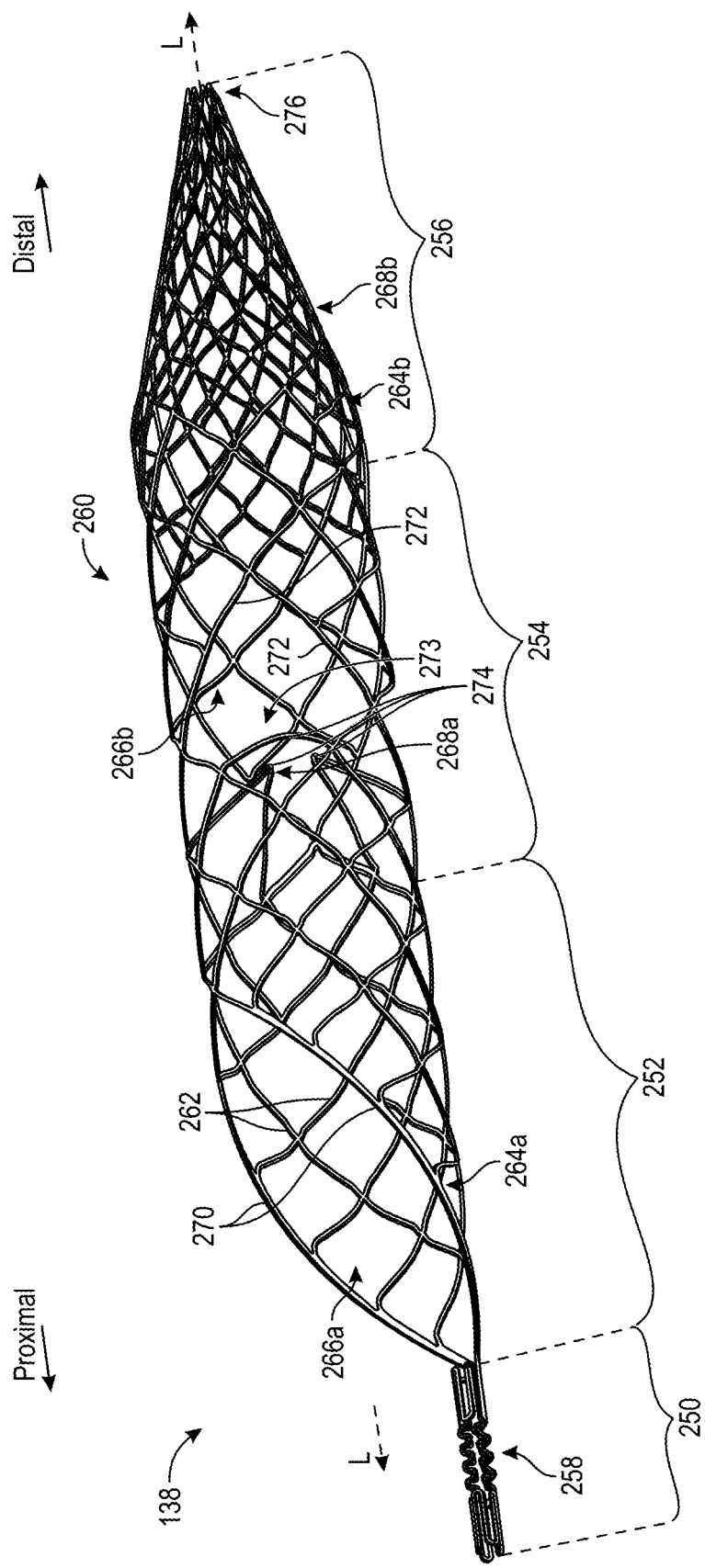
FIG. 2A is a perspective view of a clot treatment device of the clot treatment system of FIG. 1 in accordance with embodiments of the present technology.
Figure 2D:
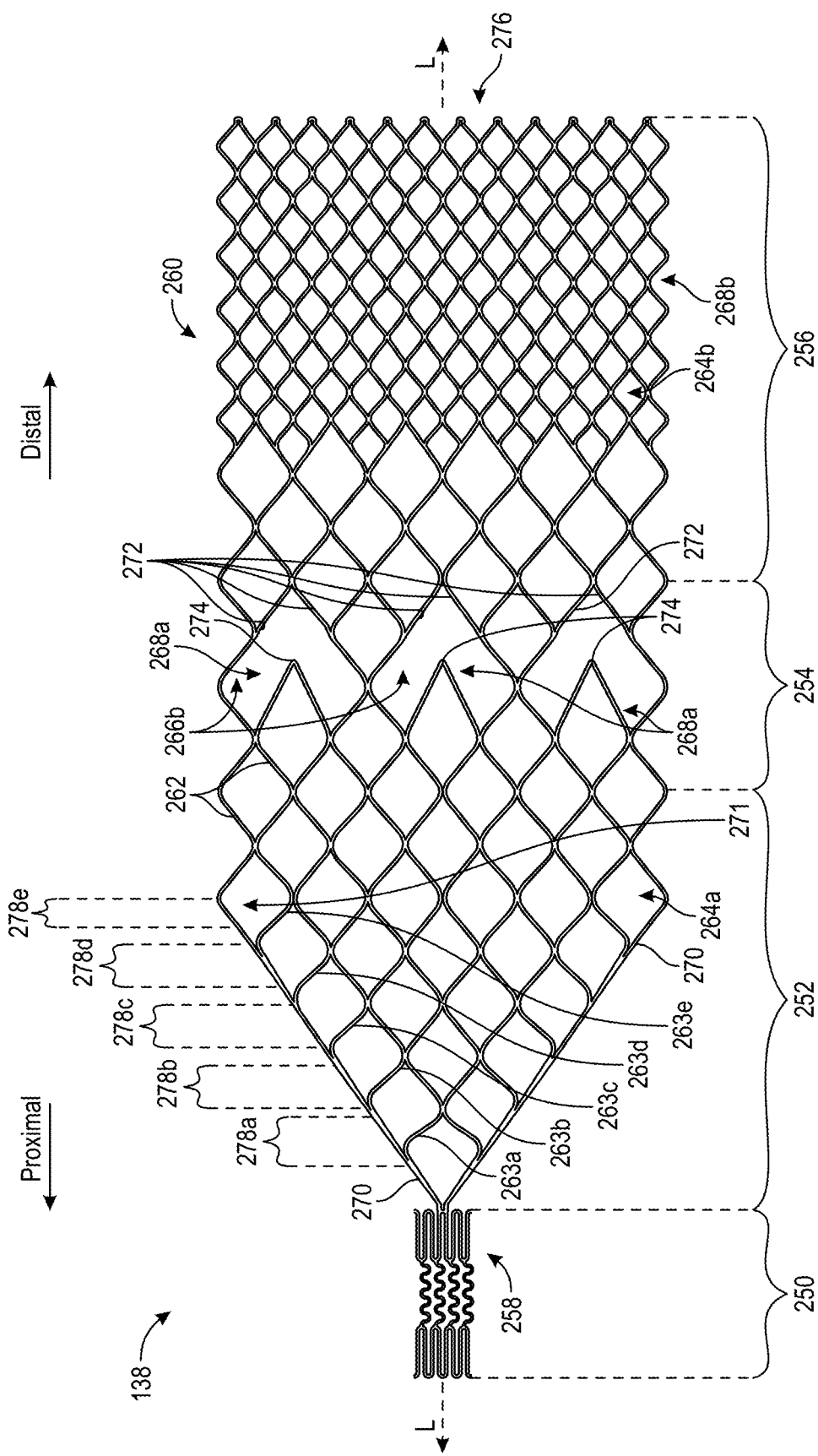
FIG. 2D is a plan view of the clot treatment device of FIG. 2A in a pre-shaped configuration in accordance with embodiments of the present technology.

FIG. 2A is a perspective view of the clot treatment device 138 of FIG. 1 in accordance with embodiments of the present technology. FIGS. 2B and 2C are side and top views, respectively, of the clot treatment device 138 in accordance with embodiments of the present technology. In each of FIGS. 2A-2C, the clot treatment device 138 is in an expanded/deployed configuration in which the clot treatment device 138 has a generally cylindrical or tubular shape. FIG. 2D is a plan view (e.g., a cut and laid flat view) of the clot treatment device 138 in accordance with embodiments of the present technology. Referring to FIGS. 2A-2D together, the clot treatment device 138 can include a first region 250, a second region 252 distal of the first region 250, a third region 254 distal of the second region 252, and a fourth region 256 distal of the third region 254. The first region 250 can include a hub or coupling portion 258 configured to couple the clot treatment device 138 to the element shaft 142 (FIG. 1). The second region 252, the third region 254, and the fourth region 256 can together define an expandable clot removal element 260. The clot removal element 260 can be a single (e.g., unitary) laser cut metal (e.g., nitinol) element formed from a plurality of interconnected struts 262. The regions 252-256 can curve and/or extend at least partially around a central axis L.

The clot removal element 260 can be self-expanding and configured to transition from a collapsed or undeployed configuration to the expanded configuration shown in FIGS. 2A-2C. All or a subset of the struts 262 can be configured to self-expand when, e.g., the clot removal element 260 is positioned beyond (e.g., distally beyond) a distal terminus of the deployment shaft 141 (FIG. 1). The coupling portion 258 can be part of this single laser cut metal element, but may not self-expand with the clot removal element 260 (because, e.g., it is coupled to the element shaft 142). For example, the clot removal element 260 can be in the collapsed configuration when positioned within a larger delivery catheter, such as the first catheter 120, and the clot removal element 260 can expand to the expanded configuration when the element shaft 142 (FIG. 1) is advanced relative to the deployment shaft 141 (FIG. 1) so that the clot removal element 260 is no longer constrained by the deployment shaft 141. Retracting the element shaft 142 proximally within the deployment shaft 141 can return the clot removal element 260 to the collapsed configuration. In some embodiments, the clot removal element 260 and/or one or more of the other clot treatment devices described herein can include some features that are generally similar or identical, and can function in a generally similar or identical manner, to any of the clot removal elements described in detail U.S. patent application Ser. No. 17/072,909, titled "SYSTEMS, DEVICES, AND METHODS FOR TREATING VASCULAR OCCLUSIONS," filed Oct. 16, 2020; U.S. patent application Ser. No. 17/125,397, titled "DEVICES AND METHODS FOR TREATING VASCULAR OCCLUSION," filed Dec. 17, 2020; and/or U.S. Pat. No. 10,709,471, titled "METHODS AND APPARATUS FOR TREATING EMBOLISM," and filed Apr. 10, 2018; and U.S. patent application Ser. No. 18/349,674, titled "MECHANICAL THROMBECTOMY ASSEMBLY WITH EMBOLIC PROTECTION, AND ASSOCIATED DEVICES, SYSTEMS, AND METHODS," and filed Jul. 8, 2023; each of which is hereby incorporated by reference in its entirety.

The struts 262 can define one or more cells 264 (individually identified as first cells 264a and second cells 264b), one or more mouths 266 (individually identified as a first or proximal mouth 266a and one or more second or distal mouths 266b), and one or more relief features 268 (individually identified as one or more first relief features 268a and a second relief feature 268b). The first relief features 268a can be referred to as proximal or middle relief features, and the second relief feature 268b can be referred to as a distal relief feature. In the illustrated embodiment, for example, the second region 252 includes one or more of the first cells 264a and the fourth region 256 includes one or more of the second cells 264b. All or subset of the second cells 264b can be smaller (e.g., smaller area, smaller width, smaller diameter, etc.) than all or a subset of the first cells 264a. In other embodiments, however, all or subset of the second cells 264b can be larger (e.g., larger area, larger width, larger diameter, etc.) than all or a subset of the first cells 264a.

The second region 252 can further include one or more leading edge portions 270 that define the first or proximal mouth 266a. As best seen in FIGS. 2B-2D, one or more of the leading edge portions 270 can include one or more strut segments 278 (individually identified as first through fifth segments 278a-e; for illustrative clarity, these are only labeled for one of the leading edge portions 270). Each of the strut segments 278 can be defined or extend between two or more proximal struts 263 (individually identified as first through fifth proximal struts 263a-e; for illustrative clarity, these are only labeled for one of the leading edge portions 270). In the illustrated embodiment, for example, (i) the first segment 278a extends between the first proximal strut 263a and the second proximal strut 263b, (ii) the second segment 278b extends between the second proximal strut 263b and the third proximal strut 263c, (iii) the third segment 278c extends between the third proximal strut 263c and the fourth proximal strut 263d, and (iv) the fourth segment 278d extends between the fourth proximal strut 263d and the fifth proximal strut 263e. The fifth segment 278e extends between the fifth proximal strut 263e and an apex or distal terminus 271 of the leading edge portion 270.

Figure 2E:
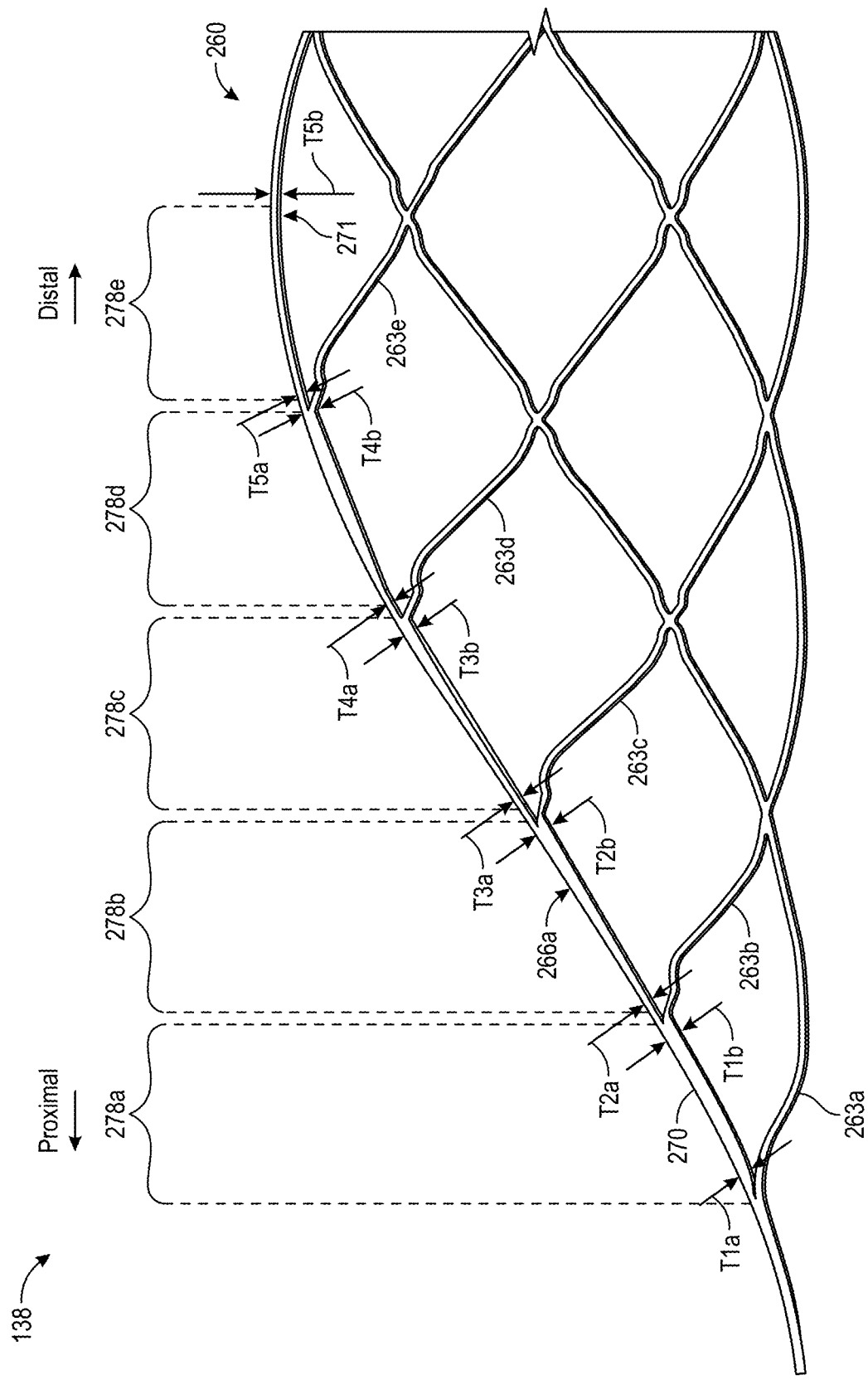
FIG. 2E is an enlarged side view of a leading edge portion of the clot treatment device of FIG. 2A in accordance with embodiments of the present technology.

FIG. 2E is an enlarged side view of one of the leading edge portions 270. As best seen in FIG. 2E, each of these segments 278 can have a thickness that cascades or varies over its length. In the illustrated embodiment, for example, the thickness of one or more of the segments 278 increases in a proximal-to-distal direction over the length of each individual segment 278 but can decrease at the transition between adjacent (e.g., immediately adjacent) segments. More specifically, (i) the first segment 278a can have a first primary thickness T1a at the first proximal strut 263a and a first secondary thickness T2a at the second proximal strut 263b that is greater than the first primary thickness T1a, (ii) the second segment 278b can have a second primary thickness T2a at the second proximal strut 263b and a second secondary thickness T2b at the third proximal strut 263c that is greater than the second primary thickness T2a, (iii) the third segment 278c can have a third primary thickness T3a at the third proximal strut 263c and a third secondary thickness T3b at the fourth proximal strut 263d that is greater than the third primary thickness T3a, and (iv) the fourth segment 278d can have a fourth primary thickness T4a at the fourth proximal strut 263d and a fourth secondary thickness T4b at the fifth proximal strut 263e that is greater than the fourth primary thickness T4a. The fifth segment 278e can have a fifth primary thickness T5a at the fifth proximal strut 263e and a fifth secondary thickness T5b at the apex 271 that is less than the fifth primary thickness T5a. The first primary thickness T1a can be greater than the second primary thickness T2a, the second primary thickness T2a can be greater than the third primary thickness T3a, the third primary thickness T3a can be greater than the fourth primary thickness T4a, the fourth primary thickness T4a can be greater than the fifth primary thickness T5a, and the fifth primary thickness Ta can be greater than the fifth secondary thickness T5b. The first secondary thickness T1b can be greater than the second secondary thickness T2b, the second secondary thickness T2b can be greater than the third secondary thickness T3b, the third secondary thickness T3b can be greater than the fourth secondary thickness T4b, the fourth secondary thickness T4b can be greater than the fifth primary thickness T5a, and the fifth primary thickness T5a can be greater than the fifth secondary thickness T5b. Accordingly, the thicknesses associated with the segments 278 can be defined as follows:

(1) $T1b > T1a$ (2) $T1b > T2b > T3b > T4b > T5a > T5b$ (3) $T1a > T2a > T3a > T4a > T5a > T5b$

The varying thicknesses of the segments 278 can allow the leading edge portions 270 to preferentially collapse or close in a distal-to-proximal direction. For example, in response to a compressive force on the clot removal element 260, the fifth segment 278e can collapse or flex radially inwardly, followed (e.g., one-by-one, in sequence, etc.) by the fourth segment 278d, the third segment 278c, the second segment 278b, and the first segment 278a. This is expected to allow the proximal mouth 266a to remain at least partially open, even in small diameter vessels, and, in turn, allow the clot removal element 260 to be used to remove clot material from those small diameter vessels.

Returning to FIGS. 2A-2D, the third region 254 can include one or more intermediate or medial edge portions 272 that define the one or more second or distal mouths 266b. The one or more second mouths 266b can be longitudinally offset from (e.g., positioned distal to) the first mouth 266a. Also in the third region 254, one or more of the struts 262 can terminate at one or more junctions 274 to define the first relief features 268a. In the illustrated embodiment, for example, pairs of the struts 262 in the third region 254 join at each of the junctions 274 to define a corresponding one of the first relief features 268a. As best seen in FIGS. 2A-2C, one or more of the first relief features 268a can be angled inwardly (e.g., toward the central axis L) and, accordingly, can be configured to contain or hold clot material ingested through the first mouth 266a within at least the second region 252. In some embodiments, the first relief features 268a can be configured to distribute captured clot material within the clot removal element 260 to, e.g., inhibit or prevent the captured clot material from accumulating at the distal end of the clot removal element 260. For example, as shown in FIGS. 2A-2C, the junctions 274 can be spaced apart from one another to define a central passage 273 between the first relief features 268a. A first portion of the clot material captured within the clot removal element 260 can pass distally through the central passage 273 while a second portion of the captured clot material can be retained proximal to the first relief features 268a, distributing captured clot material longitudinally within the clot removal element 260.

When a force on the first relief features 268a exceeds a corresponding first threshold, the first relief features 268a can be configured to bend or flex outwardly (to, e.g., rotate or otherwise move away from the central axis L). As described previously herein, the struts 262 can be formed from a shape-memory material such as Nitinol and, accordingly, in at least some embodiments the first relief features 268a can be shape set to the inwardly-angled orientation. Accordingly, in at least some embodiments, the first threshold associated with the first relief features 268a can be based on one or more of the shape set properties of the first relief features 268a. Additionally, or alternatively, the first threshold can be based, at least in part, on the thickness, length, angle, and/or other properties of the first relief features 268a. In these and/or other embodiments, the first threshold can be less than the yield strength, the ultimate strength, and/or the fracture strength of the struts 262 themselves and/or one or more other portions of the clot treatment device 138. Accordingly, in response to increasing amounts of force on the clot treatment device 138, the first relief features 268a are expected to bend/flex before other portions of the clot treatment device 138 yield, break, or otherwise fail.

In the fourth region 256, the struts 262 and/or the second cells 264b can be tapered radially inwardly toward the central axis L and/or a distal terminus 276 of the clot removal element 260. This radially inward taper of the struts 262 and/or the second cells 264b in the fourth region 256 can define the second relief feature 268b. When a force on the second relief feature 268b exceeds a corresponding second threshold, the second relief feature 268b can be configured to bend or flex outwardly (e.g., away from the central axis L) to open the distal terminus 276 of the clot removal element. That is, the generally conical shape of the fourth region 256 can deflect away from the central axis L to allow clot material to pass through the distal terminus when the second threshold force is exceeded. As described previously herein, the struts 262 can be formed from a shape-memory material such as Nitinol and, accordingly, in at least some embodiments the second relief feature 268b can be shape set to the inwardly-tapered configuration. Accordingly, in at least some embodiments, the second threshold can be based on one or more of the shape set properties of the second relief feature 268b. Additionally, or alternatively, the second threshold can be based, at least in part, on the thickness, length, angle, and/or other properties of the second relief feature 268b. In these and/or other embodiments, the second threshold can be less than the yield strength, the ultimate strength, and/or the fracture strength of the struts 262 themselves and/or one or more other portions of the clot treatment device 138. Accordingly, in response to increasing amounts of force on the clot treatment device 138, the second relief feature 268b is expected to bend/flex before other portions of the clot treatment device 138 yield, break, or otherwise fail. The distal terminus 276 can be an unconstrained and/or free end of the clot removal element 260. In at least some embodiments, for example, the distal terminus 276 is not connected to the element shaft 142 (FIG. 1) and/or one or more catheters or shafts.

Referring again to FIGS. 2A-2D, during a clot treatment procedure the clot removal element 260 can mechanically engage clot material within a patient's blood vessel to disrupt, capture, and/or core the clot material. For example, the clot removal element 260 can be deployed distal to the clot material and moved proximally toward and/or at least partially through the clot material. As the clot removal element 260 is moved proximally, the first mouth 266a can core or capture at least a portion of the clot material and direct the cored/captured clot material into the clot removal element 260. The one or more second mouths 266b can, due to their longitudinally offset position from the first mouth 266a, core or capture additional and/or other clot material than the first mouth 266a. For example, as the clot removal element 260 is moved proximally through clot material within a patient's blood vessel, the first mouth 266a can core/capture a first portion of the clot material and the one or more second mouths 266b can core/capture a second portion of the clot material different than the first portion. The cells 264 defined by the struts 262 can be sized and/or otherwise configured to generally retain the capture clot material within the clot removal element 260 while allowing blood and/or other fluids within a patient's blood vessel to pass through the clot removal element 260. As clot material is captured by the first mouth 266a and accumulates within the second region 252, the accumulated clot material can apply an increasing force on the first relief features 268a. This force on the first relief features 268a can also be increased when, for example, a user tries to withdraw the clot removal element 260 into the funnel 144 (FIG. 1) and/or the deployment shaft 141 while the clot removal element 260 contains clot material. When the magnitude of that force exceeds the first threshold associated with the first relief features 268a, the first relief features 268a can bend or flex outwardly (e.g., away from the central axis L) and allow at least a portion of the clot material within the second region 252 to move distally past the first relief features 268a, through the third region 254, and/or into the fourth region 256. This can, in turn, reduce the total force on the clot removal element 260 and inhibit or even prevent the clot removal element 260 from yielding, breaking, or otherwise failing. As clot material accumulates within the fourth region 256, either after the first relief features 268a release a portion of the accumulated clot material and/or as the second mouths 266b capture additional clot material, the accumulated clot material can apply an increasing force on the second relief feature 268b. This force on the second relief feature 268b can also be increased when, for example, a user tries to withdraw the clot removal element 260 into the funnel 144 (FIG. 1) and/or the deployment shaft 141 while the clot removal element 260 contains clot material. When the magnitude of that force exceeds the second threshold associated with the second relief feature 268b, the second relief feature 268b can be configured to bend or flex outwardly (e.g., away from the central axis L) to expand or open the distal terminus 276 and release clot material from within the fourth region 256. This can, in turn, reduce the total force on the clot removal element 260 and inhibit or even prevent the clot removal element 260 from yielding, breaking, or otherwise failing.

Figure 2F:
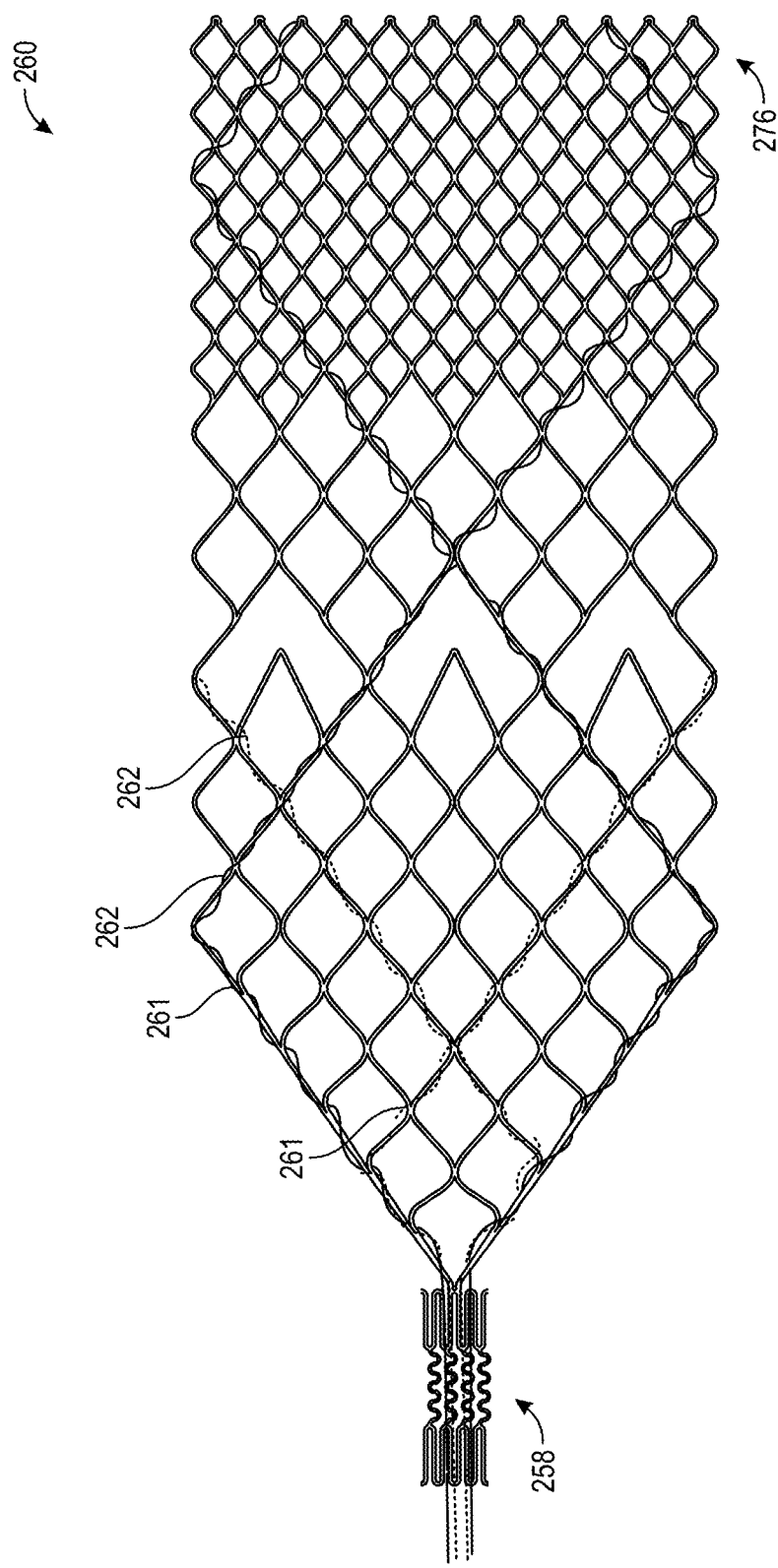
FIG. 2F is another plan view of the clot treatment device of FIG. 2A in the pre-shaped configuration in accordance with embodiments of the present technology.

FIG. 2F is another plan view of the clot treatment device 138 in the pre-shaped configuration. In some embodiments, the clot removal element 260 can include one or more visualization features 261 configured to improve imaging/visualization of the clot removal element 260, e.g., when the clot removal element 260 is positioned within a patient. In the illustrated embodiment, the visualization features 261 include one or more radio-opaque wires wound/wrapped around individual ones of the struts 262, e.g., through one or more of the mouths and/or cells defined by the struts 262. In some embodiments, the visualization features 261 comprise multiple wires that are wrapped around the struts 262. These wires can extend in a direction from the coupling portion 258 toward and/or to the distal terminus 276 and, in at least some embodiment, return toward and/or to the coupling portion 258 to, e.g., have a helical shape about the clot removal element 260. In some embodiments, the visualization features 261 include two wires wrapped in such a manner. The wires can be formed from platinum and/or one or more other suitable materials. In these and/or other embodiments, the visualization features 261 can include one or more dyes, coatings, and/or other suitable visualization features.

Figure 3A:
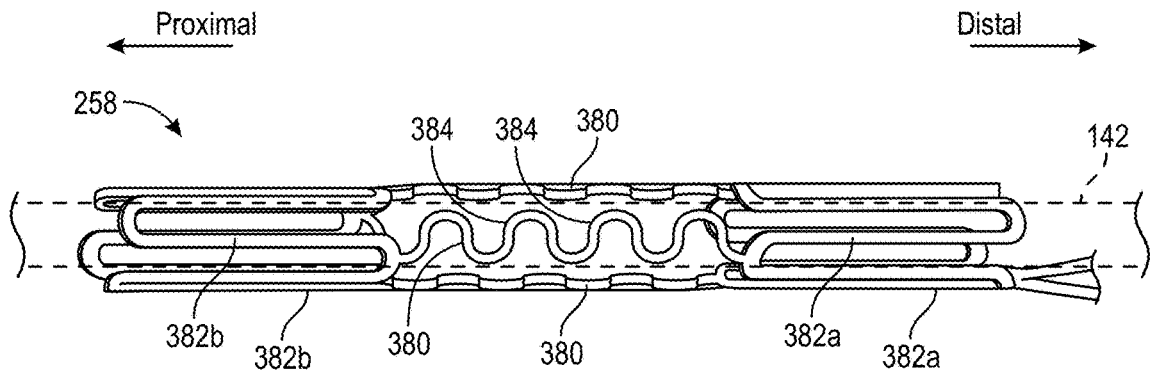
FIG. 3A is a side view of a coupling portion of clot treatment device of FIG. 2A in accordance with embodiments of the present technology.
Figure 3B:
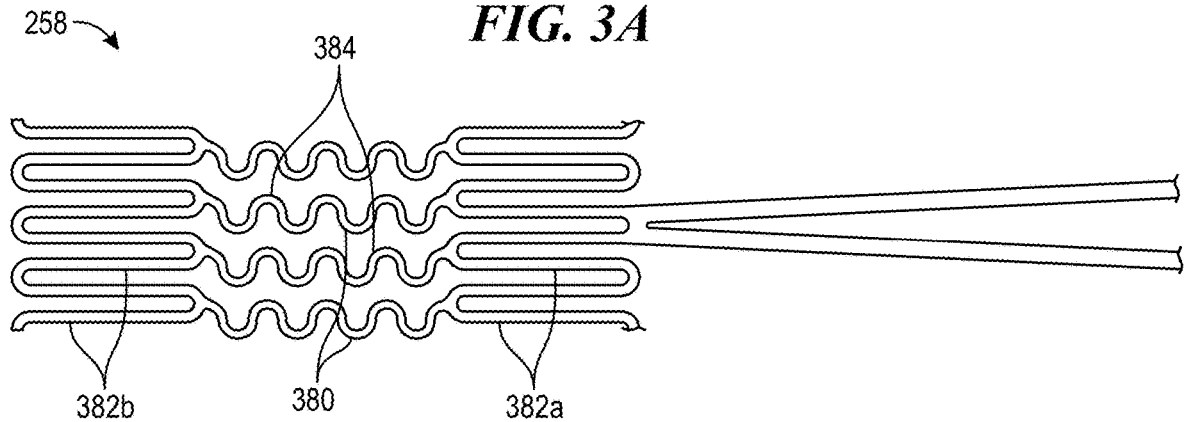
FIG. 3B is a plan view of the coupling portion of the clot treatment device of FIG. 3A in a pre-shaped configuration in accordance with embodiments of the present technology.

FIG. 3A is a side view of the coupling portion 258 of the clot treatment device 138 and FIG. 3B is a plan view (e.g., a cut and laid flat view) of the coupling portion 258 in accordance with embodiments of the present technology. Referring to FIGS. 3A and 3B together, the coupling portion 258 can include one or more attachment struts 380 and one or more terminal struts 382 (individually identified as distal terminal struts 382a and proximal terminal struts 382b). One or more of the attachment struts 380 can have an undulating (e.g., wavy) or other curved shape that defines one or more strut portions 384 that extend perpendicularly, or at least generally perpendicularly, to a length of the element shaft 142. One or more of the terminal struts 382 can extend parallel, or at least generally parallel, to the length of the element shaft 142 (shown in dashed line in FIG. 3A). In the illustrated embodiment, one or more of the attachment struts 380 extend between or couple one or more of the distal terminal struts 382a to one or more of the proximal terminal struts 382b. In other embodiments, one or more of the distal and/or proximal terminal struts 382a, 382b can be omitted.

The coupling portion 258, including all or a subset of the attachment struts 380 and/or the terminal struts 382, can be coupled (via, e.g., adhesive and/or polymer reflow) to the element shaft 142. When the clot removal element 260 (FIGS. 1-2C) is in use, such as while clot material accumulates within the clot removal element 260, this coupling between the coupling portion and the element shaft 142 can be subject to one or more forces and/or loads, including e.g., tensile forces, compressive loads, torsional loads, rotational forces, and/or bending in, e.g., the proximal or distal direction. In some instances, these forces/loads can cause the element shaft 142 to stretch or flex. In response to these forces, one or more of the attachment struts 380 can elongate and distribute these forces more evenly along both the element shaft 142 and/or through the attachment struts 380 themselves, which can inhibit or even prevent weak points from developing. In at least some embodiments, for example, the coupling portion 258 can bend or flex with the element shaft 142, inhibiting or even preventing relative movement between these components that can stress the attachment/bond therebetween.

The curved shape of the attachment struts 380 can provide an increased surface area over which the attachment struts 380 can be coupled to the element shaft 142 and, accordingly, can improve the engagement of the coupling portion 258 with the element shaft 142. The length and/or amplitude of the undulating shape of the attachment struts 380 can be tuned to emphasize elongation or to emphasize surface area based on, e.g., the catheter size. Similarly, the terminal struts 382 can provide an increased surface area over which the attachment struts 380 can be coupled to the element shaft 142. The tangential strut portions 384 can also improve the coupling portion's engagement with the element shaft 142. For example, when the attachment struts 380 are adhered to the element shaft 142 using, e.g., a bond material, one or more of the tangential strut portions 384 can engage the bond material and serve as clamps that provide increasing engagement as the tensile force increases.

Figure 4:
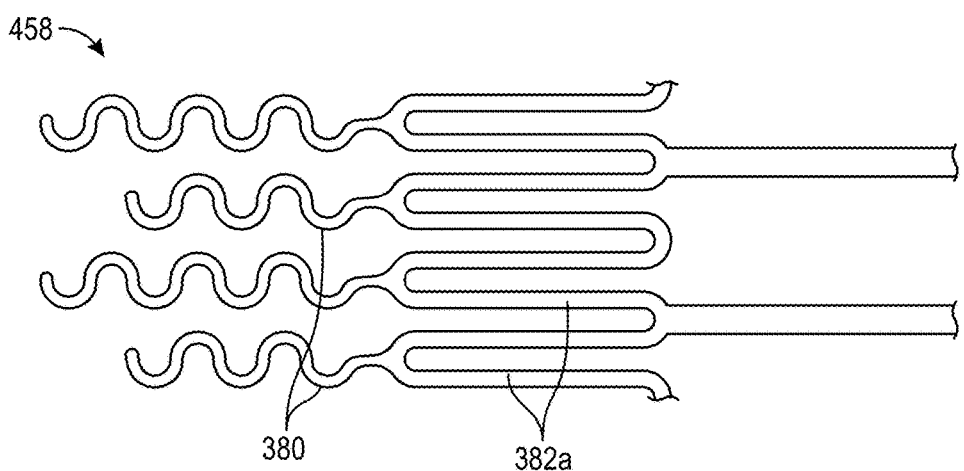
FIGS. 4 and 5 are side views of coupling portions of a clot treatment device in pre-shaped configurations in accordance with additional embodiments of the present technology.

FIG. 4 is a plan view (e.g., cut and laid flat view) of another coupling portion 458 in accordance with embodiments of the present technology. The coupling portion 458 can include one or more features that are at least generally similar or identical in structure and/or function to the coupling portion 258 of FIGS. 3A and 3B. For example, the coupling portion 458 includes one or more of the attachment struts 380 and one or more of the distal terminal struts 382a. However, compared to the coupling portion 258 (FIGS. 3A and 3B), the coupling portion 458 omits the proximal terminal struts 382b.

Figure 5:
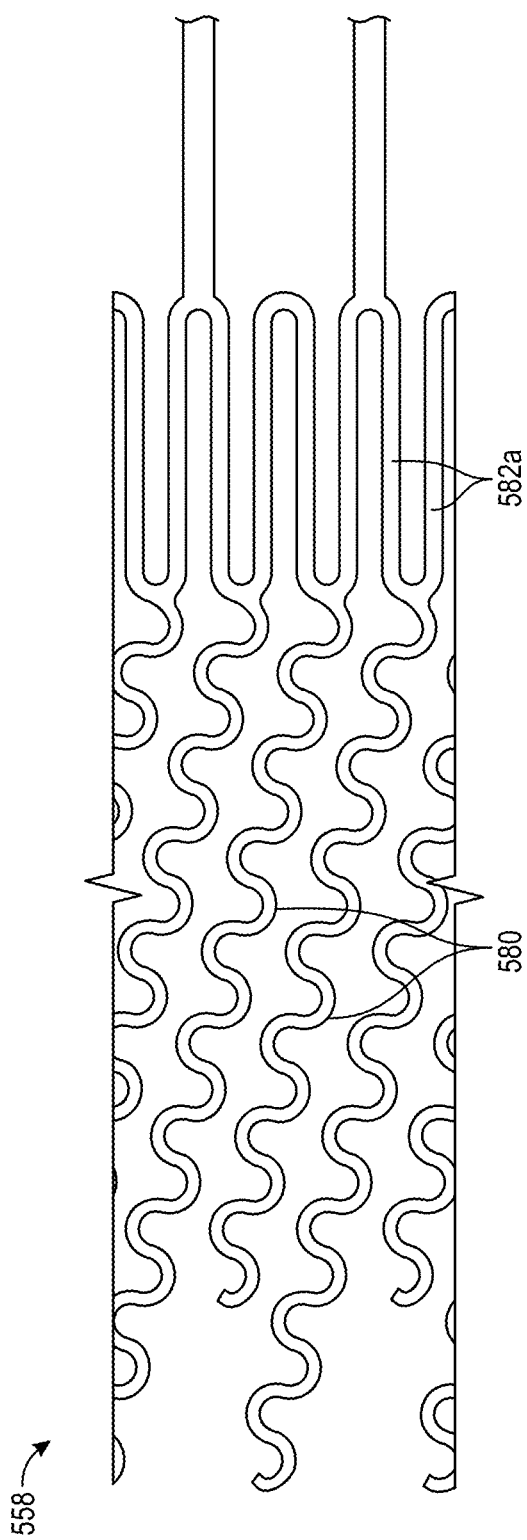

FIG. 5 is a plan view (e.g., cut and laid flat view) of another coupling portion 558 in accordance with embodiments of the present technology. The coupling portion 458 can include one or more features that are at least generally similar or identical in structure and/or function to the coupling portion 458 of FIG. 4. For example, the coupling portion 558 includes one or more attachment struts 580 and one or more distal terminal struts 582a. However, compared to the coupling portion 458 (FIG. 4), the attachment struts 580 extend proximally and at an angle from the distal terminal struts 582a. Accordingly, when the coupling portion 558 is coupled to the element shaft 142 (FIG. 1), the attachment struts 580 can extend helically around the element shaft 142. This helical arrangement of the distal terminal struts 582a can add additional dynamic tensile translation. For example, when force is applied to the coupling portion 558, one or more of the attachment struts 580 can stretch and/or be drawn/pressed inwardly against the element shaft 142, providing or increasing an inward clamp force against the element shaft 142. This increases the hold of the coupling portion 558 on the element shaft 142 shaft while also inhibiting or preventing the formation of weak points, as described above with reference to FIGS. 3A and 3B.

Figure 6A:
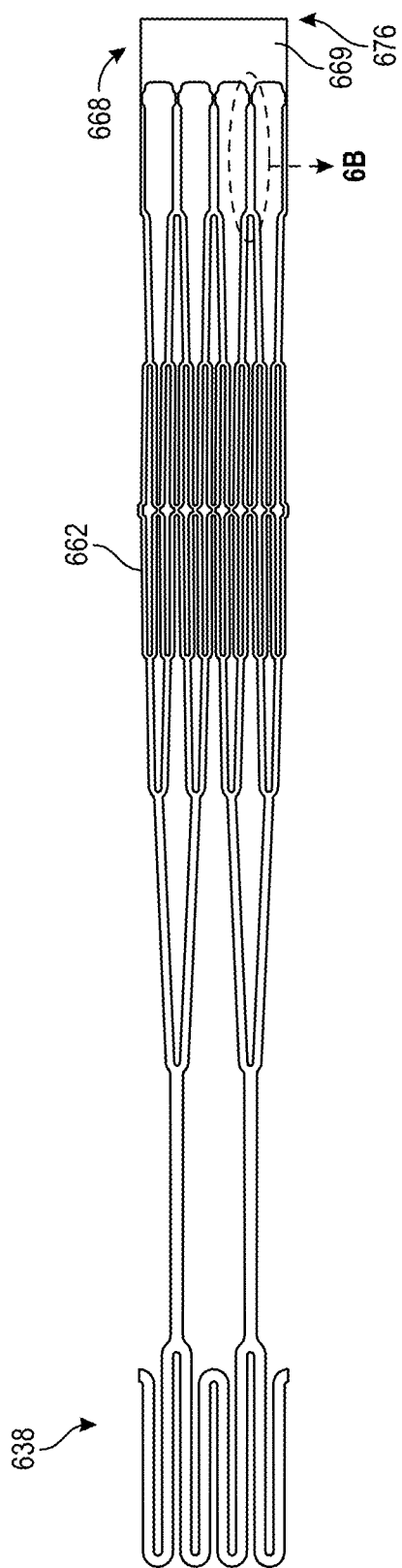
FIG. 6A is a plan view of a clot treatment device configured in accordance with additional embodiments of the present technology.
Figure 6B:
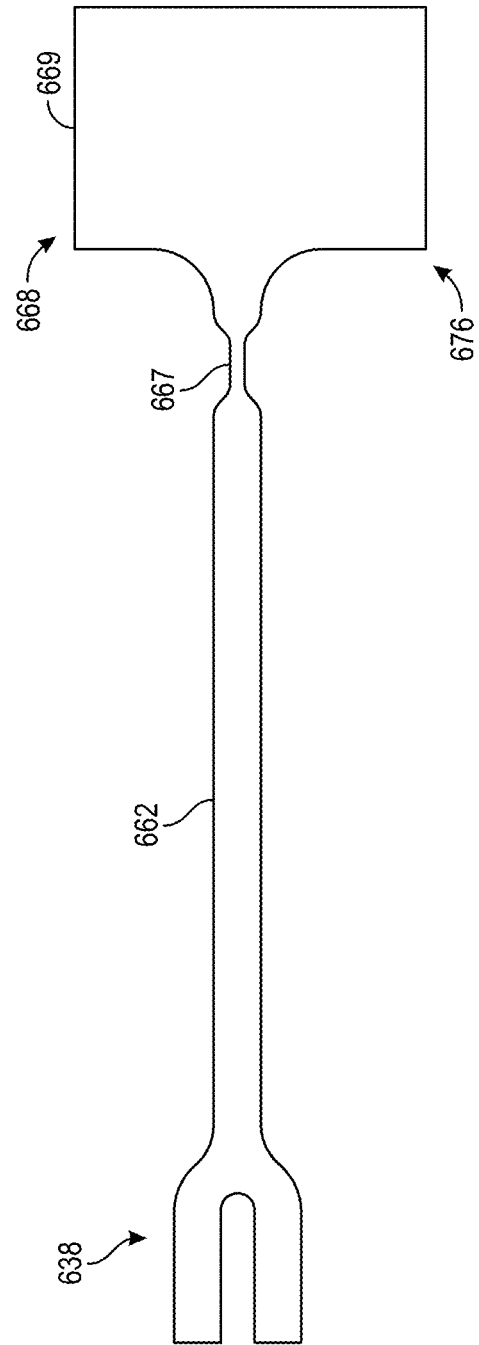
FIG. 6B is an enlarged view of a portion of the clot treatment device of FIG. 6A in accordance with embodiments of the present technology.

FIG. 6A is a plan view (e.g., a cut and laid flat view) of a clot treatment device 638 configured in accordance with additional embodiments of the present technology. FIG. 6B is an enlarged view of region 6B in FIG. 6A. The clot treatment device 638 can be at least generally similar in structure and/or function to one or more of the other clot treatment devices described herein. For example, the clot treatment device 638 can include a relief feature 668 (e.g., a distal relief feature) that is generally similar to the second relief feature 268b of the clot treatment device 138 of FIGS. 2A-2C. For example, the clot treatment device 638 can include one or more struts 662 and the relief feature 668 can be positioned at or define a distal terminus 676 of the clot treatment device 638. However, in the illustrated embodiment the relief feature 668 includes a collar or cuff 669 and, as best seen in FIG. 6B, the cuff 669 can be coupled to one or more of the struts 662 by one or more fuses or frangible strut sections 667. In the illustrated embodiment the frangible strut sections 667 are narrowed portions of the struts 662 that are configured to break when a force on the frangible strut sections 667 equals or exceeds a corresponding threshold. In other embodiments, one or more of the frangible strut sections 667 can be perforated or otherwise configured to break when the force equals or exceeds the threshold. The threshold can be less than the yield strength, the ultimate strength, and/or the fracture strength of the struts 662 themselves and/or one or more other portions of the clot treatment device 638.

The cuff 669 can hold the distal terminus 676 closed to inhibit or even prevent clot material within the clot treatment device 638 from moving distally out from the interior of the clot treatment device 638. However, the cuff 669 can be subject to increasing magnitudes of force as clot material accumulates within the clot treatment device 638. When the force on the cuff 669 exceeds the threshold, all or a subset of the frangible strut sections 667 can be configured to break, allowing the distal terminus 676 of the clot treatment device 638 to open and release captured clot material, thereby reducing the force and/or load on other portions of the clot treatment device 638. Accordingly, in response to increasing amounts of force on the clot treatment device 638, the frangible strut sections 667 are expected to break before other portions of the clot treatment device 638 yield, break, or otherwise fail.

Figure 7:
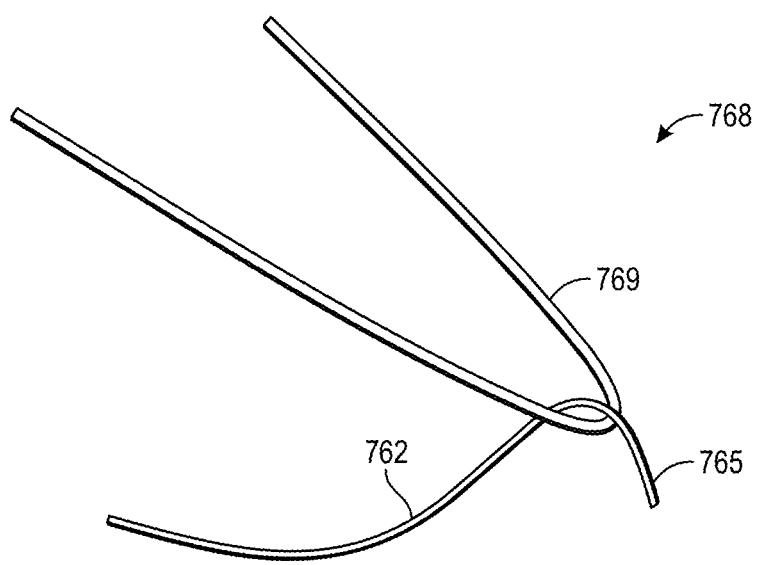
FIG. 7 is a perspective view of a relief feature of a clot treatment device in accordance with embodiments of the present technology.

FIG. 7 is a perspective view of another relief feature 768 configured in accordance with additional embodiments of the present technology. The relief feature 768 can include one or more struts 762 that define a hook portion 765 and a loop 769 of, e.g., one or more of the other struts 762. The hook portion 765 can engage the loop 769, as shown in FIG. 7, to retain clot material within a clot treatment device. However, as hook portion 765 and the loop 769 can be subject to increasing magnitudes of force as clot material accumulates within a clot treatment device incorporating the relief feature 768. When the force on the hook portion 765 and/or the loop 769 exceeds a threshold, the hook portion 765 can bend, flex, or otherwise disengage the loop 769 to open the clot treatment device and release captured clot material to thereby reduce the force and/or load on other portions of the clot treatment device.

Figure 8:
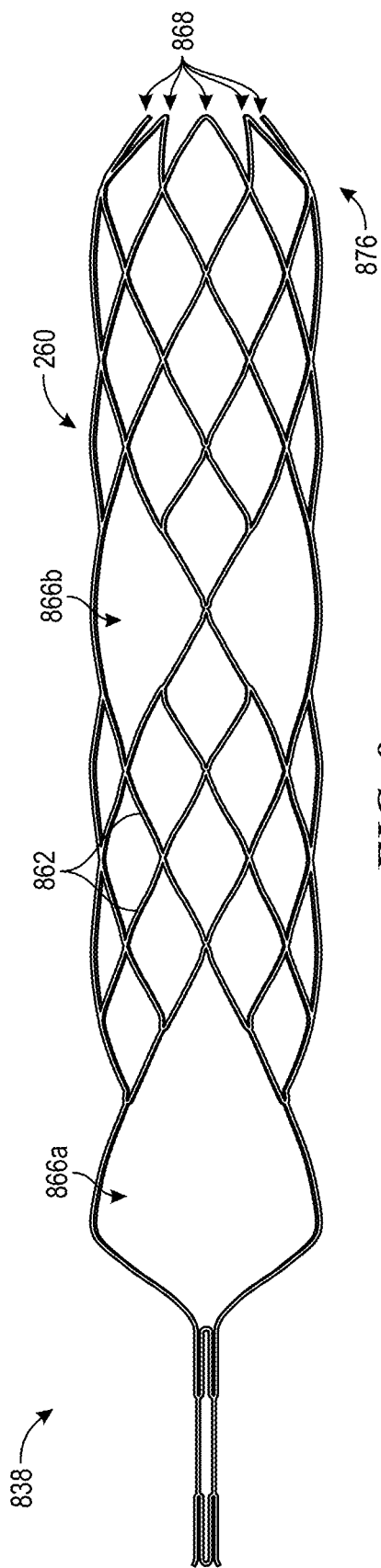
FIG. 8 is a top view of a clot treatment device in accordance with additional embodiments of the present technology.

FIG. 8 is a top view of another clot treatment device 838 configured in accordance with embodiments of the present technology. At least some aspects of the clot treatment device 838 can be at least generally similar or identical in structure and/or function to one or more of the clot treatment devices described previously herein. For example, the clot treatment device 838 can be formed from one or more struts 862 and define a first or proximal mouth 866a and one or more second or distal mouths 866b that can be spaced longitudinally apart (e.g., distally from) the proximal mouth 866a. The clot treatment device 838 can also include one or more relief features 868, individual ones of which can be at least generally similar or identical in structure and/or function to the first relief features 268a of FIG. 2A. However, compared to the first relief features 268a, the relief features 868 can define a distal terminus 876 of the clot treatment device 838 and, e.g., the clot treatment device 838 can omit any other relief features.

Figure 9:
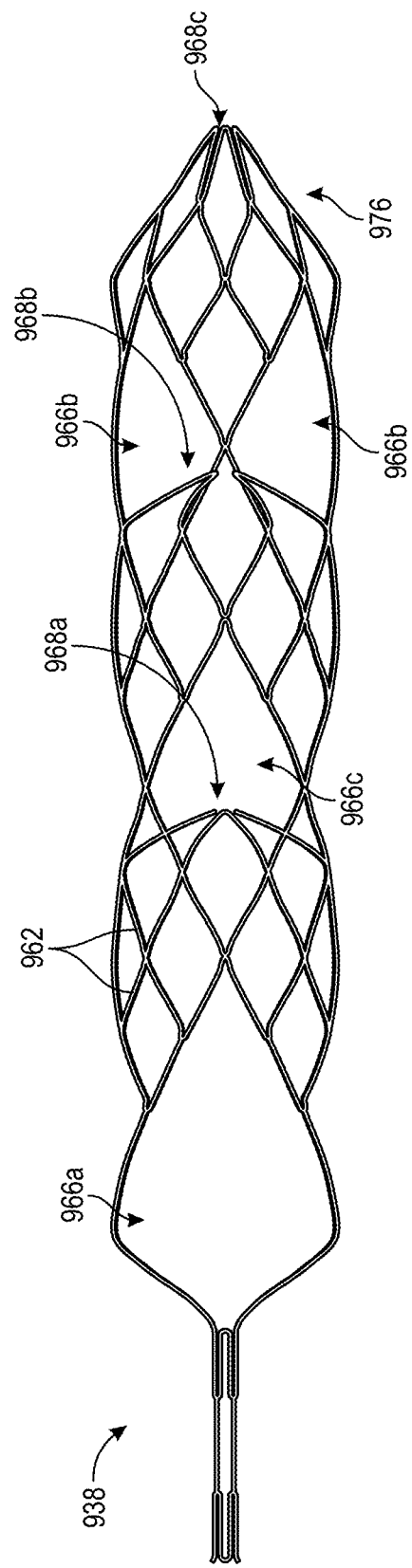
FIG. 9 is a top view of a clot treatment device in accordance with additional embodiments of the present technology.

FIG. 9 is a top view of another clot treatment device 938 configured in accordance with embodiments of the present technology. At least some aspects of the clot treatment device 938 can be at least generally similar or identical in structure and/or function to one or more of the clot treatment devices described previously herein. For example, the clot treatment device 938 can be formed from one or more struts 962 and define a first or proximal mouth 966a and one or more second or distal mouths 966b that can be spaced longitudinally apart (e.g., distally from) the proximal mouth 966a. Additionally, the clot treatment device 938 can define one or more third or medial mouths 966c positioned between the proximal and distal mouths 966a, 966b. The clot treatment device 838 can also include one or more relief features 968 (individually identified as one or more first relief features 968a, one or more second relief features 968b, and one or more third relief features 968c) individual ones of which can be at least generally similar or identical in structure and/or function to the first relief features 268a of FIG. 2A. The one or more first relief features 968a can be positional at least partially between the proximal and medial mouths 966a, 966c. The one or more second relief features 968b can be positioned at least partially between the medial and distal mouths 966c, 966b. The one or more third relief features 968c can define a distal terminus 976 of the clot treatment device 938.

Figure 10:
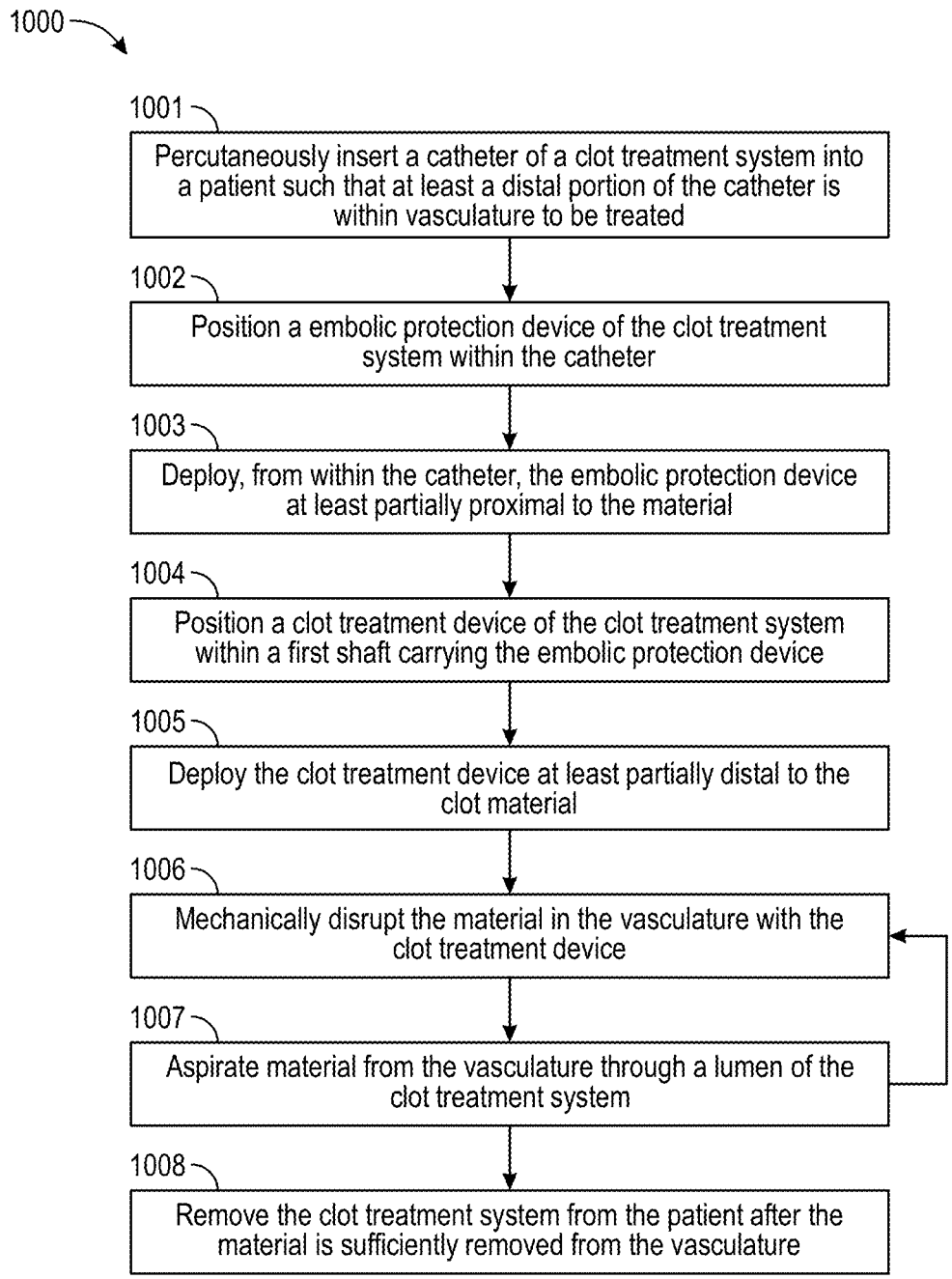
FIG. 10 is a flow diagram of a process or method for removing clot material from the vasculature of a patient using a clot treatment system in accordance with embodiments of the present technology.

FIG. 10 is a flow diagram of a process or method 1000 for removing clot material from the vasculature of a patient using a clot treatment system in accordance with embodiments of the present technology. Although some features of the method 1000 are described in the context of the clot treatment system 100 shown in FIG. 1 for illustration, one skilled in the art will readily understand that the method 1000 can be carried out using other suitable systems and/or devices described herein, including any of the other clot removal devices described herein. FIGS. 11A-11G are side views of the clot treatment system 100 of FIG. 1 during different stages of the method 1000, in accordance with embodiments of the present technology. Individual ones of FIGS. 11A-11G are described below with reference to one or more blocks 1001-1008 of the method 1000.

Figure 11A:
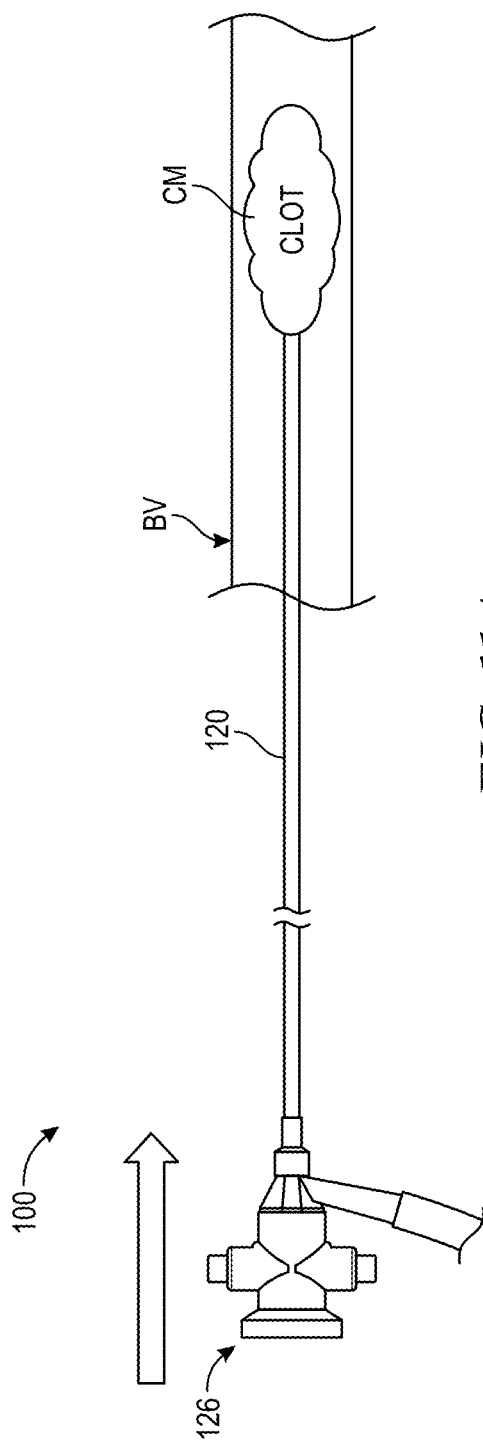

At block 1001, the method 1000 can include percutaneously inserting a catheter of a clot treatment system into a patient such that at least a distal portion of the catheter is positioned within a blood vessel to be treated. For example, FIG. 11A shows introducer catheter assembly 126, including the first catheter 120, interested through the skin of a patient and into the blood vessel BV including clot material CM to be treated. In some instances, the clot material CM can substantially occlude the blood vessel BV, such as shown in FIG. 11A, or can partially occlude the blood vessel BV. The blood vessel BV can comprise a peripheral artery of a human patient, and the clot material CM can comprise a thromboembolism therein. Accordingly, the method 1000 can be a method for treating acute limb ischemia (ALI), acute visceral ischemia, chronic limb ischemia (CLI), and/or the like.

Figure 11B:
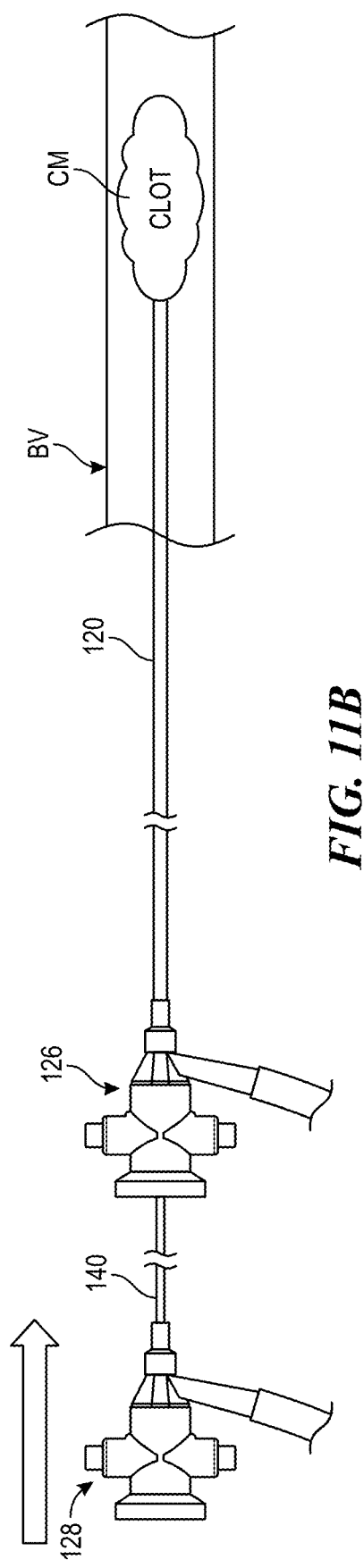

At block 1002, the method 1000 can include positioning an embolic protection device of the clot treatment system within the catheter. For example, FIG. 11B shows the embolic protection catheter assembly 128, including the second catheter 140 positioned within and/or extending through the introducer catheter assembly 126 and the first catheter 120 thereof. The second catheter 140 can carry the embolic protection device 136 (FIG. 1) so that both can be advanced distally through the first catheter 120 toward the clot material CM.

Figure 11C:
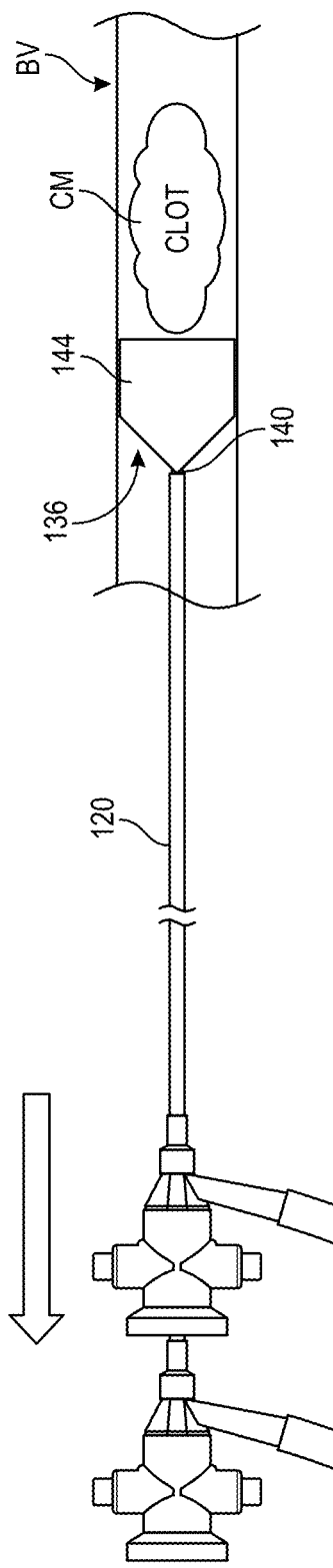

At block 1003, the method 1000 can include deploying, from within the catheter, the embolic protection device at least partially proximal to the clot material in the blood vessel. For example, FIG. 11C shows the embolic protection device 136 including the funnel 144 deployed/expanded within the blood vessel BV, with at least a portion of the funnel 144 positioned proximally of the clot material CM. The embolic protection device 136 can be deployed/expanded by retracting the first catheter 120 (e.g., proximally and/or over the second catheter 140) to uncover the embolic protection device 136. When expanded/deployed, the embolic protection device 136 can span all or a portion of the width/diameter of the blood vessel BV and block or substantially block blood flow through the blood vessel BV.

Figure 11D:
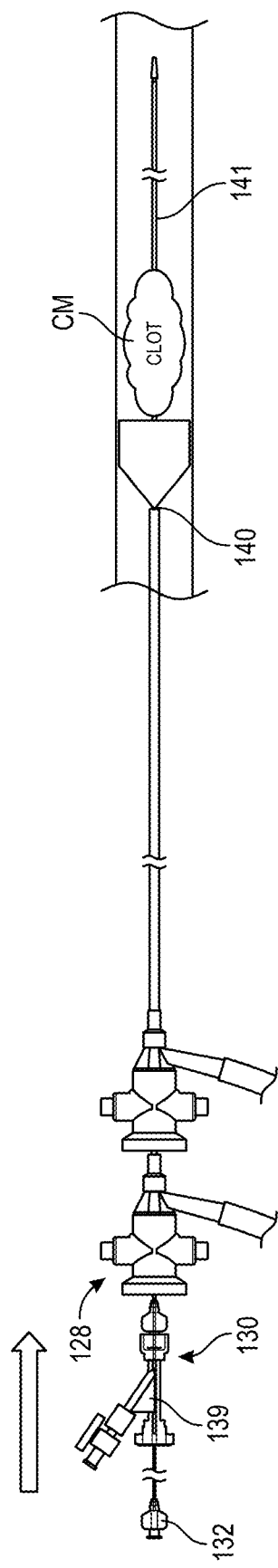

At block 1004, the method 1000 can include positioning a clot treatment device within the first shaft of the embolic protection device. For example, FIG. 11D shows the deployment shaft 141 of the mechanical thrombectomy catheter assembly 130 positioned within and advanced through the second catheter 140 of the embolic protection catheter assembly 128. The deployment shaft 141 can cover and/or constrain the clot treatment device 138 (FIGS. 1-2F). Accordingly, the clot treatment device 138 can be advanced together with the deployment shaft 141 while constrained therein. In some embodiments, at least a portion of the deployment shaft 141 can extend distally beyond the second catheter 140 and/or the clot material CM, as shown in FIG. 11D. During insertion, the proximal actuation component 132 and the distal actuation component 139 can be spaced apart from one another. For example, as described above with reference to FIG. 1, the proximal actuation component 132 and/or the element shaft 142 (FIG. 1) can be pinned in position relative to the distal actuation component 139 such that the clot treatment device 138 (FIG. 1) is constrained within the deployment shaft 141.

At block 1005, the method 1000 can include deploying the clot treatment device at least partially distal to clot material in the blood vessel. For example, FIG. 11E shows the clot treatment device 138 deployed/expanded within the blood vessel BV, with at least a portion of the clot treatment device 138 positioned distal to the clot material CM. The clot treatment device 138 can be deployed/expanded by retracting the deployment shaft 141 (e.g., proximally and/or over the element shaft 142) to uncover the clot removal element 260 carried thereby. To withdraw the deployment shaft 141, the distal actuation component 139 can be withdrawn over the element shaft 142 toward the proximal actuation component 132, decreasing the distance between the distal actuation component 139 and the proximal actuation component 132, e.g., until the distal actuation component 139 contacts the proximal actuation component 132 as shown in FIG. 11E. In some embodiments, deploying the clot treatment device includes centering the clot treatment device within the blood vessel. For example, the clot treatment device 138 can be configured to self-center in response to, e.g., contact with the blood vessel BV and/or one or more forces on the clot treatment device 138 that cause the clot treatment device 138 to deploy/expand.

At block 1006, the method 1000 can include mechanically disrupting the clot material in the blood vessel with the clot treatment device. For example, FIG. 11F shows the clot treatment device 138 (e.g., the clot removal element 260, shown in FIG. 11E) retracted (e.g., proximally) to capture at least a portion of the clot material CM (via, e.g., the first mouth 266a and/or one or more of the second mouths 266b; FIGS. 2A-2D). The clot treatment device 138 can be retracted through/against the clot material CM toward the embolic protection device 136 and/or at least partially into the interior of the funnel 144. The embolic protection device 136 (e.g., the funnel 144) can be positioned proximal to the clot material CM and configured to inhibit or even prevent blood flow (in the direction shown by the arrow B) through the blood vessel BV. In some aspects of the present technology, blocking blood flow through the blood vessel BV via the embolic protection device 136 can inhibit portions (e.g., fragments) of the clot material CM from migrating downstream farther into the vasculature of the patient. Additionally, the embolic protection device 136 can direct the clot removal element 260 and the captured clot material contained within the clot removal element 260 into the second catheter 140. Accordingly, the embolic protection device 136 is expected to capture and/or direct all, or at least a portion, of the clot material CM into the second catheter 140. In some embodiments, after the clot material CM is sufficiently disrupted, block 1006 can include removing the clot treatment device from the patient, e.g., by retracting (e.g., proximally) one or both of the deployment shaft 141 and the element shaft 142 into and/or through the second catheter 140 and/or the first catheter 120. In these and/or other embodiments, the clot removal element 260 can be reintroduced one or more times as needed to remove additional clot material in a manner at least generally similar or identical to blocks 1004 and/or 1005.

In some embodiments, mechanically disrupting the clot material CM can include bringing clot material into contact with one or more of the relief features 268. For example, retracting the clot removal element 260 proximally to capture clot material CM within the clot removal element 260 can drive at least some clot material CM against one or more of the first relief features 268a and/or the second relief feature 268b. If the force on the first relief features 268a exceeds a first threshold then, as described previously with reference to FIGS. 2A-2D, one or more of the first relief features 268a can bend or flex outwardly and allow clot material CM within the clot removal element 260 to move further distally through the clot removal element 260 until, e.g., the clot material CM contacts the second relief feature 268b. If the force on the second relief feature 268b exceeds a second threshold then, as described previously with reference to FIGS. 2A-2D, the second relief feature 268b can bend or flex outwardly and allow clot material CM within the clot removal element 260 to pass through the clot removal element 260 and back into the blood vessel BV. Although it is generally preferred to keep clot material CM within the clot removal element 260, in some instances it may be beneficial to allow the clot removal element 260 to release clot material CM to, e.g., inhibit or prevent damage to the clot removal element 260 that may harm the patient or render the clot removal element 260 inoperable or difficult to operate. Accordingly, as described previously with reference to FIGS. 2A-2D, the relief features 268 can be configured to allow the clot removal element 260 to release clot material CM at forces that are less than the yield strength, the ultimate strength, and/or the fracture strength of the clot removal element 260 and/or one or more of the struts thereof, which is expected to inhibit or even prevent the clot removal element 260 from yielding, breaking, or otherwise failing during a clot treatment procedure.

Figure 11G:
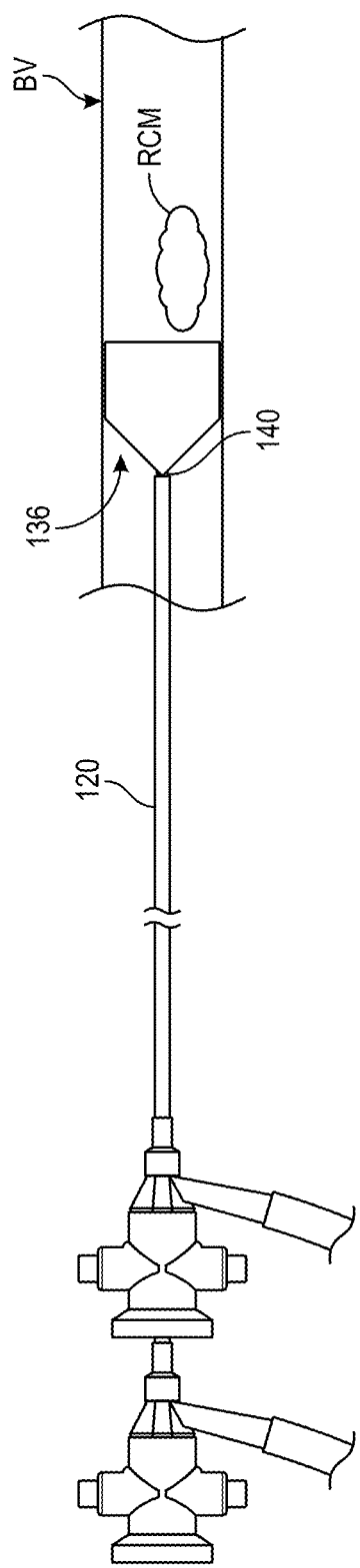

In some embodiments, at block 1007, the method 1000 includes aspirating clot material from the blood vessel through a lumen of the clot treatment system 100. The aspirated clot material can include all or a portion of the clot material remaining in the blood vessel after the mechanical disruption in block 1006. For example, FIG. 11G shows remaining clot material RCM being aspirated from the blood vessel BV via the second catheter 140. The embolic protection device 136 can remain deployed the aspiration, e.g., to direct the remaining clot material RCM into the second catheter 140 and/or inhibit or even prevent the remaining clot material RCM from embolizing. In these and/or other embodiments, another shaft of the system 100 (e.g., the first catheter 120) can be used to aspirate the remaining clot material RCM and/or other material from the blood vessel BV. In some embodiments, blocks 1006 and 1007 can be repeated until all, or at least a sufficient quantity, of the material in the vasculature has been removed, via one or both of mechanical disruption (e.g., block 1006) and aspiration (e.g., block 1007). The sufficient quantity can be at least 50%, 60%, 70%, 80%, 90%, 95%, 99%, etc., of the clot material at a given location in the patient. Although block 1007 is shown as occurring after block 1006 in FIG. 10, in other embodiments block 1007 can occur before block 1006 and/or at a same time as block 1006. After the clot material has been sufficiently removed, the method 1000 can include removing the clot treatment system 100 from the patient (block 1008).

Figure 12:
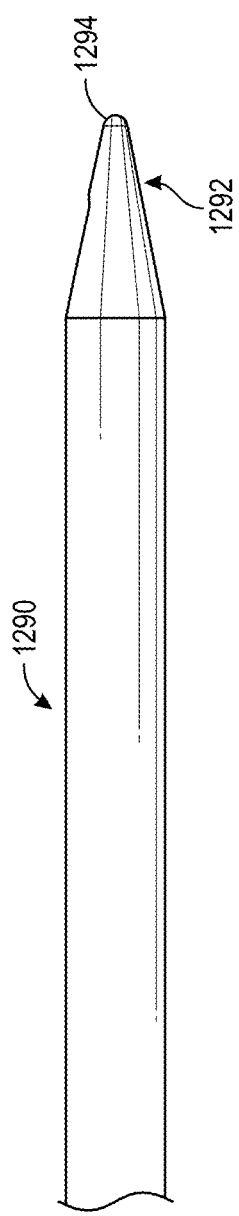
FIGS. 12-16 illustrate respective clot treatment cleaning tools in accordance with embodiments of the present technology.

FIG. 12 is a side view of a cleaning tool 1290 configured in accordance with embodiments of the present technology. The cleaning tool 1290 can include an elongate (e.g., cylindrical) body ending at a distal tip portion 1292. The body of the cleaning tool 1290 can be formed from one or more polymers, plastics, metals, compositions, and/or other suitable materials. The distal tip portion 1292 can be tapered radially inwardly toward a distal terminus of the cleaning tool 1294. In some embodiments all, or at least a portion, of the cleaning tool 1290 is coated or other treated to reduce clot formation, improve biocompatibility, reduce friction, and/or otherwise improve handling by a user.

During a clot treatment procedure, the cleaning tool 1290 can be used to clean/remove clot material from within a clot treatment device, such as the clot treatment device 138 of FIG. 1, after the clot treatment device is deployed within a vessel of a patient, used to removed/capture clot material, and then retracted form the vessel. For example, the cleaning tool 1290 can be positioned within the clot treatment device 138 and used to remove clot material caught in one or more of the struts 262 (FIGS. 2A and 2B) and/or otherwise stuck to the clot treatment device 138 etc. For example, inserting the cleaning tool 1290 within the clot treatment device 138 can force any residual clot material with the clot treatment device 138 toward an exterior of the clot treatment device 138, which can make it easier to use the clot treatment device 138 to extract this residual clot material. The cleaning tool 1290 can also be used similar to a guide rail and, accordingly, positioning the cleaning tool 1290 within the clot treatment device 138 can make the clot treatment device easier to handle and/or position. After cleaning the clot treatment device 138 with the cleaning tool 1290, the clot treatment device 138 can be used (e.g., again) to mechanically disrupt the clot material, as described previously with reference to FIG. 11F.

Figure 13:
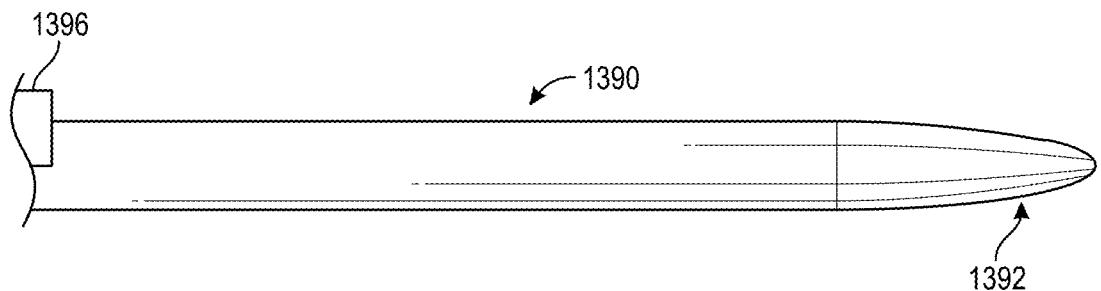

FIG. 13 is a side view of another cleaning tool 1390 configured in accordance with embodiments of the present technology. The cleaning tool 1390 can be generally similar to the cleaning tool 1290 of FIG. 12, but can include a rounded tip 1392 instead of the tapered tip 1292. The cleaning tool 1390 can further include an extension or grip 1396 configured to prevent over-insertion and/or improve ergonomics and handling by the user.

Figure 14:
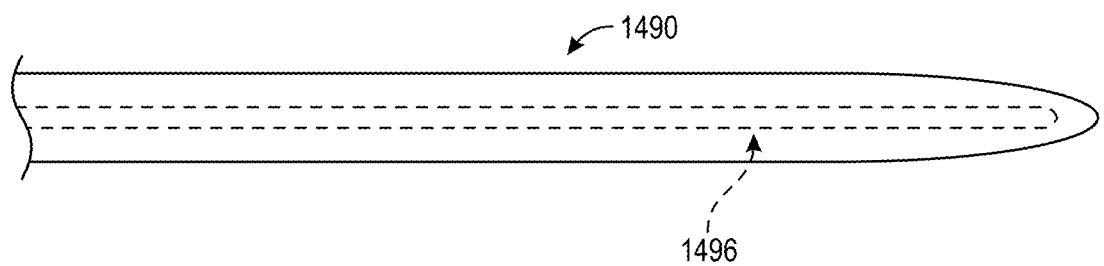

FIG. 14 is a side view of another cleaning tool 1490 configured in accordance with embodiments of the present technology. The cleaning tool 1490 can be generally similar to one or more of the cleaning tools described previously herein, and can further define a hollow interior 1496 configured to increase the flexibility of the cleaning tool 1490 and, accordingly, improve ergonomics and handling by the user.

Figure 15:
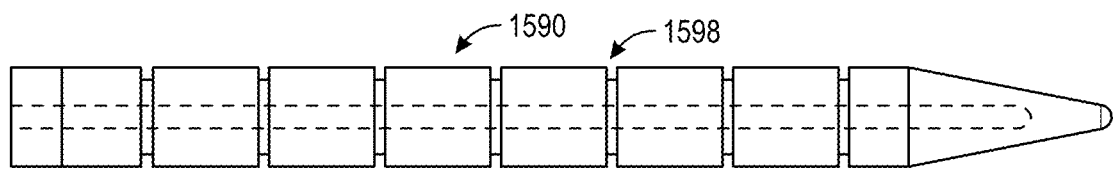

FIG. 15 is a side view of another cleaning tool 1590 configured in accordance with embodiments of the present technology. The cleaning tool 1590 can be generally similar to one or more of the cleaning tools described previously herein, and can further define one or more annular slots 1598 in an outer surface of the cleaning tool 1590. The annular slots 1598 can be configured to increase the flexibility of the cleaning tool 1490 and/or capture additional residual clot material and, accordingly, improve ergonomics and overall handling by the user.

Figure 16:
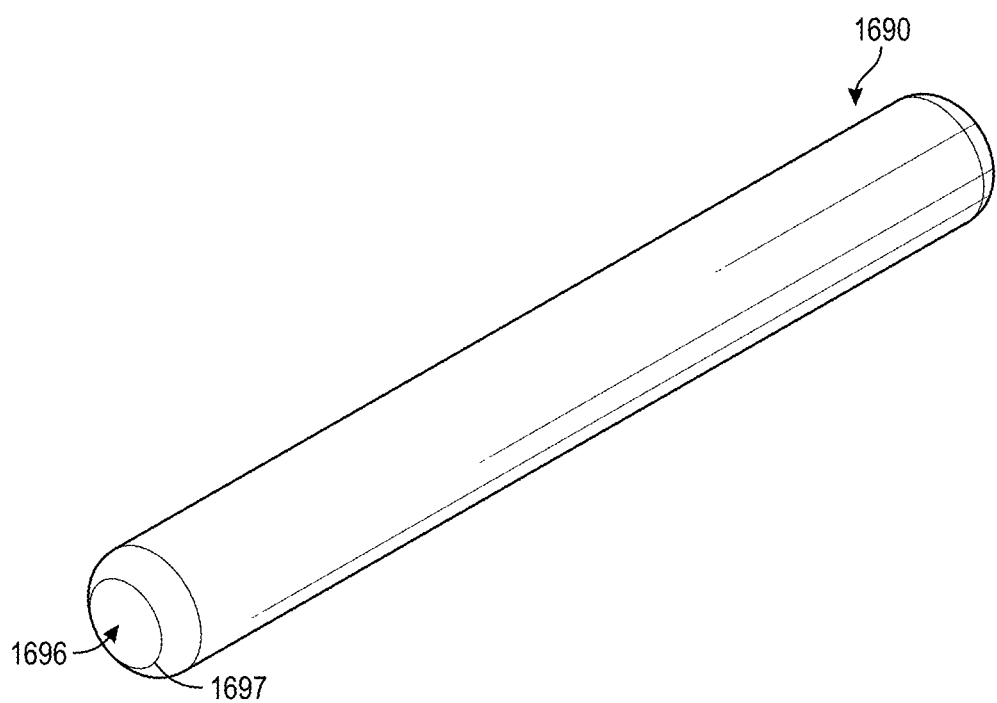

FIG. 16 is a side view of another cleaning tool 1690 configured in accordance with embodiments of the present technology. The cleaning tool 1690 can be generally similar to one or more of the cleaning tools described previously herein, and can further define a hollow interior channel 1696 extending through all, or at least a portion, of the cleaning tool 1690. A proximal end of the cleaning tool 1690 can include a coring tip 1697 configured to remove/core clot material stuck to one or more struts (e.g., one or more of the struts 262 of FIG. 2A) of the clot removal device (e.g., the clot removal element 260 of FIG. 2A).

Figure 17:
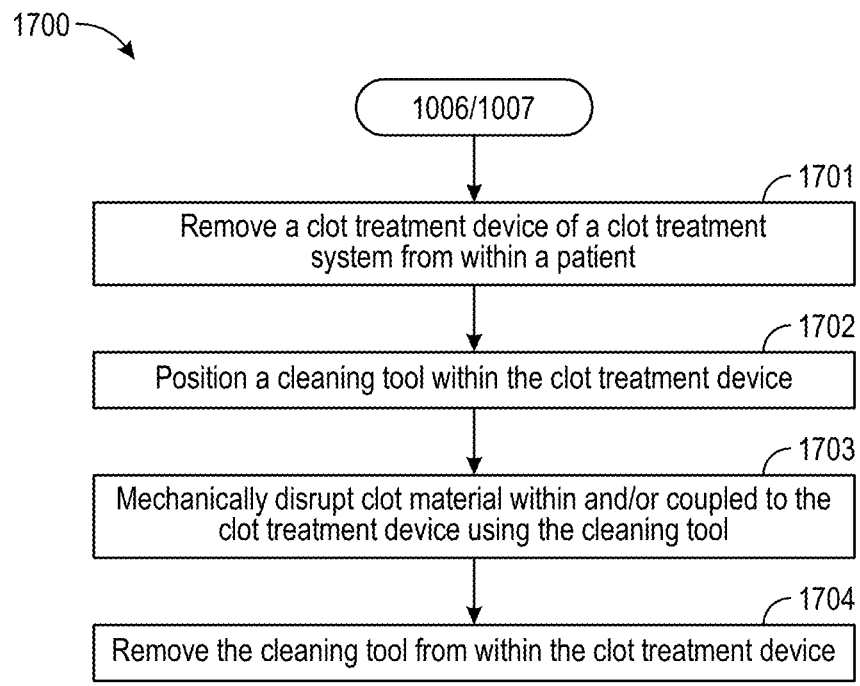
FIG. 17 is a flow diagram of a process or method for removing clot material from a clot treatment device using a cleaning tool in accordance with embodiments of the present technology.

FIG. 17 is a flow diagram of a process or method 1700 for removing clot material from a clot treatment device using a cleaning tool in accordance with embodiments of the present technology. Although some features of the method 1700 are described in the context of the cleaning tool 1290 shown in FIG. 12 for illustration, one skilled in the art will readily understand that the method 1700 can be carried out using other suitable systems and/or devices described herein, including any of the other cleaning tools described herein.

At block 1701, the method 1700 can include removing a clot treatment device of a clot treatment system from within a patient. In at least some embodiments, for example, block 1701 includes removing the clot treatment device 138 (FIG. 2A) from within the blood vessel BV (FIG. 11A) of the patient. In some embodiments, block 1701 can follow block 1006 and/or block 1007 of the method 1000 (FIG. 10). For example, the clot treatment device 138 can be removed from the patient after the clot treatment device 138 has been used to mechanically disrupt clot material within the patient (block 1006) and/or after clot material has been aspirated using the clot treatment system (block 1007).

At block 1702, the method 1700 can include positioning a cleaning tool of a clot treatment system into a clot treatment device of the clot treatment system. In at least some embodiments, for example, block 1702 includes positioning/inserting the cleaning tool 1290 (FIG. 12) within the clot treatment device 138 (FIG. 2A).

At block 1703, the method 1700 can include mechanically disrupting clot material within and/or coupled to the clot treatment device using the cleaning tool. In at least some embodiments, for example, block 1703 includes advancing or retracting the cleaning tool 1290 relative to the clot treatment device 138 to mechanically disrupt clot material contained within the clot treatment device 138 and/or coupled to one or more of the struts 262 (FIG. 2A) of the clot treatment device 138 after, e.g., the clot treatment device 138 has been used to mechanically disrupt clot material within a blood vessel (e.g., block 1006 of FIG. 10). Additionally, or alternatively, positioning the cleaning tool within the clot treatment device can force the clot material to an exterior of the clot treatment device where it can be wiped away via a cloth, picked away via tweezers and/or other instruments, and/or the like. That is, the cleaning tool can cause the clot material to extrude from the cells 264 where it can be more easily removed.

At block 1704, the method 1700 can include removing the cleaning tool from within the clot treatment device. In at least some embodiments, for example, after sufficiently disrupting the clot material within and/or coupled to the clot treatment device 138, the user can remove the cleaning tool 1290 from within the clot treatment device 138. After block 1704, the method 1700 can end, and the clot treatment device 138 can be used again (e.g., in another pass) by, e.g., returning to block 1004 of the method 1000 of FIG. 10.

Figure 18:
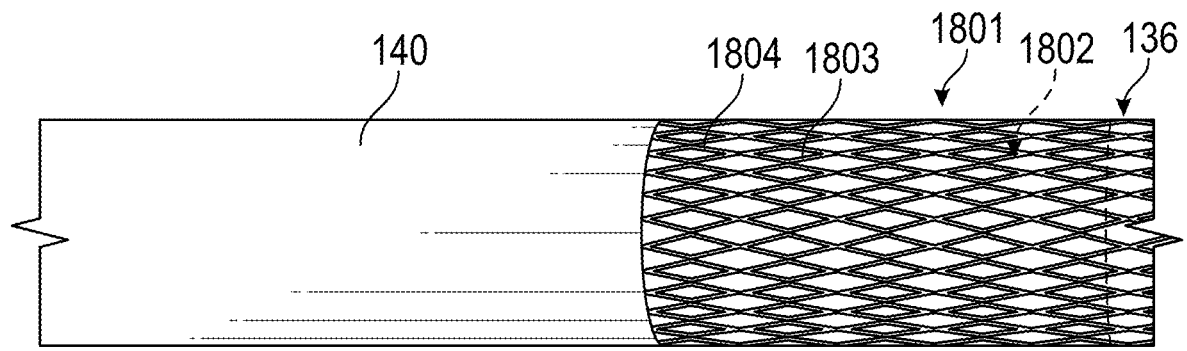
FIGS. 18 and 19 are side views of a proximal portion of an embolic protection device configured in accordance with embodiments of the present technology.
Figure 19:
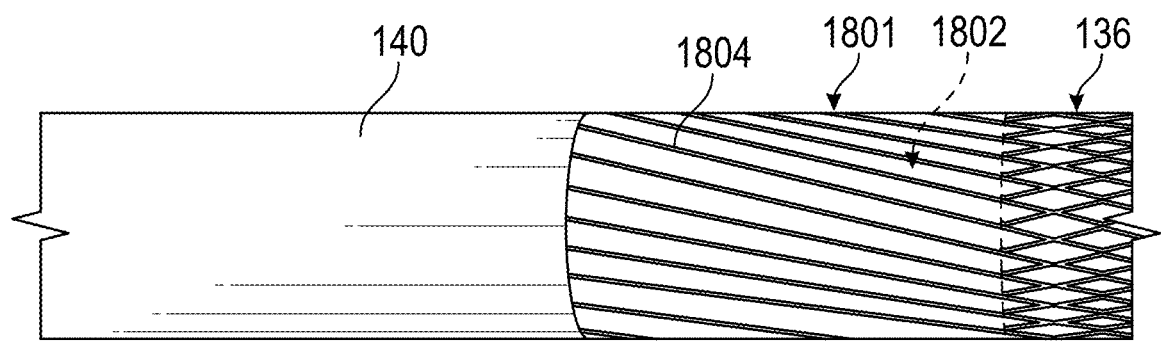

FIGS. 18 and 19 are side views of a proximal or coupling portion 1801 of the embolic protection device 136 (e.g., the funnel 144) of FIG. 1 in accordance with embodiments of the present technology. Referring to FIGS. 18 and 19, the coupling portion 1801 can be coupled to the second catheter 140. For example, in the illustrated embodiment the coupling portion 1801 extends over and is coupled to an exterior surface portion 1802 at a distal end of the second catheter 140. In other embodiments, the coupling portion 1801 can be coupled to a distal terminus of the second catheter 140 to form, e.g., a butt joint (not shown). Generally, attaching the coupling portion 1801 to the distal terminus of the second catheter 140 via, e.g., a butt joint is expected reduce the delivery profile (e.g., cross-sectional dimension) of the embolic protection device 136 but this attachment may be weaker/less resilient than attaching the coupling portion 1801 to the exterior surface portion 1802. In contrast, attaching the coupling portion 1801 to the exterior surface portion 1802 of the second catheter 140 is expected to provide a stronger/more resilient attachment but may also increase the delivery profile of the embolic protection device 136. For example, the embolic protection device 136 can include one or more first wires 1803 (FIG. 18 only) that extend along and around a longitudinal axis of the second catheter in a first (e.g., clockwise) direction and/or one or more second wires 1804 that extend longitudinally and radially around the longitudinal axis in a second (e.g., counterclockwise) direction opposite the first direction. Individual ones of the first and second wires 1803, 1804 can overlap/crossover one another in a braided pattern, e.g., on top of the exterior surface portion 1802 of the second catheter 140 to thereby define a delivery profile (e.g., a maximum outer diameter) of the embolic protection device 136. To reduce the delivery profile of the embolic protection device 136 and, by extension, reduce the size of the catheter/sheath used to deliver the embolic protection device 136, all or a subset of the one or more first wires 1803 can be omitted from the coupling portion 1801, as shown in FIG. 19. Omitting all or a subset of the one or more first wires 1803 can reduce, or eliminate entirely, the overlap between the first and second wires 1803, 1804, thereby reducing the delivery profile of the embolic protection device 136 during delivery. In other embodiments, the coupling portion 1801 can include the one or more first wires 1803 and all or a subset of the one or more second wires 1804 can be omitted from the coupling portion 1801. In these and/or other embodiments, the one or more first wires 1803 and/or the one or more second wires 1804 in the coupling portion 1801 can be straightened to extend in a direction at least generally parallel to a longitudinal axis of the second catheter 140 without, or substantially without, extending around the longitudinal axis, thereby reducing, or eliminating entirely, the overlap between the first and second wires 1803, 1804 to thus reduce the delivery profile of the embolic protection device 136 during delivery.

Figure 20:
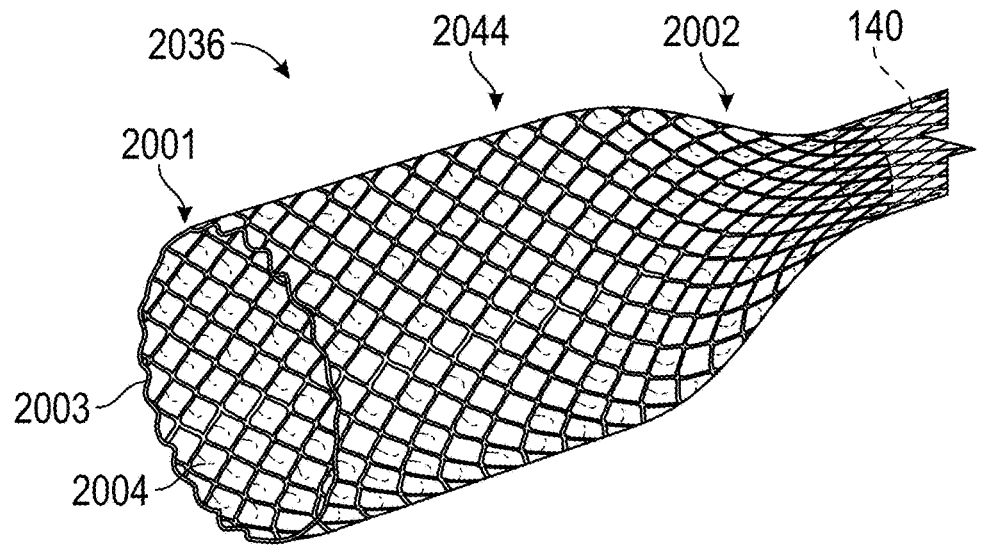
FIG. 20 is a perspective view of an embolic protection device configured in accordance with additional embodiments of the present technology.

FIG. 20 is a perspective view of an embolic protection device 2036 configured in accordance with additional embodiments of the present technology. In the illustrated embodiment, the embolic protection device 2036 includes a funnel 2044 having a first or distal end portion 2001 and a second or proximal end portion 2002 opposite the distal end portion 2001. The proximal end portion 2002 can taper radially inwardly toward and/or be configured to couple to the second catheter 140 as, e.g., described in detail above with reference to FIGS. 18 and/or 19. The funnel 2044 can include a braided or laser-cut structure 2003 at least partially encapsulated within a coating 2004. The coating 2004 can be configured to inhibit or even prevent fluid flow across the structure 2003 of the funnel 2044. In some embodiments, a thickness of the coating 2004 can vary along the length of the funnel 2044. In the illustrated embodiment, for example, the coating 2004 has a first thickness at the distal end portion 2001 and, at the proximal end portion 2002, has a second thickness greater than the first thickness. In use, the proximal end portion 2002 of the funnel 2044 can experience forces (e.g., radial forces) of greater magnitude than the distal end portion 2001 due to, e.g., the radially inward taper along the proximal end portion 2002 toward the second catheter 140. Increasing the thickness of the coating 2004 at the proximal end portion 2002 can improve the durability and/or strength of the proximal end portion 2002 without, or substantially without, impacting the deliverability of the embolic protection device 2036. For example, because the proximal end portion 2002 has a smaller outer diameter than the distal end portion 2001 when the embolic protection device 2036 is deployed, the proximal end portion 2002 is expected to undergo less of a change when the embolic protection device 2036 is transitioned to the collapsed delivery state and, accordingly, the increased thickness of the coating 2004 at the proximal end portion 2002 is not expected to impact, or substantially impact, the deliverability of the embolic protection device 2036. The decreased thickness of the coating 2004 at the distal end portion 2001 can increase the compliance/flexibility of the distal end portion 2001 and thereby, e.g., optimize the ability of the embolic protection device 2036 to seal the vessel and/or improve other characteristics such as deliverability and/or unsheathing performance. In some embodiments, the coating 2004 can be entirely omitted from the distal end portion 2001 of the funnel 2044. In some embodiments, one or more laser drilled holes and/or cutouts can be formed through the coating 2004 to, e.g., allow some fluid flow across the structure 2003 and/or otherwise inhibit or even prevent a complete occlusion of the blood vessel when the embolic protection device 2036 is deployed.

Figure 21:
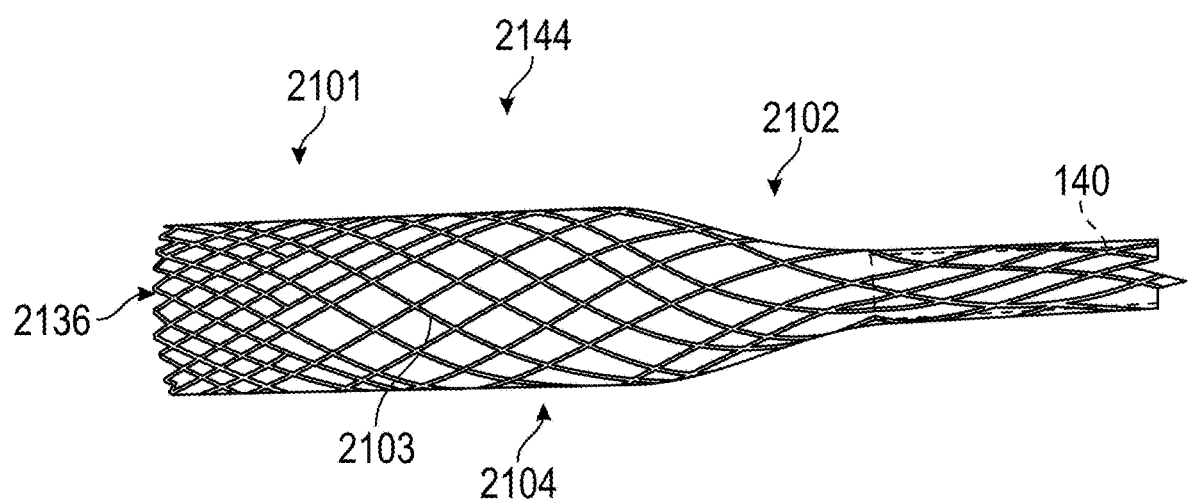
FIG. 21 is a side view of an embolic protection device configured in accordance with additional embodiments of the present technology.

FIG. 21 is a side view of an embolic protection device 2136 configured in accordance with additional embodiments of the present technology. In the illustrated embodiment, the embolic protection device 2136 includes a funnel 2144 having a first or distal end portion 2101 and a second of proximal end portion 2102 opposite the distal end portion 2101. The proximal end portion 2102 can taper radially inwardly toward and/or be configured to couple to the second catheter 140 as, e.g., described in detail above with reference to FIGS. 18 and/or 19. The funnel 2144 can include a braided or laser-cut structure comprising a plurality of struts 2103. A density of the struts 2003 can vary along the length of the funnel 2144. In the illustrated embodiment, for example, the funnel 2144 has a first strut density at the distal end portion 2101 and, at the proximal end portion 2102, a second strut density less than (e.g., half of) the first strut density. Increased strut density at the distal end portion 2101 of the funnel 2144 can reduce, or even prevent, unwanted interactions with clot treatment devices (e.g., snagging, catching, etc., on the funnel 2144 when a clot treatment device is withdrawn proximally toward and/or into the funnel 2144). In some embodiments, the funnel 2144 has a first strut density at the distal end portion 2101 and, at the proximal end portion 2102, a second strut density greater than (e.g., double) the first strut density. Increased strut density at the proximal end portion 2102 of the funnel 2144 can increase the durability of the funnel 214 (at least generally similarly to the increased coating thickness described previously with reference to FIG. 20), increase the radially-outward force applied by the funnel 2144 to, e.g., a blood vessel when the funnel 2144 is deployed (which is expected to improve the seal formed between the funnel 2144 and the blood vessel), and/or otherwise improve the ability of the embolic protection device 2136 to inhibit or even prevent blood flow past, through, and/or around the embolic protection device 2136. In some embodiments, the funnel 2144 further includes an intermediate portion 2104 positioned between the distal and proximal end portions 2101, 2101 and the intermediate portion 2104 has a third strut density between the first and second strut densities. In some embodiments, the funnel 2144 can be coated, including with any of the coatings described previously herein.

Figure 22:
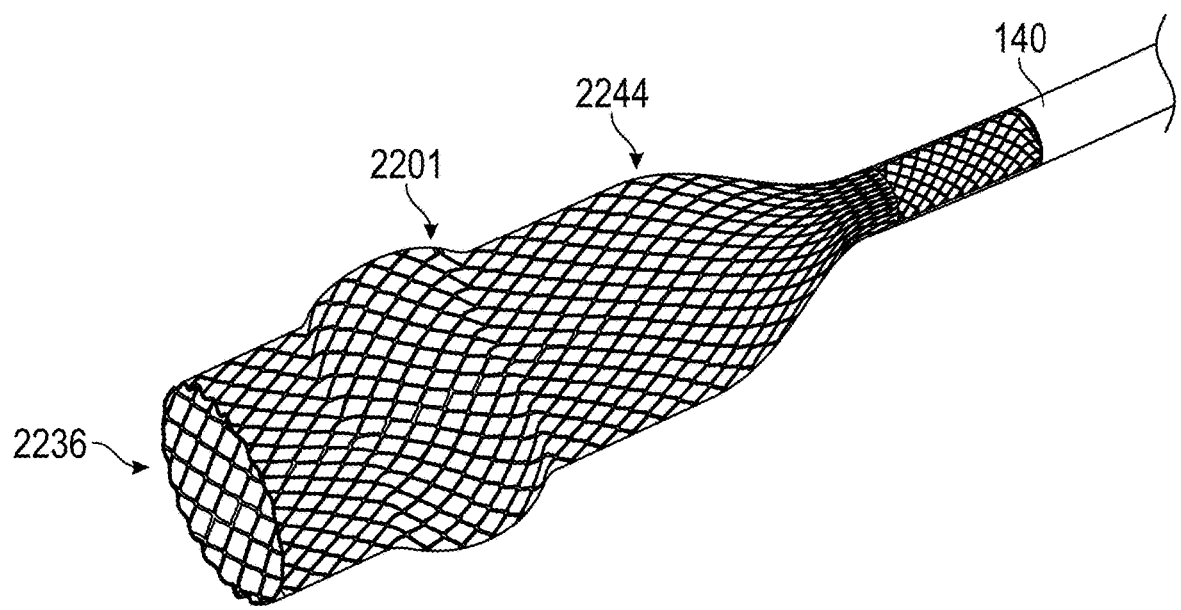
FIG. 22 is a perspective view of an embolic protection device configured in accordance with additional embodiments of the present technology.

FIG. 22 is a perspective view of an embolic protection device 2236 configured in accordance with additional embodiments of the present technology. In the illustrated embodiment, the embolic protection device 2236 includes a funnel 2244 having a widened portion 2201 (which can also be referred to as a "bump feature," a "bulb," a "spherical portion," and/or the like). In the illustrated embodiment, the widened portion 2201 is located generally medially along the length of the funnel 2244 and extends circumferentially around a longitudinal axis of the embolic protection device 2236. When the funnel 2244 is deployed (within, e.g., a blood vessel), the widened portion 2201 can extend radially outwardly beyond one or more other portions of the funnel 2244 to, e.g., define a maximum radial dimension or extent of the funnel 2244. The widened portion 2201 can improve the ability of the funnel 2244 to inhibit or prevent fluid flow through a blood vessel. For example, when the funnel 2244 is deployed within a blood vessel, the widened portion 2201 can be configured to contact the blood vessel and bend/deform upon contact to, e.g., form an improved substantially fluid-impermeable seal therewith.

Figure 23:
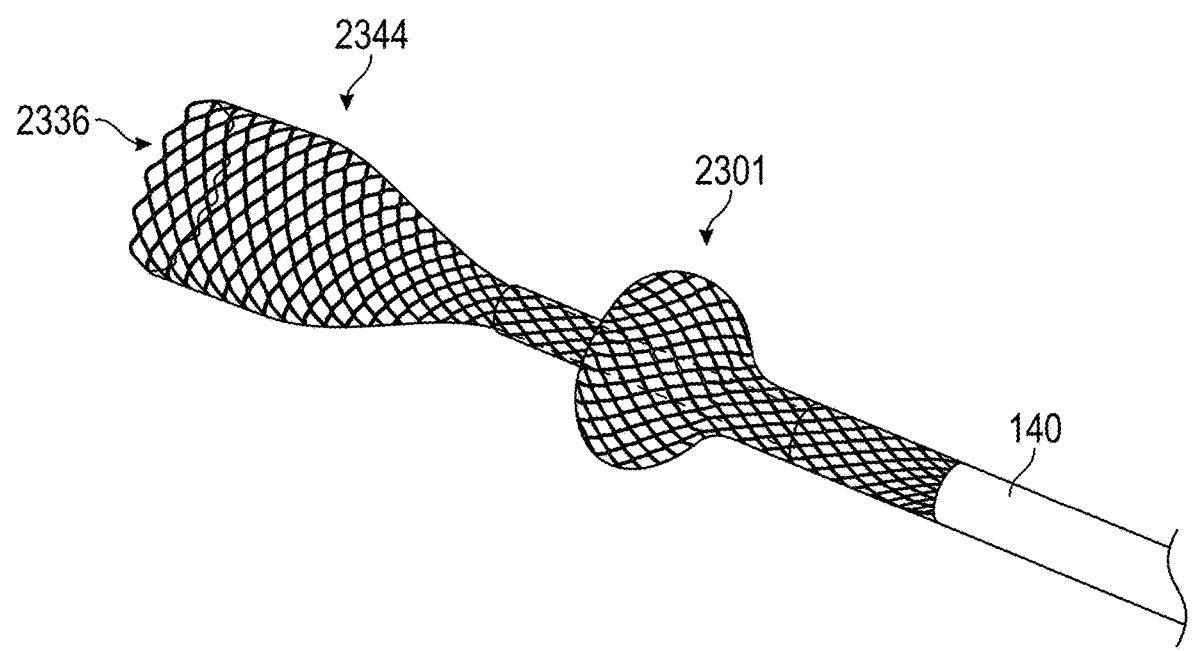
FIG. 23 is a perspective view of an embolic protection device configured in accordance with additional embodiments of the present technology.

FIG. 23 is a perspective view of an embolic protection device 2336 configured in accordance with additional embodiments of the present technology. In the illustrated embodiment, the embolic protection device 2336 includes a funnel 2344 and a bump feature 2301. The bump feature 2301 can be at least generally similar in structure and/or function to the widened portion 2201 described with reference to FIG. 22. However, whereas the widened portion 2201 was part of the funnel 2244, the bump feature 2301 is positioned proximally from the funnel 2344 and, e.g., deployable separately from the funnel 2344. The bump feature 2301 can comprise a same or different construction as the funnel 2344. In the illustrated embodiment, for example, both the bump feature 2301 and the funnel 2344 are braided or laser-cut structures. In other embodiments, the funnel 2344 can be a braided or laser-cut structure and the bump feature 2301 can include a balloon or other expandable/inflatable element different than the funnel 2344.

Accordingly, described herein are clot treatment systems with clot treatment devices, and associated devices and methods. In some embodiments, a clot treatment system includes an embolic protection device and a clot treatment device. The clot treatment device can include one or more mouths and one or more relief features. The one or more mouths can be configured to mechanically engage clot material within a patient's blood vessel to core or capture at least a portion of the clot material. The one or more relief features can be position distal to one or more of the mouths and configured to (i) retain the captured clot material within the clot treatment device and (ii) release the captured clot material when a force on the one or more relief features exceeds a threshold. In at least some embodiments, for example, the relief features can include struts of the clot treatment device that are angled inwardly toward a central axis of the clot treatment device and, when the force on the relief features exceeds the threshold, the relief features can bend or flex outwardly away from the central axis.

During a clot removal procedure, the clot treatment device and the embolic protection device can, while radially constrained within a delivery catheter, be inserted together into a blood vessel of a patient including clot material to be treated. The embolic protection device can be deployed at least partially proximal to the clot material and the clot treatment device can be deployed at least partially distal to the clot material. The clot treatment device can be used to mechanically engage and disrupt the clot material by, for example, retracting the one or more mouths proximally through the clot material and into the embolic protection device and/or the first shaft. The relief features can retain the captured clot material within the clot treatment device. If the force on the relief features exceeds the threshold, the relief features can release the captured clot material to reduce the overall force on the clot treatment device to, e.g., prevent the clot treatment device from yielding, breaking, or otherwise failing. The embolic protection device can be positioned to capture all or a portion of the clot material that embolizes or otherwise breaks off during mechanical engagement of the clot treatment device with the clot material and/or to direct clot material into the first shaft.

Examples

Several aspects of the present technology are set forth in the following examples:

1. A clot treatment device for treating clot material within a blood vessel of a patient, the clot treatment device comprising:
    a unitary structure including a plurality of interconnected struts, wherein the unitary structure defines a central axis and includes—
        a first region defining a coupling portion configured to couple the unitary structure to a catheter;
        a second region distal of the first region and defining a proximal mouth configured to capture at least a portion of the clot material;
        a third region distal of the second region and defining one or more relief features angled inwardly toward the central axis and configured to (i) retain the captured portion of the clot material between the proximal mouth and the one or more relief features when a force on the one or more first relief features is below a threshold and (ii) rotate away from the central axis to release the captured portion of the clot material when the force equals or exceeds the threshold; and
a fourth region distal of the second region and defining a distal terminus of the unitary structure.

2. The clot treatment device of example 1 wherein, in the third region, a subset of the struts terminate at junctions to define the one or more relief features.

3. The clot treatment device of example 1 wherein threshold is based at least in part on the inward angle of the one or more relief features.

4. The clot treatment device of example 1 wherein a subset of the struts define the one or more relief features, and wherein the threshold is based at least in part on a thickness of the subset of the struts.

5. The clot treatment device of example 1 wherein the second, third, and fourth region define a clot removal element of the clot treatment device; and wherein the second region further defines a leading edge portion of the clot removal element that has a thickness that varies along its length.

6. The clot treatment device of example 5 wherein the leading edge portion spans a subset of the plurality of interconnected struts, and wherein the thickness of the leading edge portion (i) increases in a proximal-to-distal direction between immediately adjacent ones of the subset of the plurality of interconnected struts and (ii) decreases between immediately adjacent pairs of the plurality of interconnected struts.

7. The clot treatment device of example 5 wherein—
the plurality of interconnected struts include (i) a first proximal strut coupled to the leading edge portion, (ii) a second proximal strut coupled to the leading edge portion distal to the first proximal strut, and (ii) a third proximal strut coupled to the leading edge portion distal to the second proximal strut;
the leading edge portion has (i) a first segment between the first and second proximal struts and (ii) a second segment between the second and third proximal struts;
the first segment has (i) a first thickness at the first proximal strut and (ii) a second thickness greater than the first thickness at the second proximal strut; and
the second segment has (i) a third thickness less than the second thickness at the second proximal strut and (ii) a fourth thickness greater than the third thickness at the third proximal strut.

8. The clot treatment device of example 7 wherein the fourth thickness is less than the second thickness.

9. The clot treatment device of example 1 wherein the proximal mouth is configured to capture a first portion of the clot material, and wherein the third region further defines one or more distal mouths configured to capture a second portion of the clot material.

10 The clot treatment device of example 9 wherein the one or more distal mouths are positioned between the one or more relief features and the distal terminus.

11. The clot treatment device of example 1 wherein the one or more relief features are one or more first relief features, the threshold is a first threshold, and the force is a first force; and wherein the fourth region further comprises a second relief feature configured to (i) retain captured clot material when a second force on the second relief feature is below a second threshold and (ii) release the captured clot material when the second force equals or exceeds the second threshold.

12. The clot treatment device of example 11 wherein the second relief feature includes a portion of the unitary structure that tapers inwardly toward the central axis.

13. The clot treatment device of example 11 wherein the second relief feature includes a collar and a fuse, wherein the collar is coupled to one of the interconnected struts via the fuse to retain the captured clot material proximal to the second relief feature, and wherein, when the second force equals or exceeds the second threshold, the fuse is configured to break to allow the second relief feature to release the capture clot material.

14. The clot treatment device of example 11 wherein the second relief feature includes a pair of struts that terminate at a junction and are angled inwardly toward the central axis.

15. The clot treatment device of example 1 wherein the coupling portion includes a terminal strut coupled to the second region and an attachment strut extending proximally from the terminal strut, wherein the attachment strut defines one or more strut portions that extend at least generally perpendicularly to a length of the catheter to which the coupling portion is configured to be coupled.

16. The clot treatment device of example 15 wherein, in response to one or more forces on the unitary structure that cause the catheter to flex or deform, the attachment strut is configured to flex or deform with the catheter.

17. The clot treatment device of example 15 wherein the attachment strut is configured to extend helically around the catheter.

18. The clot treatment device of example 15 wherein the terminal strut is a distal terminal strut, wherein the coupling portion further includes a proximal terminal strut, and wherein the attachment strut extends between the distal and proximal terminal struts.

19. The clot treatment device of example 15, further comprising an adhesive material applied to the attachment strut to bond the coupling portion to the catheter, wherein, when bonded to the catheter, the attachment strut does not move relative to the catheter.

20 The clot treatment device of example 1 wherein the distal terminus defines a free end of the unitary structure.

21. A system for removing clot material from a blood vessel of patient, the system comprising:
a delivery catheter;
an intermediate catheter configured to extend through the delivery catheter;
an embolic protection device coupled to a distal portion of the intermediate catheter, wherein the delivery catheter and intermediate catheter are movable relative to one another to move the embolic protection device between (a) a first embolic protection device position in which the embolic protection device is constrained within the delivery catheter and (b) a second embolic protection device position in which the embolic protection device is unconstrained by the delivery catheter and configured to expand within the blood vessel;
a deployment catheter configured to extend through the intermediate catheter;
an elongate shaft configured to extend through the deployment catheter; and
a clot treatment device according to any one of examples 1-20, wherein the deployment catheter and the intermediate catheter are movable relative to one another to move the embolic protection device between (a) a first clot treatment device position in which the clot treatment device is constrained within the deployment catheter and (b) a second clot treatment device position in which the clot treatment device is unconstrained by the deployment catheter and configured to expand within the blood vessel.

22. The system of example 21 wherein, in the second embolic protection device position, the embolic protection device is configured to expand to a diameter of the blood vessel.

23. The system of example 22 wherein the embolic protection device is impermeable to blood.

24 The system of example 22 or example 23 wherein, in the second embolic protection device position, the embolic protection device is configured to substantially prevent blood flow through the blood vessel.

25. The system of any one of examples 21-24 wherein the blood vessel is a periphery artery.

26. The system of any one of examples 21-25 wherein the embolic protection device is a funnel having a tapered shape.

27. The system of example 26 wherein the embolic protection device is impermeable to blood.

28. The system of any one of examples 21-27 wherein the embolic protection device is a balloon.

29. The system of example 28 wherein, in the second embolic protection device position, the balloon is configured to expand to a diameter of the blood vessel to substantially prevent blood flow through the blood vessel.

30. The system of any one of examples 21-29, further comprising:
   a valve assembly fixedly coupled to a proximal portion of the deployment catheter; and
   a hub fixedly coupled to a proximal portion of the elongate shaft, wherein the valve assembly is movable relative to the hub to retract the deployment catheter relative to the elongate shaft to move the clot treatment device between the first clot treatment position and the second clot treatment position.

31. The system of any one of examples 21-30, further comprising a handle having a housing and a trigger movable relative to the housing, wherein the deployment catheter is fixedly coupled to the trigger, and wherein the trigger is movable relative to housing to retract the deployment catheter relative to the elongate shaft to move the clot treatment device between the first clot treatment position and the second clot treatment position.

32. The system of example 31, further comprising a hub fixedly coupled to a proximal portion of the elongate shaft, wherein the hub is coupled to the housing.

33. The system of any one of examples 21-32, further comprising an aspiration source fluidly coupled to the delivery catheter.

34. A method of removing clot material from a blood vessel of a patient, the method comprising:
   positioning a deployment catheter within the blood vessel with at least a portion of the deployment catheter distal to the clot material;
   retracting the deployment catheter over a shaft relative to a clot treatment device to allow the clot treatment device to expand within the blood vessel at least partially distal to the clot material;
   withdrawing the clot treatment device proximally through the clot material to—
      capture a portion of the clot material via a proximal mouth of the clot treatment device, and
      retain the captured portion of the clot material within the clot treatment device and proximal to one or more relief features of the clot treatment device; and
   when a force on the one or more relief features equals or exceeds a corresponding threshold, causing the one or more relief features to move from a first orientation to a second orientation to release the captured portion of the clot material.

35. The method of example 34 wherein causing the one or more relief features to move from the first orientation to the second orientation includes causing the one or more relief features to pivot outwardly from an inwardly-angled orientation.

36 The method of example 34 or example 35 wherein the captured portion of the clot material is a first portion of the clot material, and wherein withdrawing the clot treatment device through the clot material further includes—
   capturing a second portion of the clot material via a distal mouth of the clot treatment device, the distal mouth positioned distal to the proximal mouth; and
   retaining the captured second portion of the clot material within the clot treatment device and proximal to a second relief feature of the clot treatment device.

37. The method of example 36 wherein, when a second force on the second relief feature equals or exceeds a corresponding second threshold, causing the one or more relief features to move from a first orientation to a second orientation to release the capture portion of the clot material.

38. The method of any of examples 34-37 wherein the one or more relief features are one or more first relief features, and wherein the method further comprises, after causing the one or more first relief features to release the portion of the clot material, retaining the portion of the clot material within the clot treatment device and proximal to a second relief feature of the clot treatment device positioned distal to the one or more first relief features.

39. The method of any of examples 34-38 wherein—
   the clot treatment device includes a leading edge portion defining the proximal mouth;
   the leading edge portion includes a first segment, a second segment distal to the first segment, and a third segment distal to the second segment; and
   withdrawing the clot treatment device further includes collapsing the proximal mouth at the third segment, the second segment, and then the first segment in series.

40. The method of any of examples 34-39 wherein causing the one or more relief features to release the captured portion of the clot material includes causing the one or more relief features to release the captured portion of the clot material before one or more other portions of the clot treatment device yields or breaks.

41. The method of any of examples 34-40, further comprising:
   before positioning the deployment catheter within the blood vessel—
      advancing a delivery catheter through the blood vessel such that a distal portion of the delivery catheter is proximate to the clot material;
      advancing an embolic protection device through the delivery catheter, wherein the embolic protection device is coupled to a distal portion of an intermediate catheter; and
      retracting the delivery catheter to allow the embolic protection device to expand within the blood vessel at least partially proximal to the clot material;
   wherein withdrawing the clot treatment device includes withdrawing the clot treatment device at least partially into the embolic protection device.

42. The method of any of examples 34-41, wherein the one or more relief features include a frangible strut section of the clot treatment device configured to break when the force equals or exceeds the threshold, and wherein causing the one or more relief features to release the captured portion of the clot material includes breaking the frangible strut section.

43. The method of any of examples 34-42, further comprising advancing a cleaning tool through the clot treatment device to mechanically disrupt clot material contained within and/or coupled to the clot treatment device.

44. A method of removing clot material from a blood vessel of a patient, the method comprising:
   advancing a delivery catheter through the blood vessel such that a distal portion of the delivery catheter is proximate to the clot material;
   advancing an embolic protection device through the delivery catheter, wherein the embolic protection device is coupled to a distal portion of an intermediate catheter;
   retracting the delivery catheter to allow the embolic protection device to expand within the blood vessel at least partially proximal to the clot material;
   advancing a clot treatment assembly through the intermediate catheter and at least partially through the clot material;
   retracting a deployment catheter of the clot treatment assembly relative to a clot treatment device according to any one of examples 1-20 to allow the clot treatment device to expand within the blood vessel at least partially distal to the clot material; and
   withdrawing the clot treatment device proximally though the clot material and into the embolic protection device.

45. The method of example 44 wherein the method further comprises substantially inhibiting blood flow through the blood vessel after expanding the embolic protection device.

46. The method of example 44 or example 45 wherein allowing the embolic protection device to expand includes allowing the embolic protection device to expand to a diameter of the blood vessel.

47. The method of any one of examples 44-46 wherein the embolic protection device is impermeable to blood.

48. The system of any one of examples 44-47 wherein the blood vessel is a periphery artery.

49. The system of any one of examples 44-48 wherein the embolic protection device is a funnel having a tapered shape.

50 The system of any one of examples 44-49 wherein the embolic protection device is a balloon, and wherein allowing the embolic protection device to expand includes inflating the balloon.

51. A system for removing clot material from a blood vessel of patient, the system comprising:
   a delivery catheter;
   an intermediate catheter configured to extend through the delivery catheter;
   an embolic protection device coupled to a distal portion of the intermediate catheter, wherein the delivery catheter and intermediate catheter are movable relative to one another to move the embolic protection device between (a) a first embolic protection device position in which the embolic protection device is constrained within the delivery catheter and (b) a second embolic protection device position in which the embolic protection device is unconstrained by the delivery catheter and configured to expand within the blood vessel;
   a deployment catheter configured to extend through the intermediate catheter;
   an elongate shaft configured to extend through the deployment catheter; and
   a clot treatment device according to any one of examples 1-20, wherein the deployment catheter and the intermediate catheter are movable relative to one another to move the embolic protection device between (a) a first clot treatment device position in which the clot treatment device is constrained within the deployment catheter and (b) a second clot treatment device position in which the clot treatment device is unconstrained by the deployment catheter and configured to expand within the blood vessel.

52. The system of example 51 wherein the embolic protection device includes:
   a funnel; and
   a coating at least partially encapsulating the funnel, wherein the coating is configured to substantially prevent blood flow through the blood vessel and has a thickness that varies along the length of the funnel.

53 The system of example 52 wherein the funnel has a distal end portion and a proximal end portion opposite the first end portion, wherein the coating has a first thickness at the distal end portion and a second thickness greater than the first thickness at the proximal end portion.

54. The system of any of examples 51-53 wherein the embolic protection device includes a plurality of interconnected struts, and wherein a density of the struts varies along the length of the embolic protection device.

55. The system of example 54 wherein—
   the embolic protection device has a distal end portion and a proximal end portion opposite the distal end portion,
   at the distal end portion, the struts have a first density, and
   at the proximal end portion, the struts have a second density less than the first density.

56. The system of any one of examples 51-54 wherein the embolic protection device includes—
   one or more first wires configured to extend along and around a longitudinal axis of the intermediate catheter in a first direction;
   one or more second wires that extend along and around the longitudinal axis of the intermediate catheter in a second direction opposite the first direction; and
   a coupling portion configured to be coupled to an exterior surface portion of the intermediate catheter,
   wherein, in the coupling portion, the one or more first wires do not overlap the one or more second wires.

57. The system of example 56 wherein the one or more first wires do not extend into the coupling portion.

58. The system of any of examples 51-57, wherein the embolic protection device further includes a bump feature that, when deployed, defines a maximum radial extent of the embolic protection device.

59. The system of example 58 wherein the bump feature is a widened portion of the embolic protection device.

60 The system of example 58 wherein the embolic protection device further includes a funnel, and wherein the funnel is positioned distal to the bump feature.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A clot treatment device for treating clot material within a blood vessel of a patient, the clot treatment device comprising:
   a unitary structure including a plurality of interconnected struts, wherein the unitary structure defines a central axis, and wherein the unitary structure is expandable from a compressed position within a delivery catheter to an expanded position within the blood vessel, and wherein, in the expanded position, the unitary structure includes—
      a first region defining a coupling portion configured to couple the unitary structure to a shaft;
      a second region distal of the first region and defining a proximal mouth configured to capture at least a portion of the clot material when the shaft is retracted proximally;
      a third region distal of the second region and defining one or more relief features angled inwardly toward the central axis, wherein the one or more relief features are configured to, when the shaft is retracted proximally:
         retain the captured portion of the clot material between the proximal mouth and the one or more relief features when a force from the captured portion of the clot material on the one or more relief features is below a threshold, and
         rotate away from the central axis to release the captured portion of the clot material when the force from the captured portion of the clot material equals or exceeds the threshold to reduce an overall force on the clot treatment device to inhibit mechanical failure of the clot treatment device; and
      a fourth region distal of the second region and defining a distal terminus of the unitary structure.

2. The clot treatment device of claim 1 wherein, in the third region, a subset of the plurality of interconnected struts terminate at junctions to define the one or more relief features.

3. The clot treatment device of claim 1 wherein the threshold is based at least in part on the inward angle of the one or more relief features.

4. The clot treatment device of claim 1 wherein a subset of the plurality of interconnected struts define the one or more relief features, and wherein the threshold is based at least in part on a thickness of the subset of the plurality of interconnected struts.

5. The clot treatment device of claim 1 wherein the second, third, and fourth region define a clot removal element of the clot treatment device; and wherein the second region further defines a leading edge portion of the clot removal element that has a thickness that varies along its length.

6. The clot treatment device of claim 1 wherein the proximal mouth is configured to capture a first portion of the clot material, and wherein the third region further defines one or more distal mouths configured to capture a second portion of the clot material.

7. The clot treatment device of claim 6 wherein the one or more distal mouths are positioned between the one or more relief features and the distal terminus.

8. The clot treatment device of claim 1 wherein the coupling portion includes a terminal strut coupled to the second region and an attachment strut extending proximally from the terminal strut, wherein the attachment strut defines one or more strut portions that extend at least generally perpendicularly to a length of the catheter to which the coupling portion is configured to be coupled.

9. The clot treatment device of claim 8 wherein, in response to one or more forces on the unitary structure that cause the catheter to flex or deform, the attachment strut is configured to flex or deform with the catheter.

10. The clot treatment device of claim 8 wherein the attachment strut is configured to extend helically around the catheter.

11. The clot treatment device of claim 8 wherein the terminal strut is a distal terminal strut, wherein the coupling portion further includes a proximal terminal strut, and wherein the attachment strut extends between the distal and proximal terminal struts.

12. The clot treatment device of claim 8, further comprising an adhesive material applied to the attachment strut to bond the coupling portion to the catheter, wherein, when bonded to the catheter, the attachment strut does not move relative to the catheter.

13. The clot treatment device of claim 1 wherein the distal terminus defines a free end of the unitary structure.

14. A clot treatment device for treating clot material within a blood vessel of a patient, the clot treatment device comprising:
   a unitary structure including a plurality of interconnected struts, wherein the unitary structure defines a central axis and includes—
      a first region defining a coupling portion configured to couple the unitary structure to a shaft;
      a second region distal of the first region and defining a proximal mouth configured to capture at least a portion of the clot material, wherein the second region defines a leading edge portion, wherein the leading edge portion spans a subset of the plurality of interconnected struts, and wherein a thickness of the leading edge portion (i) increases in a proximal-to-distal direction between immediately adjacent ones of the subset of the plurality of interconnected struts and (ii) decreases between immediately adjacent pairs of the plurality of interconnected struts;
      a third region distal of the second region and defining one or more relief features angled inwardly toward the central axis and configured to (i) retain the captured portion of the clot material between the proximal mouth and the one or more relief features when a force on the one or more relief features is below a threshold and (ii) rotate away from the central axis to release the captured portion of the clot material when the force equals or exceeds the threshold; and
    a fourth region distal of the second region and defining a distal terminus of the unitary structure.

15. A clot treatment device for treating clot material within a blood vessel of a patient, the clot treatment device comprising:
- a unitary structure including a plurality of interconnected struts, wherein the unitary structure defines a central axis and includes—
  - a first region defining a coupling portion configured to couple the unitary structure to a shaft;
  - a second region distal of the first region and defining a proximal mouth configured to capture at least a portion of the clot material, wherein the second region defines a leading edge portion, and wherein—
    - the plurality of interconnected struts include (i) a first proximal strut coupled to the leading edge portion, (ii) a second proximal strut coupled to the leading edge portion distal to the first proximal strut, and (ii) a third proximal strut coupled to the leading edge portion distal to the second proximal strut;
    - the leading edge portion has (i) a first segment between the first and second proximal struts and (ii) a second segment between the second and third proximal struts;
    - the first segment has (i) a first thickness at the first proximal strut and (ii) a second thickness greater than the first thickness at the second proximal strut; and
    - the second segment has (i) a third thickness less than the second thickness at the second proximal strut and (ii) a fourth thickness greater than the third thickness at the third proximal strut;
  - a third region distal of the second region and defining one or more relief features angled inwardly toward the central axis and configured to (i) retain the captured portion of the clot material between the proximal mouth and the one or more relief features when a force on the one or more relief features is below a threshold and (ii) rotate away from the central axis to release the captured portion of the clot material when the force equals or exceeds the threshold; and
  - a fourth region distal of the second region and defining a distal terminus of the unitary structure.

16. The clot treatment device of claim 15 wherein the fourth thickness is less than the second thickness.

17. A clot treatment device for treating clot material within a blood vessel of a patient, the clot treatment device comprising:
- a unitary structure including a plurality of interconnected struts, wherein the unitary structure defines a central axis and includes—
  - a first region defining a coupling portion configured to couple the unitary structure to a shaft;
  - a second region distal of the first region and defining a proximal mouth configured to capture at least a portion of the clot material;
  - a third region distal of the second region and defining one or more first relief features angled inwardly toward the central axis and configured to (i) retain the captured portion of the clot material between the proximal mouth and the one or more relief features when a first force on the one or more first relief features is below a first threshold, and (ii) rotate away from the central axis to release the captured portion of the clot material when the first force equals or exceeds the first threshold; and
  - a fourth region distal of the second region and defining a distal terminus of the unitary structure, wherein the fourth region comprises a second relief feature configured to (i) retain captured clot material when a second force on the second relief feature is below a second threshold and (ii) release the captured clot material when the second force equals or exceeds the second threshold.

18. The clot treatment device of claim 17 wherein the second relief feature includes a portion of the unitary structure that tapers inwardly toward the central axis.

19. The clot treatment device of claim 17 wherein the second relief feature includes a collar and a fuse, wherein the collar is coupled to one of the interconnected struts via the fuse to retain the captured clot material proximal to the second relief feature, and wherein, when the second force equals or exceeds the second threshold, the fuse is configured to break to allow the second relief feature to release the capture clot material.

20. The clot treatment device of claim 17 wherein the second relief feature includes a pair of struts that terminate at a junction and are angled inwardly toward the central axis.

\* \* \* \* \*